(12) United States Patent
Ikai et al.

(10) Patent No.: US 8,805,100 B2
(45) Date of Patent: Aug. 12, 2014

(54) FILTER DEVICE, IMAGE DECODING DEVICE, IMAGE ENCODING DEVICE, AND FILTER PARAMETER DATA STRUCTURE

(75) Inventors: Tomohiro Ikai, Osaka (JP); Yoshihiro Kitaura, Osaka (JP); Tomoko Aono, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 71 days.

(21) Appl. No.: 13/701,441

(22) PCT Filed: May 31, 2011

(86) PCT No.: PCT/JP2011/062537
§ 371 (c)(1),
(2), (4) Date: Nov. 30, 2012

(87) PCT Pub. No.: WO2011/152425
PCT Pub. Date: Dec. 8, 2011

(65) Prior Publication Data
US 2013/0077884 A1    Mar. 28, 2013

(30) Foreign Application Priority Data

Jun. 3, 2010   (JP) ................................. 2010-127441
Jul. 15, 2010  (JP) ................................. 2010-160862
Oct. 8, 2010   (JP) ................................. 2010-229095

(51) Int. Cl.
*G06K 9/32*    (2006.01)
*G06K 9/76*    (2006.01)
*H04N 7/12*    (2006.01)
*H04N 11/02*   (2006.01)

(52) U.S. Cl.
USPC ....... 382/233; 382/232; 382/261; 375/240.16

(58) Field of Classification Search
None
See application file for complete search history.

(56) References Cited

U.S. PATENT DOCUMENTS

| | | | |
|---|---|---|---|
| 7,561,623 B2 * | 7/2009 | Park et al. | ................ 375/240.29 |
| RE43,628 E | 9/2012 | Sun et al. | |
| 2002/0136303 A1 | 9/2002 | Sun et al. | |

(Continued)

FOREIGN PATENT DOCUMENTS

| | | |
|---|---|---|
| JP | 11-275584 A | 10/1999 |
| JP | 2002-330436 A | 11/2002 |
| JP | 2005-39766 A | 2/2005 |

OTHER PUBLICATIONS

Juan Du; Lu Yu, "A parallel and area-efficient architecture for deblocking filter and Adaptive Loop Filter," Circuits and Systems (ISCAS), 2011 IEEE International Symposium on , vol., no., pp. 945,948, May 15-18, 2011.*

(Continued)

*Primary Examiner* — Andrae S Allison
(74) *Attorney, Agent, or Firm* — Birch, Stewart, Kolasch & Birch, LLP

(57) ABSTRACT

A loop filter section according to an embodiment of the present invention includes: a BF section selectively acting on a block boundary of an image processed block by block; and an adaptive filter section including a first linear filter section that acts on an input image to be supplied to the BF section and a second linear filter section that acts on an output image of the BF section. The adaptive filter section performs addition of an output image of the first linear filter section and an output image of the second linear filter section to output a result of the addition.

15 Claims, 28 Drawing Sheets

(56) References Cited

U.S. PATENT DOCUMENTS

| | | | |
|---|---|---|---|
| 2002/0146072 | A1 | 10/2002 | Sun et al. |
| 2003/0053541 | A1 | 3/2003 | Sun et al. |
| 2003/0206664 | A1* | 11/2003 | Gomila et al. .............. 382/268 |
| 2003/0219074 | A1* | 11/2003 | Park et al. .............. 375/240.29 |
| 2004/0190626 | A1* | 9/2004 | Sun et al. ................ 375/240.18 |
| 2005/0175103 | A1* | 8/2005 | Sun et al. ................ 375/240.16 |
| 2006/0126962 | A1* | 6/2006 | Sun .............................. 382/268 |
| 2006/0171472 | A1 | 8/2006 | Sun et al. |
| 2006/0209959 | A1 | 9/2006 | Sun |
| 2006/0210185 | A1* | 9/2006 | Sun .............................. 382/240 |
| 2006/0268988 | A1 | 11/2006 | Sun et al. |
| 2007/0031065 | A1 | 2/2007 | Sun |
| 2007/0098076 | A1 | 5/2007 | Sun et al. |
| 2007/0098077 | A1 | 5/2007 | Sun et al. |
| 2007/0098278 | A1* | 5/2007 | Sun et al. ..................... 382/236 |
| 2010/0260264 | A1 | 10/2010 | Sun et al. |
| 2011/0116549 | A1 | 5/2011 | Sun |
| 2012/0213296 | A1 | 8/2012 | Sun |
| 2013/0128982 | A1* | 5/2013 | Kim et al. ................ 375/240.16 |

OTHER PUBLICATIONS

Alvarez-Mesa, M.; Chi, C.C.; Juurlink, B.; George, V.; Schierl, T., "Parallel video decoding in the emerging HEVC standard," Acoustics, Speech and Signal Processing (ICASSP), 2012 IEEE International Conference on, vol., no., pp. 1545,1548, Mar. 25-30, 2012.*

List et al, Adaptive Deblocking Filter; IEEE Transactions on Circuits and Systems for Video Technology, vol. 13, No. 7, Jul. 2003.*

"Advanced video coding for generic audiovisual services," ITU-T Telecommunication Standardization Sector of ITU, Series H: Audiovisual and Multimedia Systems, Infrastructure of audiovisual services—Coding of moving video, Recommendation ITU-T H.264, Mar. 2009.

Amonou, I. et al., "Description of video coding technology proposal by France Telecom, NTT, NTT DOCOMO, Panasonic and Technicolor," Joint Collaborative Team on Video Coding (JCT-VC) of ITU-T SG16 WP3 and ISO/IEC JTC1/SC29/WG11, 1st Meeting: Dresden, DE, Document JCTVC-A114, ITU-T, Apr. 15-23, 2010.

Bjontegaard, G., "Calculation of average PSNR differences between RD-Curves," ITU-T Q.6/SG16 Document VCEG-M33, Austin, TX, USA, Apr. 2-4, 2001.

Chiu, Y. et al., "Adaptive (Wiener) Filter for Video Compression," ITU-Telecommunications Standardization Sector, Study Group 16 Question 6, Video Coding Experts Group (VCEG), 35th Meeting: Berlin, Germany, Document VCEG-AI14, ITU-T, Jul. 16-18, 2008.

Chujoh, T. et al., "Block-based Adaptive Loop Filter," ITU-Telecommunications Standardization Sector, Study Group 16 Question 6, Video Coding Experts Group (VCEG), 35th Meeting: Berlin, Germany, Document VCEG-AI18, ITU-T, Jul. 16-18, 2008.

Chujoh, T. et al., "Description of video coding technology proposal by TOSHIBA," Joint Collaborative Team on Video Coding (JCT-VC) of ITU-T SG16 WP3 and ISO/IEC JTC1/SC29/WG11, 1st Meeting: Dresden, DE, Document: JCTVC-A117, ITU-T, Apr. 15-23, 2010.

Chujoh, T. et al., "Improvement of Block-based Adaptive Loop Filter," ITU-Telecommunications Standardization Sector, Study Group 16 Question 6, Video Coding Experts Group (VCEG), 36th Meeting: San Diego, CA, USA, Document VCEG-AJ13, ITU-T, Oct. 8-10, 2008.

Ikai, T. et al., "A parallel adaptive loop filter," Joint Collaborative Team on Video Coding (JCT-VC) of ITU-T SG16 WP3 and ISO-IEC JTC1/SC29/WG11, 2nd Meeting: Geneva, CH, Document: JCTVC-B064, ITU-T, Jul. 21-28, 2010.

International Search Report issued in PCT/JP2011/062537 mailed Sep. 6, 2011.

Liu, Y. et al., "Unified Loop Filter for Video Coding," [online], International Organisation for Standardisation Organisation Internationale de Normalisation ISO/IEC JTC1/SC29/WG11, Coding of Moving Pictures and Audio, MPEG2010/M17171, ISO/IEC JTC1/SC29/WG11, Jan. 2010, [retrieved on Aug. 29, 2011], http://yliu.avsx.org/pub/standard/m17171.zip.

* cited by examiner

FIG. 13

One-Dimensional Structure In Coded Data | Corresponding Positions Of Weighting Factors Used As Two-Dimensional Filters (a) a0 | a0

(b) a0 a1 a2 a3 a4

| a0 | a1 | a2 |
|----|----|----|
| a3 | a4 | a3 |
| a2 | a1 | a0 |

(c) a0 a1 a2 a3 a4 ... a12

| a0 | a1 | a2 | a3 | a4 |
|----|----|----|----|----|
| a5 | a6 | a7 | a8 | a9 |
| a10 | a11 | a12 | a11 | a10 |
| a9 | a8 | a7 | a6 | a5 |
| a4 | a3 | a2 | a1 | a0 |

F I G. 22

| |
|---|
| alf_param() { |
| adaptive_loop_filter_flag |
| if ( adaptive_loop_filter_flag ) { |
| alf_pred_coef_mode |
| if( disable_deblocking_filter_idc != 1 ) { |
| alf_parallel_mode |
| } |
| alf_length_luma_minus5_div2 |
| for( i = 0; i < AlfNumCoeffLuma; i++ ) { |
| alf_coeff_luma[i] |
| } |
| alf_block_control() |
| alf_chroma_idc |
| if ( alf_chroma_idc ) { |
| alf_length_chroma_minus5_div2 |
| for( i = 0; i< AlfNumCoeffChroma; i++ ) { |
| alf_coeff_chroma[i] |
| } |
| } |
| } |
| } |

FIG. 28

(a)
```
alf_param() {
    adaptive_loop_filter_flag
    if ( adaptive_loop_filter_flag ) {
        alf_parallel_mode
        ...
    }
}
```

(b)
```
alf_param() {
    adaptive_loop_filter_flag
    if ( adaptive_loop_filter_flag ) {
        alf_reference_mode
        ...
    }
}
```

FIG. 29

(a)
```
alf_param() {
    adaptive_loop_filter_flag
    if ( adaptive_loop_filter_flag ) {
        alf_length_df_minus1_div2
        for( i = 0; i < AlfNumCoeffDF; i++ ) {
            alf_coeff_df[i]
        }
        alf_length_error_minus1_div2
        for( i = 0; i < AlfNumCoeffError; i++ ) {
            alf_coeff_error[i]
        }
        alf_length_pred_minus1_div2
        for( i = 0; i < AlfNumCoeffPred; i++ ) {
            alf_coeff_pred[i]
        }
    }
}
```

(b)
```
alf_param() {
    adaptive_loop_filter_flag
    if ( adaptive_loop_filter_flag ) {
        alf_coeff_df[0]
        alf_length_error_minus1_div2
        for( i = 0; i < AlfNumCoeffError; i++ ) {
            alf_coeff_error[i]
        }
        alf_length_pred_minus1_div2
        for( i = 0; i < AlfNumCoeffPred; i++ ) {
            alf_coeff_pred[i]
        }
    }
}
```

(c)
```
alf_param() {
    adaptive_loop_filter_flag
    if ( adaptive_loop_filter_flag ) {
        alf_length_df_minus1_div2
        for( i = 0; i < AlfNumCoeffDF; i++ ) {
            alf_coeff_df[i]
        }
        alf_coeff_error[0]
        alf_length_pred_minus1_div2
        for( i = 0; i < AlfNumCoeffPred; i++ ) {
            alf_coeff_pred[i]
        }
    }
}
```

(d)
```
alf_param() {
    adaptive_loop_filter_flag
    if ( adaptive_loop_filter_flag ) {
        alf_coeff_df[0]
        alf_coeff_error[0]
        alf_length_pred_minus5_div2
        for( i = 0; i < AlfNumCoeffPred; i++ ) {
            alf_coeff_pred[i]
        }
    }
}
```

FILTER DEVICE, IMAGE DECODING DEVICE, IMAGE ENCODING DEVICE, AND FILTER PARAMETER DATA STRUCTURE

TECHNICAL FIELD

The present invention relates to a filter device which acts on an image. Further, the present invention relates to an image decoding device and an image encoding device both of which include such a filter device. Still further, the present invention relates to a data structure of a film parameter fed to such a filter device.

BACKGROUND ART

In the field of moving image coding technology, encoding is generally carried out in the following manner. That is, image data (image information) is segmented into prediction blocks, prediction is carried out in prediction blocks thus segmented, orthogonal transform is carried out with respect to difference (residual) between a predicted image and an input image to obtain a transform coefficient, the transform coefficient thus obtained is quantized, and then encoding is made by variable-length coding of the transform coefficient thus quantized. Orthogonal transform of the difference (residual) is carried out in transform blocks, which are identical to the prediction blocks or are determined independently from the prediction blocks. With such an encoding method, great distortion (so-called black noise) is likely to occur at a boundary of each block, which is a unit for prediction or a unit for orthogonal transform. In addition, encoding can cause not only block noise but also various encoding noise such as blurring and mosquito noise.

In order to reduce these distortions, there have been disclosed techniques of performing filtering operation with respect to a decoded image used as a reference image at the prediction.

Non-Patent Literature 1 utilizes the technique of changing a strength of block noise reduction process in accordance with a threshold that can be embedded into coded data.

Non-Patent Literature 2 discloses the technique called Adaptive Loop Filter (ALF), by which pixels (5×5, 7×7, or 9×9) around a filter target pixel are referred to, and weighting factors of these pixels thus referred are decoded so that a spatial filtering operation is carried out. The ALF is a technique of determining, for each slice on a reference image, a weighting factor that would minimize an error between a reference image subjected to filtering and an original image, and subjecting to filtering operation based on weighting factor.

Furthermore, Non-Patent Literature 3 discloses a configuration in which a prediction residual, a prediction image, and a decoded image (sum of the prediction residual and the prediction image) applied to non-linear de-noising filter is regarded as an input image of ALF, and in which a de-blocking filter is provided at a stage subsequent to the ALF.

CITATION LIST

Non-Patent Literatures

[Non-Patent Literature 1]
Recommendation ITU-T H.264, Telecommunication Standardization Sector of ITU, March 2009 (published in March 2009)

[Non-Patent Literature 2]
VCEG-AI18, Telecommunication Standardization Sector, 35th Meeting: Berlin, Germany, July 2008 (published in July 2008)

[Non-Patent Literature 3]
JCTVC-A114, Joint Collaborative Team on Video Coding (JCT-VC) of ITU-T SG16 WP3 and ISO/IEC JTC1/SC29/WG11, 1st Meeting: Dresden, Del., April 2010

SUMMARY OF INVENTION

Technical Problem

However, a de-blocking filter of Non-Patent Literature 1 that uses a threshold to change a block noise strength (de-blocking strength) has the following problem. That is, an optical threshold cannot be easily determined because various thresholds have to be tested by trial and error.

The ALF of Non-Patent Literature 2 causes a spatial filter to act on a decoded image subjected to de-blocking filter process. However, a block noise reducing effect in the de-blocking filter process is not adjustable when the effect is too strong or too weak. In particular, in a case where the de-blocking filter process is too strong, such a de-blocking filter process increases the occurrence of blurring, which is difficult for the ALF to adequately correct. The ALF of Non-Patent Literature 3 acts on a decoded image yet to be subjected to de-blocking filter process. Therefore, the ALF is totally incapable of adaptively adjusting a filtering strength of the de-blocking filter.

There is the problem common to the techniques disclosed in Non-Patent Literatures 2 and 3. That is, due to their configurations in which the ALF is coupled in serial to a de-blocking filter which requires heavy-load processing, the time required for whole filtering operation is long because the time required for whole filtering operation is a sum of a computation time required for filtering operation of the ALF and the time required for filtering operation of the de-blocking filter.

The present invention has been attained in view of the above problems, and a main object of the present invention is to realize a filter device capable of high-speed processing through parallelization while attaining high coding efficiency with use of an ALF.

Solution to Problem

In order to solve the above problem, a filter device according to the present invention includes: a boundary filter selectively acting on a block boundary of an image block by block; and an adaptive filter including: a first linear filter section acting on an input image to be supplied to the boundary filter; and a second linear filter section acting on an output image of the boundary filter, the adaptive filter outputting a sum of an output image of the first linear filter section and an output image of the second linear filter section.

The adaptive filter provided in the filter device according to the present invention performs addition of the output image of the first linear filter section, which acts on an input image to be supplied to the boundary filter, and an output image of the second linear filter section, which acts on an output image of the boundary filter, and then outputs a result of the addition. Therefore, it is possible to reduce the number of taps of the second linear filter section without decreasing coding efficiency or to reduce the number of taps of the first linear filter section without decreasing coding efficiency.

Here, the former effect, i.e. the capability of reducing the number of taps of the second linear filter section without decreasing the coding efficiency means a capability of reducing total computation time without decreasing the coding efficiency. That is, if it is possible to perform the filtering operation of the first linear filter section in parallel with the filtering operation of the boundary filter, a computation time T required for an entire filtering operation is expressed by T=Max(T0+T2, T1) where T0, T1, and T2 are computation time required for filtering operations of the boundary filter, the first linear filter section, and the second linear filter section, respectively. Thus, the reduction in number of taps of the second linear filter section reduces the computation time T2 for the second linear filter section even with an increased number of taps of the first linear filter section, as long as the computation time T1 required for the filtering operation of the first linear filter section is shorter than the sum T0+T2 of the time T0 required for the filtering operation of the boundary filter and the time T2 required for the filtering operation of the second linear filter section. This in turn enables reduction of the whole computation time T.

Note that the filtering operation of the boundary filter is larger in amount of computation than the filtering operation (product-sum operation) of the linear filter, especially in a case where the boundary filter is a de-blocking filter, in particular, in a case where the boundary filter is a de-blocking filter having the function of autonomously adjusting its own filtering strength in accordance with the degree of activity, block boundary strength, etc. Thus, even with an increased number of taps of the first linear filter section, the computation time T1 of the first linear filter section rarely exceeds the computation time T0 of the boundary filter section. That is, the effect of being capable of reducing the whole computation time without decreasing the coding efficiency is a generally viable effect, except for unlikely cases where the computation time T1 of the first linear filter section exceeds the computation time T0 of the boundary filter section.

In order to solve the above problem, a filter device of the present invention is a filter device for generating a post-filter image from a filter input image which is an image segmented into blocks and processed, comprising: adaptive filter information storing means for storing adaptive filter information corresponding to the filter input image; and boundary utilization filter means (BF means) for generating a boundary utilization filter image (post-BF image) from the filter input image by using pixels located near a boundary of a block neighboring a filter target pixel and by operating a filter for generating a pixel value of the filter target pixel; and adaptive filter means for carrying out an adaptive filter process, which is controlled by the adaptive filter information, on a basis of the filter input image and the post-BF image.

The BF means selects a block boundary or a pixel neighboring a block boundary to generate the image to be inputted to the adaptive filter. The combination of (i) the BF process of explicitly referring to a boundary and pixels near the boundary and (ii) the adaptive filter enables de-blocking strength adjustments appropriate for the characteristics of sequences and frames and the characteristics of boundaries, thus increasing the distortion correction effect. The filter means configured as described above achieves the effect of enabling de-blocking strength adjustments appropriate for the characteristics of sequences and frames and the positional relations with the boundaries, through the use of adaptive filter information of a low volume of codes.

In order to solve the above problem, a filter device according to the present invention includes: a boundary filter selectively acting on a block boundary of an image processed block by block; and an adaptive filter including: a first linear filter section calculating a pixel value of each target pixel of an output image of the first linear filter section, with reference to each pixel value of an output image of the boundary filter in a reference range defined in correspondence with a position of the target pixel; a second linear filter section calculating a pixel value of each target pixel of an output image of the second linear filter section, with reference to each pixel value of a predicted image in a reference range defined in correspondence with a position of the target pixel; and a third linear filter section calculating a pixel value of each target pixel of an output image of the third linear filter section, with reference to each pixel value of a residual image in a reference range defined in correspondence with a position of the target pixel, the adaptive filter performing addition of the respective output images of the first through third linear filter sections to output a result of the addition, wherein a number of taps of at least one of the first through third linear filter sections is set to 1.

According to the filter device configured as described above, the number of taps of at least one of the first through third linear filter sections is set to 1. This makes it possible to reduce at least either the amount of processing or the processing time while maintaining high coding efficiency.

Further, in order to solve the above problem, a filter device according to the present invention includes: a boundary filter selectively acting on a block boundary of an image processed block by block; and an adaptive filter comprising: a first linear filter section calculating a pixel value of each target pixel of an output image of the first linear filter section, with reference to each pixel value of an output image of the boundary filter in a reference range defined in correspondence with a position of the target pixel; a second linear filter section calculating a pixel value of each target pixel of an output image of the second linear filter section, with reference to each pixel value of a predicted image in a reference range defined in correspondence with a position of the target pixel; and a third linear filter section calculating a pixel value of each target pixel of an output image of the third linear filter section, with reference to each pixel value of a residual image in a reference range defined in correspondence with a position of the target pixel, the adaptive filter performing addition of the respective output images from the first through third linear filter sections to output a result of the addition, wherein a downstream boundary line in an processing order out of boundary lines of the reference range is configured so as to at least partially overlap a boundary of the target pixel or a boundary of a block containing the target pixel.

According to the filter device configured as described above, a downstream boundary line in an processing order out of boundary lines of the reference range is configured so as to at least partially overlap a boundary of the target pixel or a boundary of a block containing the target pixel. This makes it possible to reduce at least either the volume of processing or the processing time while maintaining high coding efficiency.

For example, under circumstances where the reference range is rectangular in form and where the processing is performed in raster scan order, the "downstream boundary line in the processing order out of boundary lines of the reference range" refers to at least either a right-sided boundary line or a lower boundary line out of the boundary lines of the reference range. Meanwhile, under circumstances where the processing is performed in reverse raster scan order, the "downstream boundary line in the processing order out of boundary lines of the reference range" refers to at least either a left-sided boundary line or an upper boundary line out of the boundary lines of the reference range.

In addition, the block may be any of the following units called a transform block, a prediction block, a macroblock, a coding unit, and a largest coding unit.

Further, the present invention encompasses: an image decoding device including the above-described filter device, the filter device being caused to act on each image used to generate a decoded image; and an image encoding device including the above-described filter device, the filter device being caused to act on each image used to generate a locally decoded image.

Still further, the present invention encompasses the following data structure of the filter parameter.

That is, the present invention encompasses a data structure of a filter parameter fed to a filter device that includes a boundary filter and an adaptive filter, the filter parameter containing: a filter coefficient of the boundary filter selectively acting on a block boundary of an image processed block by block; a filter coefficient of a first linear filter section calculating a pixel value of each target pixel of an output image of the first linear filter section, with reference to each pixel value of an output image of the boundary filter in a reference range defined in correspondence with a position of the target pixel; a filter coefficient of a second linear filter section calculating a pixel value of each target pixel of an output image of the second linear filter section, with reference to each pixel value of a predicted image in a reference range defined in correspondence with a position of the target pixel; and a filter coefficient of a third linear filter section calculating a pixel value of each target pixel of an output image of the third linear filter section, with reference to each pixel value of a residual image in a reference range defined in correspondence with a position of the target pixel.

Advantageous Effects of Invention

As described above, a filter device according to the present invention includes: a boundary filter selectively acting on a block boundary of an image processed block by block; and an adaptive filter including: a first linear filter section acting on an input image to be supplied to the boundary filter; and a second linear filter section acting on an output image of the boundary filter, the adaptive filter outputting a sum of an output image of the first linear filter section and an output image of the second linear filter section. This makes it possible to realize a filter device capable of a high-speed processing through parallelization while achieving high coding efficiency with use of an adaptive filter.

Furthermore, as described above, a filter device according to the present invention includes: a boundary filter selectively acting on a block boundary of an image processed block by block; and an adaptive filter including: a first linear filter section calculating a pixel value of each target pixel of an output image of the first linear filter section, with reference to each pixel value of an output image of the boundary filter in a reference range defined in correspondence with a position of the target pixel; a second linear filter section calculating a pixel value of each target pixel of an output image of the second linear filter section, with reference to each pixel value of a predicted image in a reference range defined in correspondence with a position of the target pixel; and a third linear filter section calculating a pixel value of each target pixel of an output image of the third linear filter section, with reference to each pixel value of a residual image in a reference range defined in correspondence with a position of the target pixel, the adaptive filter performing addition of the respective output images of the first through third linear filter sections to output a result of the addition, wherein a number of taps of at least one of the first through third linear filter sections is set to 1, wherein the number of taps of at least one of the first through third linear filter sections is set to 1, or a downstream boundary line in an processing order out of boundary lines of the reference range is configured so as to at least partially overlap a boundary of the target pixel or a boundary of a block containing the target pixel. This makes it possible to reduce at least either the volume of processing or the processing time while maintaining high coding efficiency.

BRIEF DESCRIPTION OF DRAWINGS

FIG. 13 is a diagram showing the structure of weighting factors of the first embodiment of the present invention.

FIG. 22 is a view showing a structural example of a filter parameter to be provided to the loop filter section shown in FIG. 21.

FIG. 28 is a view showing a structural example of a filter parameter according to the second embodiment of the present invention.

FIG. 29 is a view showing a structural example of a filter parameter according to the second embodiment of the present invention.

DESCRIPTION OF EMBODIMENTS

Embodiments of the present invention are described below with reference to the drawings.

Embodiment 1

Figure 11:
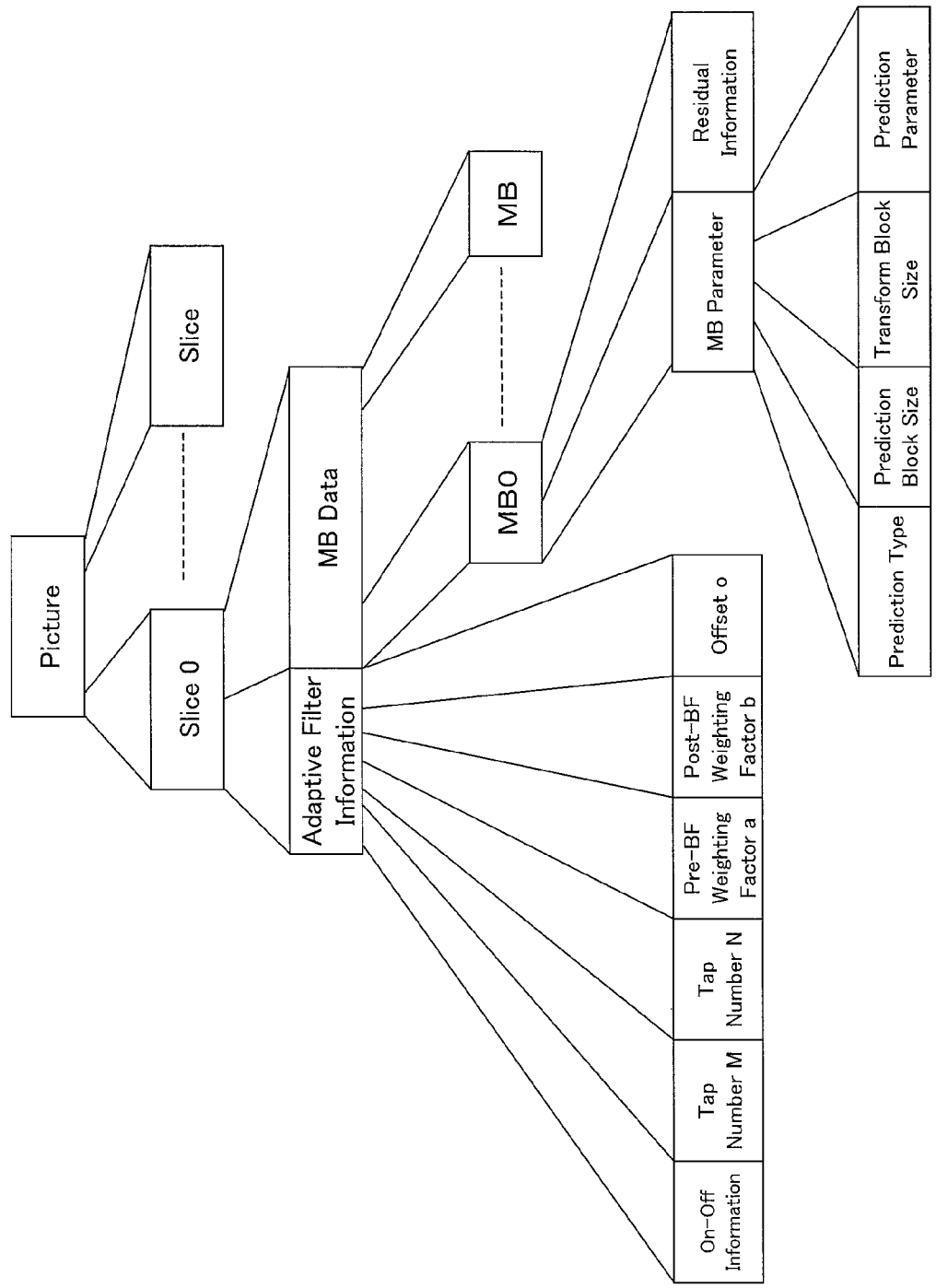
FIG. 11 is a diagram showing the structure of coded data handled by a moving image decoder 1 and a moving image encoder 2 according to the first embodiment of the present invention.

Prior to a description of a moving image decoder 1 according to a first embodiment of the present invention, a structure of coded data that is generated by a moving image encoder 2 according to the present embodiment and decoded by the moving image decoder 1 is described with reference to FIG. 11.

The coded data is constituted by a series of image data (pictures). As shown in FIG. 11, each single picture is constituted by a plurality of slices. Each slice is constituted by adaptive filter information and MB data. The MB data is information for generating a decoded image, and is constituted by a block type, a prediction block size, a prediction parameter, a transform block size, and residual information.

The adaptive filter information is information which, in a frame memory having decoded images stored therein, is used to control an adaptive filter process, and is constituted by on-off information for controlling a filter so that the filer is on or off, a tap number M indicating the number of taps before BF, a tap number N indicating the number of taps after BF, a pre-BF weighting factor ak (k=0 to (M×M+1)/2−1), a post-BF weighting factor bk (k=0 to (N×N+1)/2−1), and an offset o. For example, M and N take on a value of 1, 3, or 5. It should be noted that either or both of the tap numbers M and N may take on a fixed value determined in advance without explicit encoding. For example, M may take on a value of 1, and N may take on a value of 5. Further, the tap numbers are not limited to 1, 3, or 5.

It should be noted that the pre-BF weighting factor ak, the post-BF weighting factor bk, and the offset o may each be coded by predictive coding. That is, a weighting factor prediction section for predicting weighting factors and an offset may be provided so that values of difference from predicted values calculated by the weighting factor prediction section can be decoded and the sums of the values of difference and the predicated values can be used as weighting factors and an offset, respectively. It should be noted here that a method that involves the use of the values of a preceding frame as the predicted values is appropriate. Further, the pre-BF weighting factor ak, the post-BF weighting factor bk, and the offset o may be subjected to appropriate quantization. Furthermore, the pre-BF weighting factor ak, the post-BF weighting factor bk, and the offset o may be coded as nonlinearly quantized values.

It should be noted that the term "weighting factor" used herein may be rephrased as "filter coefficient".

(Structures of Weighting Factors)

Structures of weighting factors in coded data and corresponding positions of weighting factors used as two-dimensional filters are described with reference to FIG. 13. (a), (b), and (c) of FIG. 13 show weighting factors in cases where the numbers of taps are 1, 3, and 5, respectively. Shown on the left side of the drawing are structures of weighting factors in coded data, with 1, 5, and 13 weighting factors orderly structured in one-dimensional manner.

A case where the number of taps is M is equivalent to applying an M×M two-dimensional filter. In this case, where the number of pixels to be referred to is M×M, the number of weighing factors is reduced by utilizing symmetry, so that the number of weighting factors required is (M×M+1)/2.

Shown on the right side of FIG. 13 are corresponding positions of weighting factors used as two-dimensional filters. A two-dimensional filter is a filter that calculates a weighted average as obtained by multiplying weighting factors corresponding to values of a filter target pixel and of pixels located around the filter target pixel. In FIG. 13, an identical weighting factor is assigned to pixels located symmetrical about a point represented by the filter target pixel. By thus setting the correspondence, the number of weighting factors required in the same M×M tap filter can be reduced to approximately half, so that a reduction in coding amount of weighting factors and an improvement in coding efficiency are achieved.

(Moving Image Decoder 1)

Figure 1:
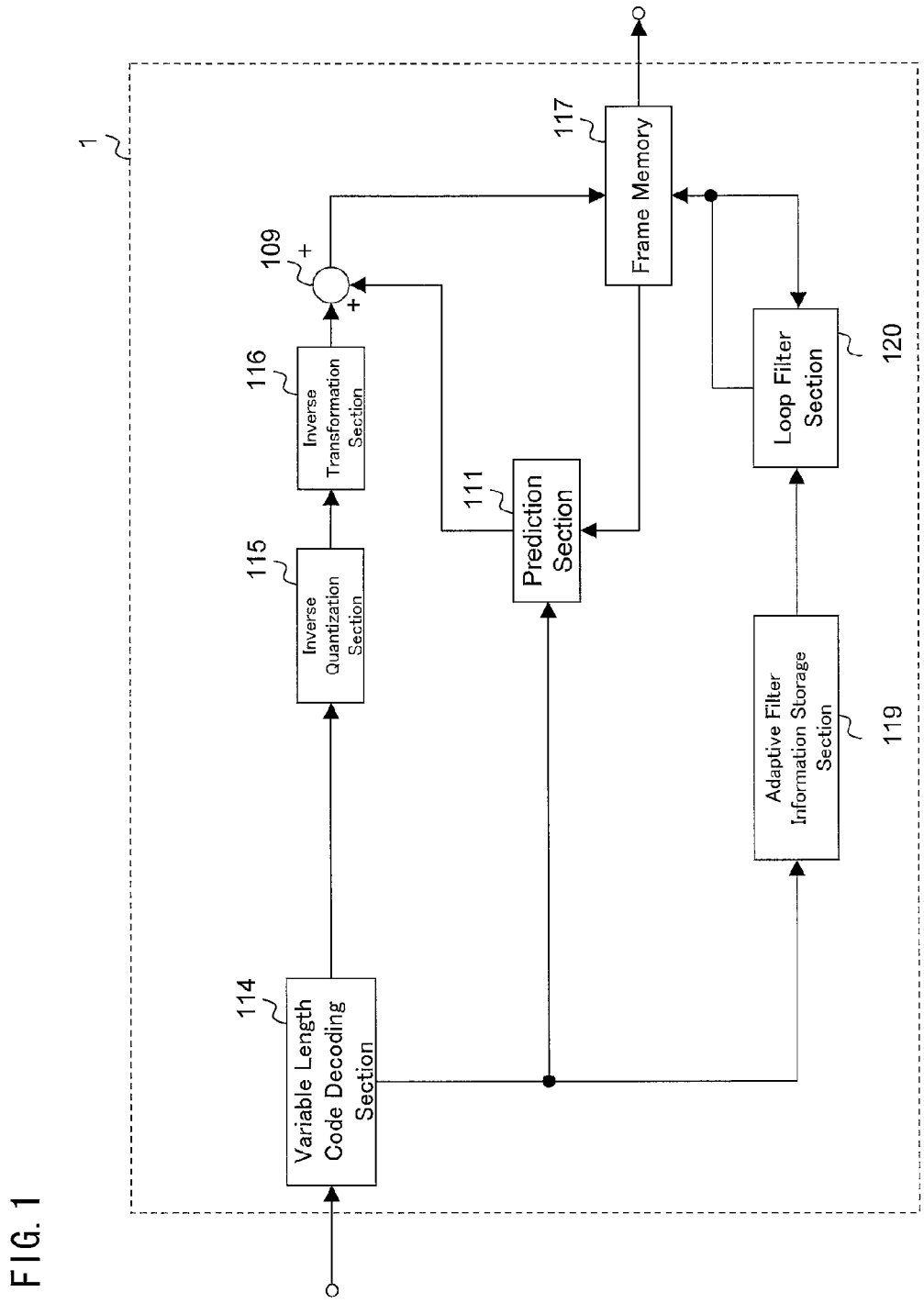
FIG. 1 is a block diagram of a moving image decoder 1 according to a first embodiment of the present invention.

A moving image decoder to which the present invention is applied is described below with reference to FIG. 1. FIG. 1 is a block diagram showing a configuration of a moving image decoder 1 according to the first embodiment.

As shown in FIG. 1, the moving image decoder 1 includes a prediction section 111, a variable length code decoding section 114, an inverse quantization section 115, an inverse transformation section 116, a frame memory 117, an adaptive filter information storage section 119, a loop filter section 120, and an addition section 109. Operation of the moving image decoder 1 is described below.

Coded data inputted to the moving image decoder 1 is first inputted to the variable length code decoding section 114. The variable length code decoding section 114 decodes, by variable length decoding of the coded data, adaptive filter information containing weighting factors for use in a filtering process, an MB parameter indicating a prediction method and a transform method, and residual information that is transformed and quantized transform coefficients.

The inverse quantization section 115 inverse-quantizes the transformed and quantized residual signal inputted from the variable length code decoding section 114. The inverse transformation section 116 inverse-transforms the inverse-quantized signal inputted from the inverse quantization section 115 to generate a residual image.

The prediction section 111 receives the MB parameter decoded by the variable length code decoding section 114 and, in accordance with the MB parameter, generates a predicted image by using a decoded image (image that has already been decoded) stored in the frame memory 117. The MB parameter is constituted by a block type, a prediction block size, a transform block size, and a prediction parameter. The block type indicates whether a block is an intra block or an inter block. In the case of an intra block, the prediction section 111 generates a predicted image with reference to a decoded image (image in the frame memory) yet to be subjected to a loop filter process, which will be described later. In the case of an inter block, the prediction section 111 generates a predicted image with reference to a decoded image subjected to the loop filter process. In the present embodiment, the prediction block size indicates whether the size of a prediction block is 16×16, 8×8, or 4×4, and the transform block size indicates whether the size of a transform is 16×16, 8×8, or 4×4. The prediction parameter varies depending on the block type. In the case of an intra block, the prediction parameter is an intra prediction mode that indicates whether to use DC prediction or directional prediction. In the case of an inter block, the prediction parameter is a motion vector and a reference index. The term "reference index" here means an identifier for specifying a reference frame in a case where the frame memory has a plurality of frames that can be referred to. It should be noted that the block type, the prediction block size, the transform block size, the prediction parameter, and the like are not limited to these structures.

The addition section 109 generates a decoded image by addition of the predicted image inputted from the prediction section 111 and the residual image inputted from the inverse transformation section 116 and then stores the decoded image in the frame memory 117.

The adaptive filter information storage section 119 receives and stores the adaptive filter information decoded by the variable length code decoding section 114. The loop filter section 120 reads out the adaptive filter information stored in the adaptive filter information storage section 119, carries out a filtering process of the decoded image stored in the frame memory 117, and writes out the decoded image again to the frame memory 117.

(Loop Filter Section 120)

Figure 3:
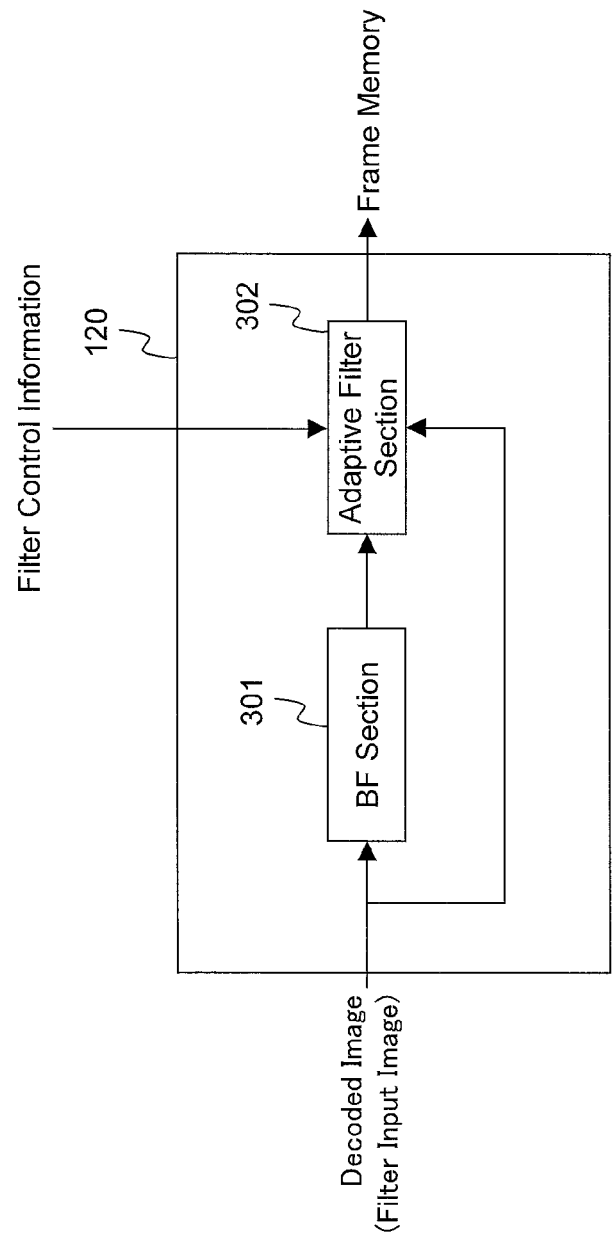
FIG. 3 is a block diagram of a loop filter section 120 according to the first embodiment of the present invention.

FIG. 3 is a diagram showing an internal configuration of the loop filter section 120. The loop filter section 120 is constituted by a boundary utilization filter section (BF section) 301 and an adaptive filter section 302.

The loop filter section 120 is means that, by using the decoded image stored in the frame memory 117 and the adaptive filter information stored in the adaptive filter information storage section 119, generates an image with reduced coding distortion.

The BF section 301 is means for, by using values of pixels near a boundary of a block neighboring a target block, generating pixel values for use in the adaptive filter section 302.

The adaptive filter section 302 is means that carries out a filtering process by a weighted average using the weighting factors contained in the adaptive filter information.

A feature of the adaptive filter section 302 is to include two input images, one of which is an image (post-BF image) processed by the BF section 301, and the other one of which is an image (pre-BF image) yet to be processed by the BF section 301. This can also be expressed as a feature of the loop filter 120 including the BF section 301 and the adaptive filter section 302 and receiving, as inputs to the adaptive filter section 302, an input to the loop filter section 120 and an output from the BF section 301. It should be noted that the unit of processing by the loop filter section 120, the BF section 301, and the adaptive filter section 302 may be a frame, a block, or a pixel.

Figure 17:
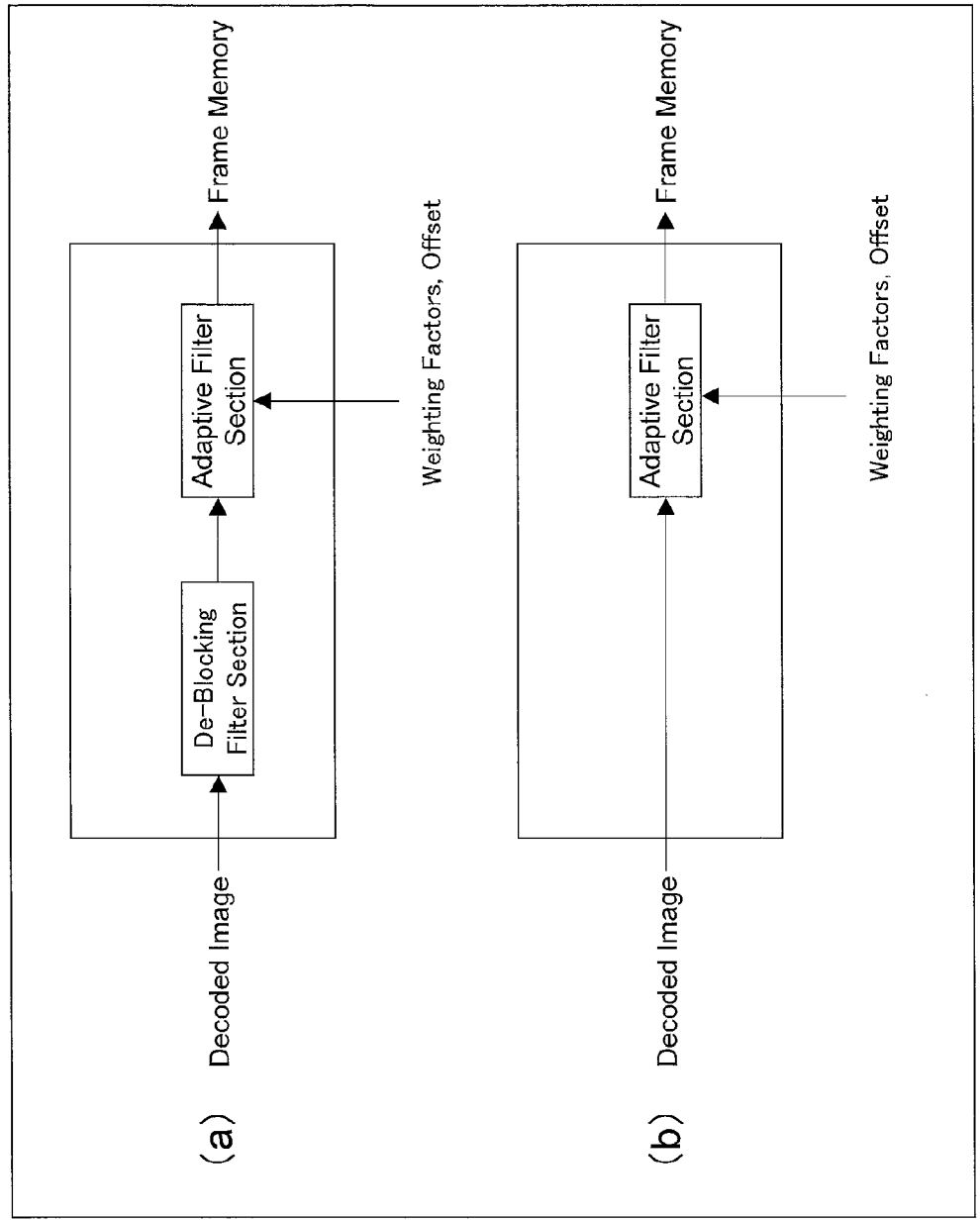
FIG. 17 is a block diagram of a conventional loop filter.

FIG. 17 is a diagram showing configurations of conventional loop filters. Conventional loop filters are classified into two types of loop filters, one of which, as shown in (a) of FIG. 17, causes the adaptive filter to receive an image subjected to a de-blocking filter process (conventional technique 1), and the other one of which, as shown in (b) of FIG. 17, causes the adaptive filter to receive a decoded image (image yet to be subjected to a de-blocking filter process) (conventional technique 2). However, there has been no conventional loop filter that causes the adaptive filter to receive both an image yet to be subjected to a de-blocking filter process and an image subjected to a de-blocking filter process.

(BF Section 301)

The BF section 301 is described in detail here. The BF section 301 is characterized by using values of pixels near a boundary of a block neighboring a target block. One method is a method, as will be described with reference to FIG. 4, for generating pixel values by means of a de-blocking filter process of reducing block noise. Another method is a method, as will be described with reference to FIGS. 5 and 14, for, by using values of pixels near a boundary of a block neighboring a filter target block, an image corresponding to the filter target block.

Figure 6:
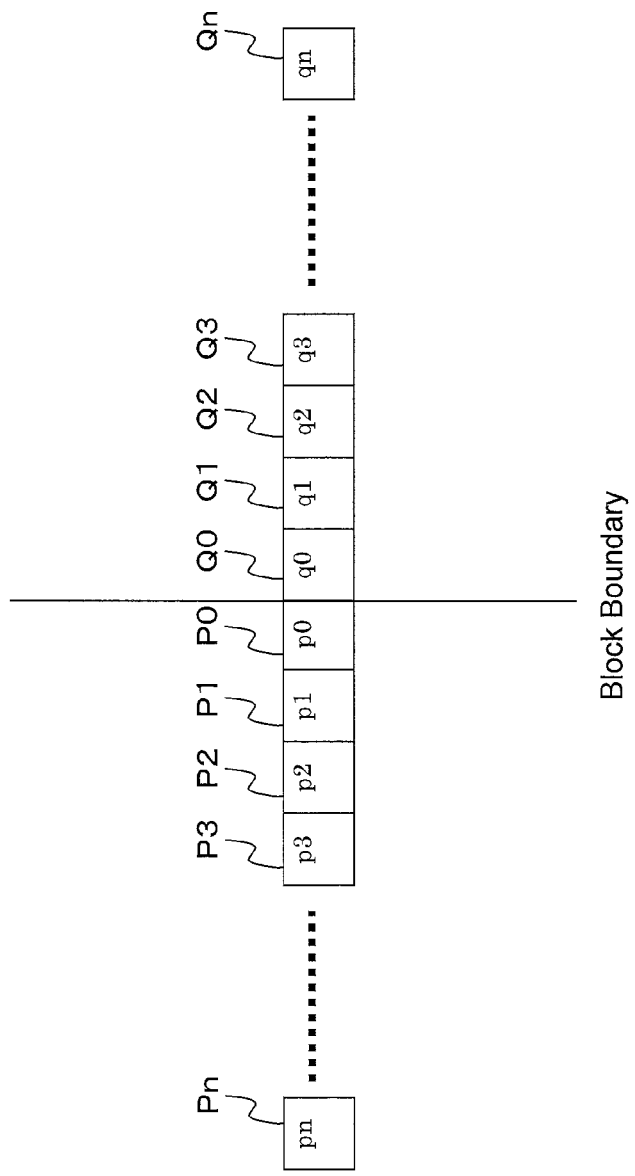
FIG. 6 is an explanatory view of a boundary in the first embodiment of the present invention.

FIG. 6 is a diagram schematically showing pixels around a boundary between blocks. In FIG. 6, those pixels in one of the blocks neighboring each other are referred to as pixels Pi, and those pixels in the other one of the blocks are referred to as pixels Qi (where i is an integer of 0 to n). It should be noted that i in the pixels Pi and Qi is equivalent to the distance from the block boundary.

Further, in FIG. 6, pixel values corresponding to the pixels Pi and Qi are referred to as pixel values pi and qi, respectively, and a post-processing pixel value corresponding to the pre-processing pixel value pk of a processing target pixel Pk is referred to as pk'. It should be noted here that k is an integer that takes on 0 to a value equal to or less than the block size (where k is 0 to n).

That is, in FIG. 6, a pixel value in one of the two blocks neighboring each other at the block boundary is expressed as a pixel value pk (where k is a value that is defined by the distance from the boundary), and a pixel value in the other one of the two blocks is expressed as a pixel value qk (where k is a value that is defined by the distance from the boundary). It should be noted that FIG. 6 does not show whether a boundary line is a horizontal boundary line or a vertical boundary line.

Figure 4:
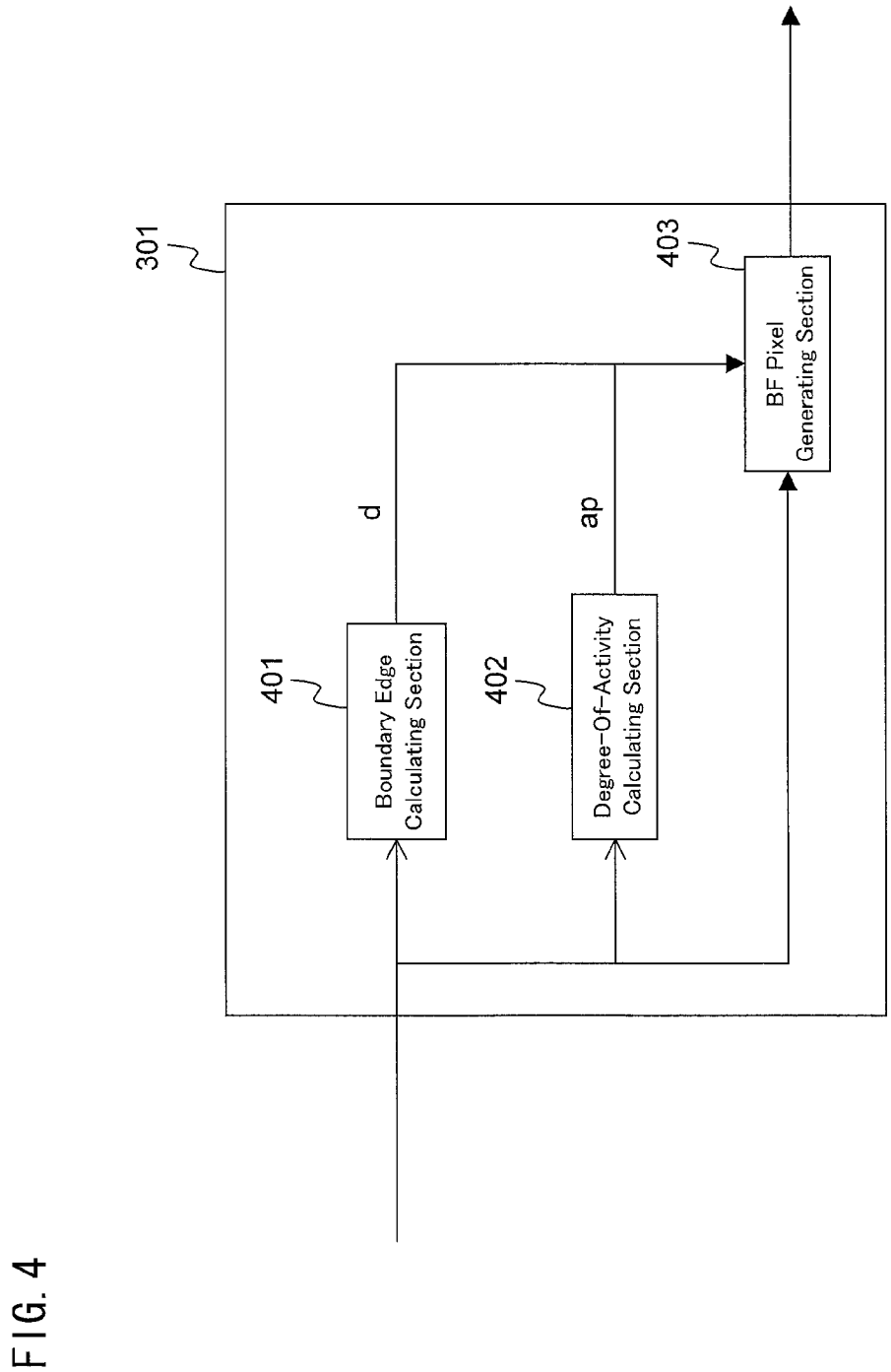
FIG. 4 is a block diagram of a first BF section (BF section 301) according to the first embodiment of the present invention.

FIG. 4 is a diagram showing an internal configuration of a BF section (BF section 301) of a first configuration. The BF section 301 includes a boundary edge calculating section 401, a degree-of-activity calculating section 402, and a BF pixel generating section 403.

The boundary edge calculating section 401 calculates the edge strength d of a boundary according to the following Equation (4-1):

$$d = ABS(p0 - q0) \tag{4-1}$$

The degree-of-activity calculating section 402 calculate a value ap representing a degree of activity according to Equation (4-2) below. The degree of activity is used for calculating the state of unevenness or the magnitude of a gradient in an area near a boundary and a filter target pixel.

$$ap = ABS(p2 - p0) \tag{4-2}$$

If "d" and "ap" thus calculated are d<α and ap<β with respect to predetermined threshold values α and β, the BF pixel generating section 403 carries out the following filtering process:

$$p0'=(p2+2\times p1+2\times p0+2\times q0+q1)/8,$$

$$p1'=(p2+p1+p0+q0)/4, \text{ and}$$

$$p2'=(2\times p3+3\times p2+p1+p0+q0)/8.$$

Otherwise, the BF pixel generating section 403 carries out the following filtering process:

$$p0'=(2\times p1+p0+q0)/4.$$

The BF section 301 carries out the foregoing process on a boundary of a prediction block and a boundary of a transform block. More specifically, the BF section 301 first carries out the process on a vertical boundary line between the prediction block and the transform block, and then carries out a horizontal boundary line between the prediction block and the transform block, thereby yielding a post-BF pixel value xd.

The BF section 301 thus configured can carry out a block noise reduction process with filter strength adjusted so that a strong filter is not applied in a case where an edge strength or a degree of activity on a boundary is great.

It should be noted that the BF section 301 may carry out still another adaptive block noise reduction process. Examples include a difference between an intra block and an inter block, a difference in motion vector length between a target block and a neighboring block, and whether or not residual information of the target block is zero.

In this manner, the BF section 301 carries out a de-blocking filter process of reducing block noise. As the de-blocking filter process, a conventionally common process can be used. For example, a method using DCT or the like can also be used.

It should be noted that the BF section 301 changes processes according to positional relationships with the block boundary. Specifically, the pixels P0, P1, and P2, which are different in distance from the boundary, are subjected to different processes. Further, the BF section 301 uses different processes according to the state of the boundary (edge strength d, degree of activity ap). By providing, for an input signal to the adaptive filter section 302, the BF section 301 that carries out a process appropriate for a positional relationship with the block boundary and a process appropriate for the state of the boundary, control is made possible to carry out a de-blocking strength adjustment adapted to the feature of a sequence or a frame after adaptation to the positional relationship with the block boundary and the state of the boundary, so that the effect of the adaptive filter section 302 can be increased. As compared with a case where weighting factors used by the adaptive filter section 302 are varied according to the positional relationship with the block boundary and the state of the boundary, a coding amount of weighting factors can be reduced. This makes it possible to achieve a de-blocking strength adjusting effect with a small coding amount.

(Second Configuration of BF Section)

Figure 5:
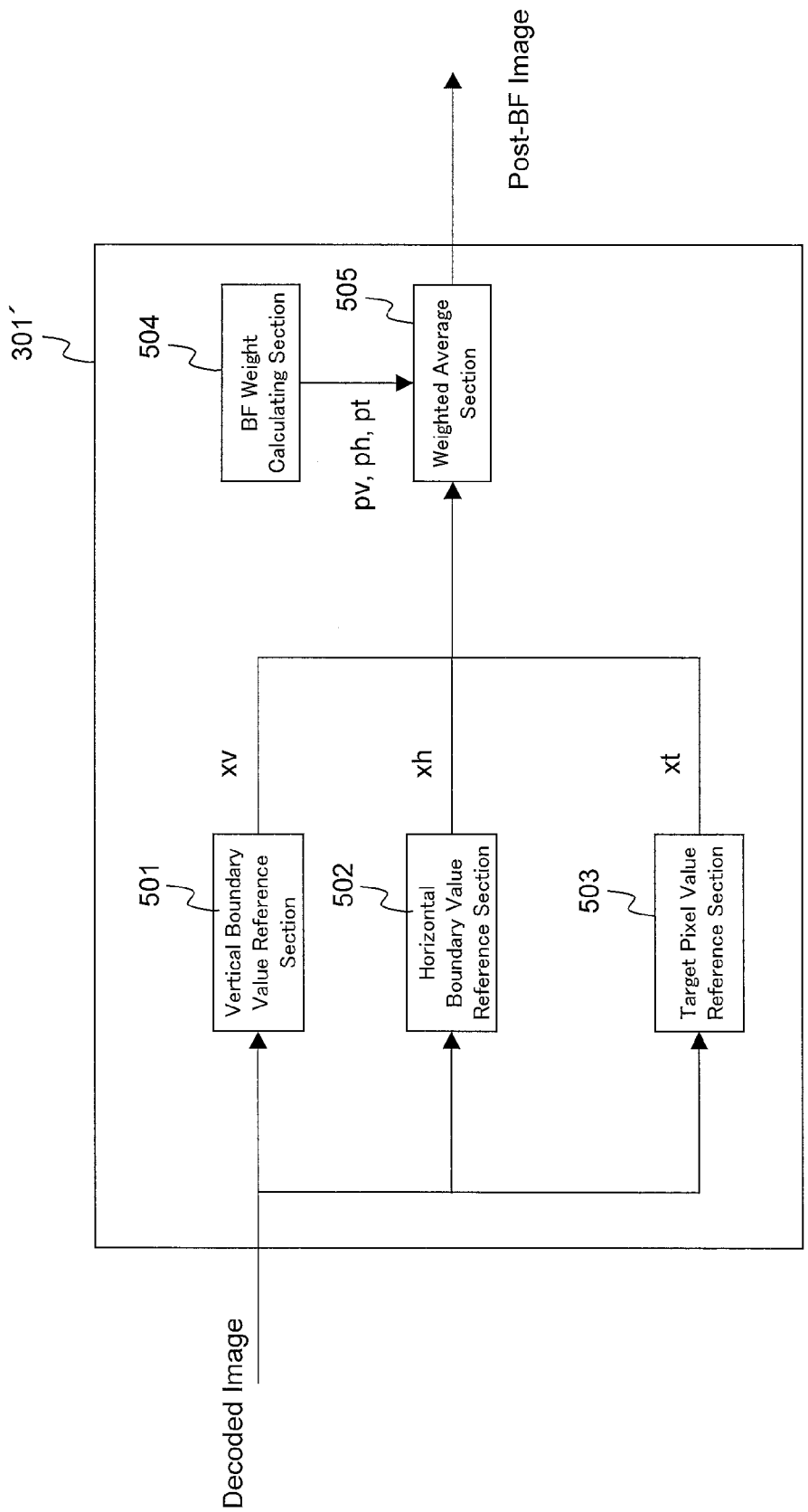
FIG. 5 is a block diagram of a second BF section (BF section 301') according to the first embodiment of the present invention.

FIG. 5 is a diagram showing a second configuration (BF section 301') of the BF section. In this example, the BF section 301 includes a vertical boundary value reference section 501, a horizontal boundary value reference section 502, a target pixel reference section 503, a BF weight calculating section 504, and a weighted average section 505.

Figure 15:
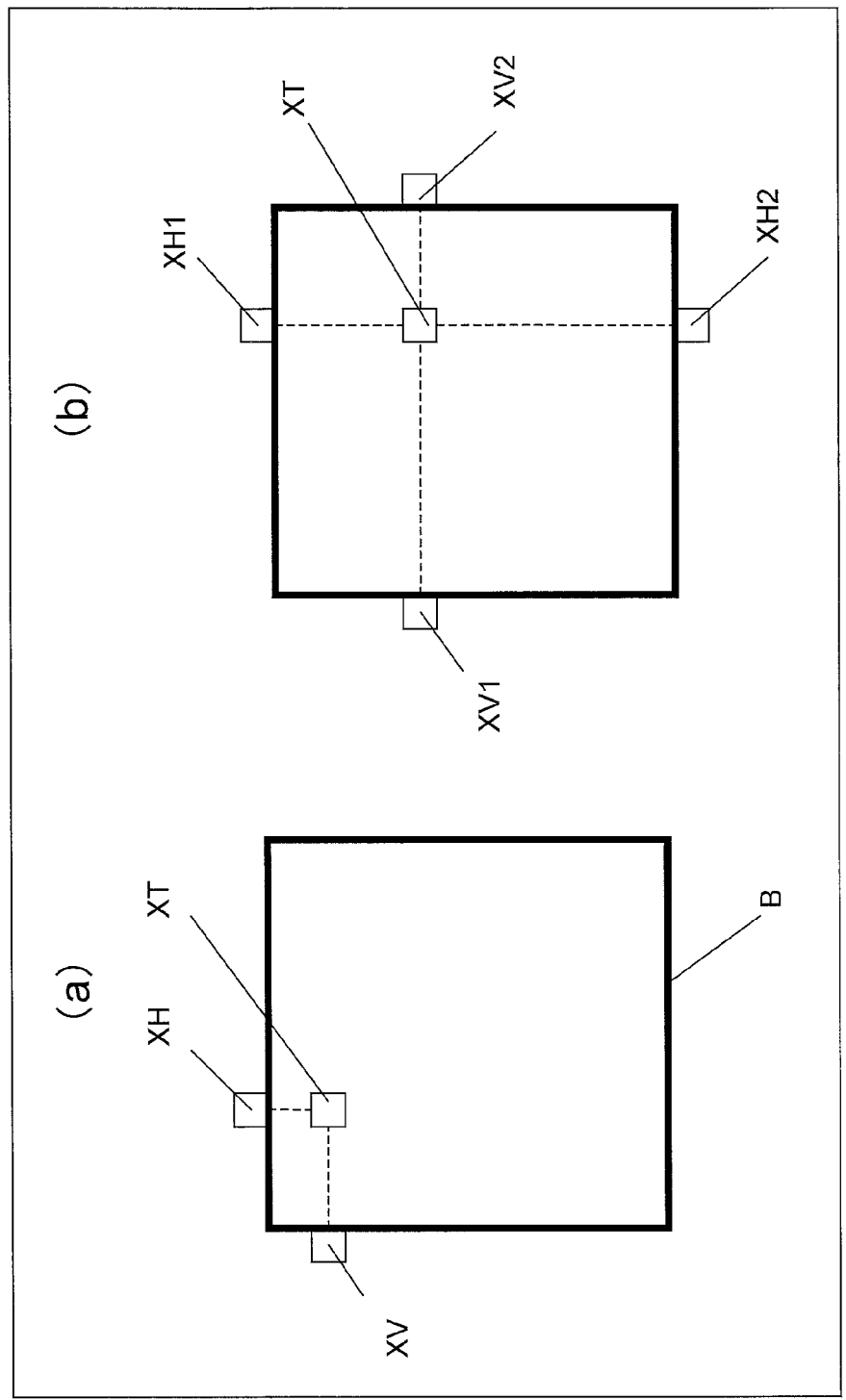
FIG. 15 is a schematic view of pixels referred to by the BF section 301'b according to the first embodiment of the present invention.

FIG. 15 is a schematic view explaining pixels referred to in the processing of the BF section 301'. In (a) of FIG. 15, B indicates a prediction block boundary or a transform block boundary. XT, XV, and XH indicate a filter target pixel, a vertical block boundary pixel, and a horizontal block boundary pixel, respectively. The BF section 301' generates an image by using XT, XV, and XH.

The vertical boundary value reference section 501 refers to a pixel that belongs to a block different from the block to which the filter target pixel belongs and that is at a vertical boundary line closest to the filter target pixel. That is, the vertical boundary value reference section 501 refers to a pixel value of a pixel closest to the filter target pixel among pixels that satisfy the following conditions 1 to 3:

Condition 1. Pixel belonging to a block different from the block to which the filter target pixel belongs;

Condition 2. Pixel having the same X coordinate as the filter target pixel; and

Condition 3. Boundary pixel of a prediction block or a boundary pixel of a transform block.

However, in a case where there are a plurality of pixels closest to the filter target pixel, one of them is selected through a predetermined process (e.g., a pixel with the smallest X and Y coordinates). This pixel serves as the vertical boundary pixel XV, a pixel value of which is denoted as xv.

Similarly, the horizontal boundary value reference section 502 refers to a pixel that belongs to a block different from the block to which the filter target pixel belongs and that is at a horizontal boundary line of a predication block and a transform block closest to the filter target pixel. This pixel serves as the horizontal boundary pixel XH, a pixel value of which is denoted as xh.

The target pixel reference section 503 refers to a pixel value of the filter target pixel XT, a pixel value of which is denoted as xt.

The BF weight calculating section 504 calculates a weight for use in the weighted average section 505 according to the procedures below.

First, the BF weight calculating section 504 calculates a distance Dv between the filter target pixel and the vertical boundary pixel and a distance Dh between the filter target pixel and the horizontal boundary pixel. Next, depending on the size of a transform block as a target block, the BF weight calculating section 504 calculates a weight p (pv or ph) from the distance D (Dv or Dh) according to the following equations:

if the transform block has a size of 4×4, $$p=\text{total}\times 4/8 D=1 (\text{which corresponds to } p0 \text{ in FIG. 6}) \quad (5\text{-}1)$$

$$p=\text{total}\times 1/8 D=2 (\text{which corresponds to } p1 \text{ in FIG. 6});$$

if the transform block has a size of 8×8, $$p=\text{total}\times 4/8 D=1 (\text{which corresponds to } p0 \text{ in FIG. 6})$$

$$p=\text{total}\times 2/8 D=2 (\text{which corresponds to } p1 \text{ in FIG. 6})$$

$$p=\text{total}\times 1/8 D=3 (\text{which corresponds to } p2 \text{ in FIG. 6})$$

$$p=0 D=\text{other; or}$$

if the transform block has a size of 16×16, $$p=\text{total}\times 4/8 D=1 (\text{which corresponds to } p0 \text{ in FIG. 6})$$

$$p=\text{total}\times 3/8 D=2 (\text{which corresponds to } p1 \text{ in FIG. 6})$$

$$p=\text{total}\times 2/8 D=3 (\text{which corresponds to } p2 \text{ in FIG. 6})$$

$$p=\text{total}\times 1/8 D=4 (\text{which corresponds to } p3 \text{ in FIG. 6})$$

$$p=0 D=\text{other.}$$

For the calculation on the vertical boundary line, D reads Dv and p reads pv, and for the calculation on the horizontal boundary line, D reads Dh and p reads ph. The term "total" represents a value that is used for converting a value into an integer, and preferably takes on a value of approximately 256 (same applies below).

According to this weight calculation, an adjustment is made so that the weight becomes smaller with distance from the boundary.

Further, the BF weight calculating section 504 calculates a weight pt according to Equation (5-2):

$$pt = (total - ph - pv) \quad (5\text{-}2).$$

The weighted average section 505 calculates the pixel value xd of a post-BF image from the weighted average of the weights pt, pv, and ph calculated by the BF weight calculating section 504, the filter target pixel value xt, the vertical boundary pixel value xv, and the horizontal boundary pixel value xh. This calculation is carried out according to Equation (5-3):

$$xd = \{pt \times xt + pv \times xv + ph \times xh + total2\} >> shift \quad (5\text{-}3).$$

The symbol ">>" indicates a rightward shift. The term "total" represents 1<<shift, and the term "total2" represents total/2. The symbol "<<" indicates a leftward shift.

The term "shift" preferably takes on a value of approximately 8. This equation applies to a case where the calculation is carried out by integer arithmetic processing. In the case of decimal arithmetic, the calculation is carried out according to the equation below. In the case of decimal arithmetic, the BF weight calculating section 504 uses total=1.

$$xd = pt \times xt + pv \times xv + ph \times xh \quad (5\text{-}4)$$

The second BF section 301' carries out the foregoing process on a boundary of a prediction block and a boundary of a transform block.

Further, in calculating the weights according to Equation (5-1) and its subsequent equations, total may be replaced by a value such as total×4.

$$p = total \times 4/8 \, D = 1 \text{(which corresponds to } p0 \text{ in FIG. 6)}$$

In this case, the BF weight calculating section 504 calculates the weight pt not according to Equation (5-2) but according to Equation (5-6):

$$pt = (total \times 4 - ph - pv) \quad (5\text{-}6).$$

This makes the dynamic range of a post-BF pixel and four times as large and accordingly makes it possible to use a high-precision post-BF image in the adaptive filter section 302. Since the weighting factors in the adaptive filter section 302 are of fixed-point decimal precision (attained by multiplying decimal accuracy by total and converting the product into an integer) and use precision equal to or higher than integer precision, the value of a high-precision reference image can be effectively utilized. Therefore, an enlargement of the dynamic range of a post-BF image leads to an improvement in coding distortion reduction.

Furthermore, in calculating the weight pt, Equation (5-2) may be replaced by an equation which satisfies ph+pv+pt=0, as in the following Equation (5-7):

$$pt = -(ph + pv) \quad (5\text{-}7).$$

Further, in this case, it is more appropriate to calculate the post-BF pixel value according to Equation (5-8):

$$xd = clip(-127, 128, pt \times xt + pv \times xv + ph \times xh) \quad (5\text{-}8),$$

where clip(x,y,z) indicates an arithmetic operation of clipping z to not less than x and to not more than y.

Pixels close in position to one another often take on values close to one another (xv≈xh≈xt). However, in a case where ph+pv+pt=0, i.e., the sum of weights on the pixels is 0, the weighted average takes on a value close to 0. In this case, the dynamic range of pixel values becomes smaller figuratively in accordance with the amount of correction to the pixel values or the difference among the pixel values.

This makes it possible to suppress the dynamic range of a post-BF image even in a case where the dynamic range is enlarged by increasing the weights as in the case of total×4 instead of total, so that the post-BF image can be stored with a few bits (8 bits here, −128 to 127). This makes it possible to reduce the memory capacity of a temporary buffer as required when the post-BF image is held in the temporary buffer.

(Third Configuration of a BF Section)

Figure 14:
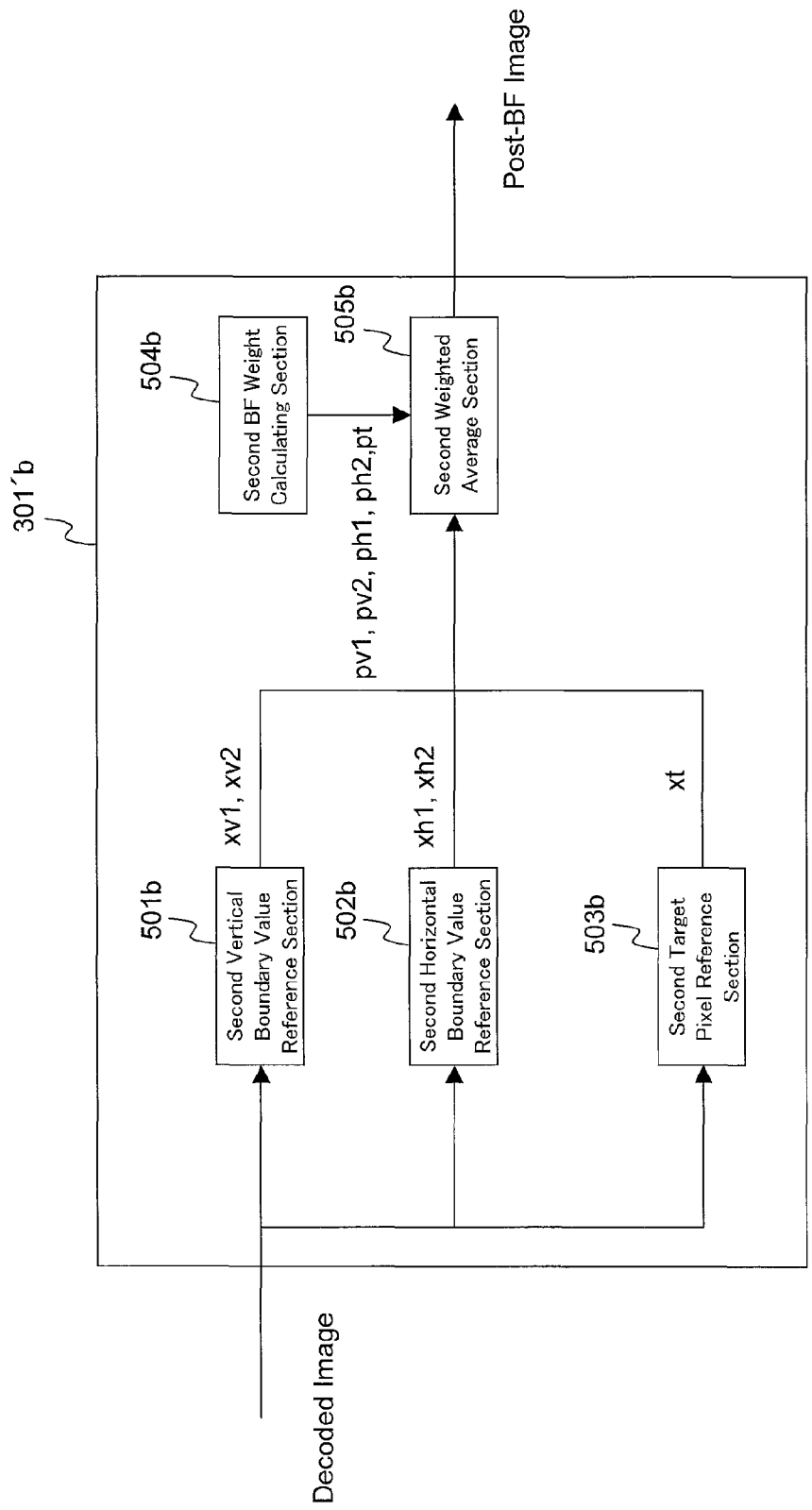
FIG. 14 is a block diagram of a third BF section (BF section 301'b) according to the first embodiment of the present invention.

FIG. 14 is a block diagram showing a third configuration (BF section 301'b) of the BF section. In this example, the BF section 301'b includes a second vertical boundary value reference section 501b, a second horizontal boundary value reference section 502b, a second target pixel reference section 503b, a second BF weight calculating section 504b, and a second weighted average section 505b.

(b) of FIG. 15 is a schematic view explaining pixels referred to in the processing of the BF section 301'b. In (b) of FIG. 15, B indicates a prediction block boundary or a transform block boundary. XT indicates a filter target pixel, XV1 and XV2 indicate vertical block boundary pixels, and XH1 and XH2 indicate horizontal block boundary pixels. The BF section 301'b generates a post-BF image with reference to the target pixel XT per se and the boundary pixels XV1, XV2, XH1, and XH2 of the neighboring blocks.

The second vertical boundary value reference section 501b refers to two pixels at vertical boundary lines that lie on either side of a filter target pixel. These pixels serve as the vertical block boundary pixels XV1 and XV2, pixel values of which are referred to as xv1 and xv2, respectively.

Similarly, the second boundary value reference section 502b refers to two pixels at horizontal boundary lines that lie above and below the filter target pixel. These pixels serve as the horizontal block boundary pixels XH1 and XH2, pixel values of which are referred to as xh1 and xh2, respectively.

The second target pixel reference section 503b refers to the pixel value of a filter target pixel. This pixel serves as the filter target pixel XT, a pixel value of which is denoted as xt.

The second BF weight calculating section 504b calculates weights pt, pv1, pv2, ph1, and ph2 for use in the second weighted average section 505b according to the procedures below.

First, the second BF weight calculating section 504b calculates a distance Dv1 between the filter target pixel XT and the vertical boundary pixel XT1 and a distance Dv2 between the filter target pixel XT and the vertical boundary pixel XT2, and further calculates a distance Dh1 between the filter target pixel XT and the vertical boundary pixel XV1 and a distance Dh2 between the filter target pixel XT and the vertical boundary pixel XV2. Next, depending on the size of a transform block as a target block, the second BF weight calculating section 504b calculates the weights pv1, pv2, ph1, and ph2 from the distances Dv1, Dv2, Dh1, and Dh2 according to the following equations:

if the transform block has a size of 4×4, $$p = total \times 1/(D \times 2) \quad (5\text{-}9);$$

if the transform block has a size of 8×8, $$p = total \times 2/((D+1) \times 2); \text{ or}$$

if the transform block has a size of 16×16, $$p = total \times 4/((D+3) \times 2).$$

For the calculation on the vertical boundary, D reads Dv1 and Dv2 and p reads pv1 and pv2, and for the calculation on the horizontal boundary line, D reads Dh1 and Dh2 and p reads ph1 and ph2.

According to this weight calculation, an adjustment is made so that the weight becomes smaller with distance from the boundary.

Further, the second BF weight calculating section 504b calculates a weight pt according to the following equation:

$$pt=(\text{total}-ph1-pv1-ph2-pv2).$$

Alternatively, by using total×4 instead of total in calculating the weights pv1, pv2, ph1, and ph2 according to Equation (5-9) and its subsequent equations, the second BF weight calculating section 504b calculates the weight pt according to the following equation:

$$pt=(\text{total}\times 4-ph1-pv1-ph2-pv2).$$

This yields a high-precision post-BF image.

Alternatively, in terms of suppressing the dynamic range of a post-BF image xd, it is appropriate to calculate the weight pt according to Equation (5-10) below so that the sum of the weights of the pixels is 0.

$$pt=-(ph1+pv1+ph2+pv2) \qquad (5\text{-}10).$$

The second weighted average section 505b calculates the pixel value x' of a post-BF image from the weighted average of the weights pt, pv1, pv2, ph1, and ph2 calculated by the second BF weight calculating section 504, the filter target pixel value xt, the vertical boundary pixel values xv1 and xv2, and the horizontal boundary pixel values xh1 and xh2. This calculation is carried out according to Equation (5-11):

$$xd=\{pt\times xt+pv1\times xv1+pv2\times xv2+ph1\times xh1+ph2\times xh2+total2\}>>shift \qquad (5\text{-}11).$$

Further, it is more preferable to limit the dynamic range of weights to the range of values of a decoded image. Since the dynamic range ranges from 0 to 255 in a case where the bit depth of a decoded image is 8, the range of xd is limited according to the following equation:

$$xd=\text{clip}(0,255,xd).$$

Further, in a case where Equation (5-10) is used for the calculation of the weight pt, the dynamic range of the post-BF image xd can be suppressed. In order to further reduce the memory for storing the post-BF image therein, it is preferable to carry out further clipping as indicated below so that the post-BF image can be surely stored with a predetermined bit width.

$$xd=\text{clip}(-127,128,xd).$$

The BF section is not limited to the foregoing process, but needs only carry out a process of calculating pixel values to be referred to by the adaptive filter, by using values of pixels near a boundary of a block neighboring a target block.

For example, the BF section may carry out a process of enlarging the dynamic range of a de-blocking filter process.

More specifically, the BF pixel generating section 403 of the BF section 301 as shown in FIG. 4 may be replaced by a BF pixel generating section 403'. If "d" and "ap" inputted to the BF pixel generating section 403' are d<a and ap<β with respect to the predetermined threshold values α and β, the BF pixel generating section 403' carries out the following filtering process:

$$p0'=(p2+2\times p1+2\times p0+2\times q0+q1),$$

$$p1'=(p2+p1+p0+q0)\times 2,$$

$$p2'=(2\times p3+3\times p2+p1+p0+q0)\times 2.$$

Otherwise, the BF pixel generating section 403' carries out the following filtering:

$$p0'=(2\times p1+p0+q0)\times 2.$$

It should be noted that the values of pixels in a portion on which the foregoing process is not carried out are also eight times as large.

By thus enlarging the dynamic range of pixel values (an eightfold enlargement as compared with 403), elimination of a rounding process by a division (/8) that occurs in the filtering process is achieved, so that the precision of the de-blocking filter process can be improved. Finally, the adaptive filter section 302 carries out a process of returning the dynamic range of pixel values to the original range. Since the weighting factors in the adaptive filter section 302 are of fixed-point decimal precision and use precision equal to or higher than integer precision, the value of a high-precision reference image can be effectively utilized. Therefore, an enlargement of the dynamic range of a post-BF image leads to an improvement in coding distortion reduction.

Further, the BF section may carry out another process by using the difference between the input and output of a de-blocking filter process, i.e., the amount of correction to an input signal in a block noise reduction process. More specifically, in a case where the input and output of a de-blocking filter process are expressed as IN and BF, respectively, the BF section may use a process of outputting an image a pixel value of which is a value ABF represented by the following equation:

$$\Delta BF=BF-IN.$$

More specifically, the BF pixel generating section 403 of the BF section 301 as shown in FIG. 4 may be replaced by a BF pixel generating section 403". If "d" and "ap" inputted to the BF pixel generating section 403" are d<α and ap<β with respect to the predetermined threshold values α and β, the BF pixel generating section 403" carries out the following filtering process:

$$p0'=\text{clip}(-127,128,(p2+2\times p1+2\times p0+2\times q0+q1)-8\times p0),$$

$$p1'=\text{clip}(-127,128,(p2+p1+p0+q0)\times 2-8\times p1), \text{ and}$$

$$p2'=\text{clip}(-127,128,(2\times p3+3\times p2+p1+p0+q0)\times 2-8\times p2).$$

Otherwise, the BF pixel generating section 403" carries out the following filtering:

$$p0'=\text{clip}(-127,128,(2\times p1+p0+q0)\times 2-8\times p0).$$

It should be noted that the values of pixels in a portion on which the foregoing process is not carried out are 0.

This makes it possible to suppress the dynamic range of a post-BF image even in a case where the dynamic range is enlarged by using, as a post-BF image, an image composed of the amount of correction in a de-blocking filter process instead of an image subjected to the de-blocking filter process, so that the post-BF image can be stored with a few bits (8 bits here, −128 to 127). This makes it possible to reduce the memory capacity of a temporary buffer as required when the post-BF image is held in the temporary buffer.

Further, as opposed to a de-blocking filter process, it is possible to use a process of enhancing block noise. For example, the BF section may use a process of outputting an image a pixel value of which is a value ABF represented by the equation:

$$\Delta BF'=(BF-IN)\times 2+IN.$$

Since the inverse operation of the process of enhancing block noise is block noise reduction, even an appropriate block noise-enhancement filter can bring about a block noise reducing effect and a de-blocking strength adjusting effect by weighting of the adaptive filter section 302.

Since those pixels belonging to blocks (neighboring blocks) different from a processing target block have different characteristics from those belonging to the processing target block due to difference in prediction or in transform. By using, as input signals to the adaptive filter section 302, pixel values of such pixels having different characteristics, an increase of distortion reducing effect can be achieved. Each of the BF sections 301' and 301'b serves to generate reference pixels for an adaptive filter target pixel by using values of pixels in neighboring blocks, and means preparing input signals of different characteristics.

Furthermore, each of the BF sections 301' and 301'b changes processes according to positional relationships with a block boundary. In order for each of the BF sections 301' and 301'b to carry out different processes according to positional relationships, the adaptive filter section 302 requires different sets of weighting factors for each position, which means an increase in the number of weighting factors. By providing the BF section for an input signal to the adaptive filter section 302, the BF section can be made responsible for a process according to a positional relationship with a block boundary. This makes it possible to apply the adaptive filter section 302 according to a positional relationship with a boundary without encoding a large number of weighting factors.

Further, each of the BF sections 301' and 301'b refers to pixels at and near a boundary. Since a process of approximating to a boundary pixel value generally leads to block noise reduction, this configuration can bring about a block noise reducing effect (or, conversely, the block noise reducing effect can be weakened by getting further from a boundary pixel value). The use of a post-BF image as input to the adaptive filter section 302 allows the adaptive filter to adjust the strength of block noise reduction (that is, to bring about a de-blocking strength adjusting effect).

Even in the case of an adaptive filter including no BF section, reference is made to a pixel near a boundary when there is a filter target pixel near the boundary. However, how reference is made varies depending upon the positional relationship between the filter target pixel and the boundary. Therefore, for a variation in weight of a pixel near the boundary, it is necessary to use different weighting factors according to the positional relationship with the boundary. However, this causes an increase in coding amount of weighting factors. The present patent uses the BF section to explicitly refer to a pixel near a boundary with a weight assigned in view of a positional relationship with the boundary, thereby bringing about a de-blocking strength adjusting effect with a small coding amount.

(Adaptive Filter Section 302)

Figure 7:
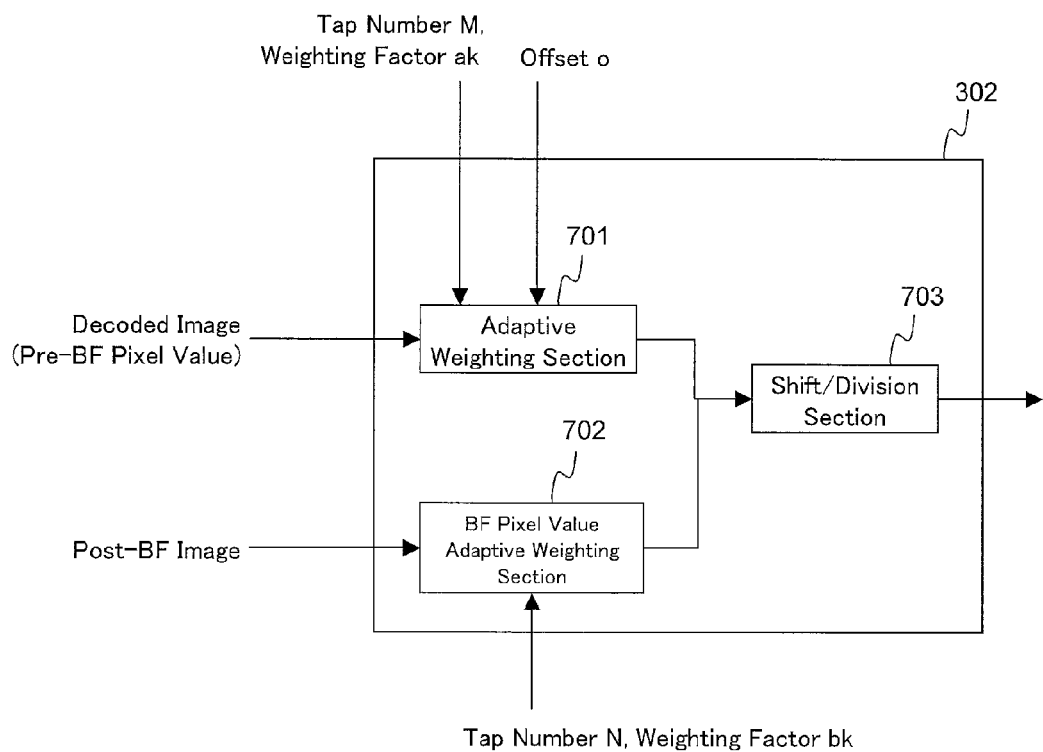
FIG. 7 is an explanatory view of an adaptive filter section 302 according to the first embodiment of the present invention.

The adaptive filter section 302 is described here in detail with reference to FIG. 7. The adaptive filter section 302 includes an adaptive weighting section 701, a post-BF pixel value adaptive weighting section 702, and a shift/division section 703. The adaptive weighting section 701 carries out a filtering process by using the tap number M, the weighting factor ak (k=0 to (M×M+1)/2−1), and a decoded image inputted from the frame memory 117. The post-BF pixel value adaptive weighting section 702 carries out a filtering process by using the tap number N, the weighting factor bk (k=0 to (N×N+1)/2−1), and a decoded image inputted from the BF section 301.

The adaptive filter section 302, as a whole, carries out a filtering process expressed by Equation (7-1):

$$x'(x,y)=(\Sigma a(i,j) \times x(x+i,y+j)+\Sigma b(i,j) \times xd(x+i,y+j)+o+total2)>>shift \quad (7\text{-}1),$$

where x(x,y) is a pre-BF pixel value, xd(x,y) is a post-BF pixel value, and x'(x,y) is a post-adaptive-filter pixel value. Assuming that (x,y) is the position of a filter target pixel in a frame, the w is the width of the frame, and that h is the height of the frame, $0 \leq x \leq w-1$ and $0 \leq y \leq h-1$. Further, (i,j) indicates a position relative to the position (x,y) of the filter target pixel. a(i,j) and b(i,j) are a weighting factor applied to a pre-BF pixel value corresponding to the relative position (i,j) and a weighting factor applied to a post-BF pixel value corresponding to the relative position (i,j), respectively. o is an offset, and shift is a shift value according to which a division is executed. Further, $\Sigma$ in the first term means an arithmetic operation of working out the sum of −M to M for each of i and j of (i,j), and $\Sigma$ in the second term means an arithmetic operation of working out the sum of −N to N for each of i and j of (i,j).

(Indices of Weighting Factors)

The following gives a description of a relationship between the weighting factor ak (k=0 to (M×M+1)/2−1) indicated in a one-dimensional index and the weighting factor a(i,j) indicated in a two-dimensional index as obtained by decoding coded data and stored in the adaptive filter information storage section 119. First, from the two-dimensional index (i,j), k0 is calculated according to the following equation, and then the one-dimensional index k is given by calculating k from k0:

$$k0 = (i+ofst)+(j+ofst) \times M,$$

where ofst=M/2, i=−M/2 to M/2, and j=−M/2 to M/2.

$$k = k0 \qquad (k0 < (M \times M + 1)/2)$$
$$= (M \times M - 1) - k0 \quad (\text{other})$$

Hereinafter, in an arithmetic operation indicated as a(i,j), ak is used which is represented with use of the value k after transform from the two-dimensional index (i,j) to the one-dimensional index k.

The same applies to a relationship between the one-dimensional weighting factor bk (k=0 to (N×N+1)/2−1) and the two-dimensional weighting factor b(i,j), k0 is calculated according to the following equation, and then the one-dimensional index k is given by calculating k from k0:

$$k0 = (i+ofst)+(j+ofst) \times N,$$

where ofst=N/2, i=−N/2 to N/2, i=−N/2 to N/2.

$$k = k0 \qquad (k0 < (N \times N + 1)/2)$$
$$= (N \times N - 1) - k0 \quad (\text{other})$$

Hereinafter, in an arithmetic operation indicated as b(i,j), bk is used which is represented with use of the value k after transform from the two-dimensional index (i,j) to the one-dimensional index k.

The adaptive filter section 302 carries out a process according to Equation (7-1), which is explained above, by using the adaptive weighting section 701, the post-BF pixel value adaptive weighting section 702, and the shift/division section 703.

The adaptive weighting section 701 executes the first term of Equation (7-1) and the addition of the offset, i.e., executes the following equation:

$$\Sigma a(i,j) \times x(x+i, y+j) + o.$$

The post-BF pixel value adaptive weighting section 702 executes the second term of Equation (7-1), i.e., execute the following arithmetic operation:

$$\Sigma b(i,j) \times xd(x+i, y+j).$$

The shift/division section 703 executes a division rdiv(x) by a shift operation with rounding. Assuming that x is the input signal, the division rdiv(x) can be expressed by the following function:

$$r\,\mathrm{div}(x) = (x + \mathrm{total2}) >> \mathrm{shift}.$$

Such an adaptive filter process makes it possible to effectively reduce distortion by a spatial weighting operation of both a pre-BF pixel value and a post-BF pixel value.

(Case Where M=1)

For example, when the tap number M of the adaptive filter to a pre-BF pixel value is 1, Equation (7-1) is simplified as Equation (7-2) below, but the distortion reducing effect and de-blocking strength adjusting effect by a spatial filter can be obtained.

$$x'(x,y) = (a(0,0) \times x(x,y) + \Sigma b(i,j) \times xd(x+i, y+j) + o + \mathrm{total2}) >> \mathrm{shift} \quad (7\text{-}2)$$

(Case Where N=1)

Further, when the tap number N of the adaptive filter to a post-BF pixel value is 1, Equation (7-1) is simplified as Equation (7-3) below, but the distortion reducing effect and de-blocking strength adjusting effect by a spatial filter can be obtained.

$$x'(x,y) = (\Sigma a(i,j) \times x(x+i, y+j) + b(0,0) \times xd(x,y) + o + \mathrm{total2}) >> \mathrm{shift} \quad (7\text{-}3)$$

At this point in time, the post-BF pixel value adaptive weighting section 702 operates after all according to Equation (7-4):

$$b \times xd(x,y) \quad (7\text{-}4).$$

Since Equation (7-4) is a mere multiplication, the amount of calculation by the post-BF pixel value adaptive weighting section 702 is small.

Further, limiting the range of pixels after BF (here limiting to N=1) makes it possible to reduce the reference range of decoded pixels that are collectively referred to in a loop filter process of a certain pixel (as will be described later). This brings about the effect of reducing the amount of data transfer from the frame memory (as will be described later). Further, this configuration, in which the calculation of pre-BF pixel values occupies a large part of the adaptive filter process, brings about the effect of improving parallelism described later.

Since, in Equation (7-4), the weighting calculation of post-BF pixel values is simplified as a simple multiplication, the process can be carried out with multiplication means that is simpler than weighting means.

Figure 16:
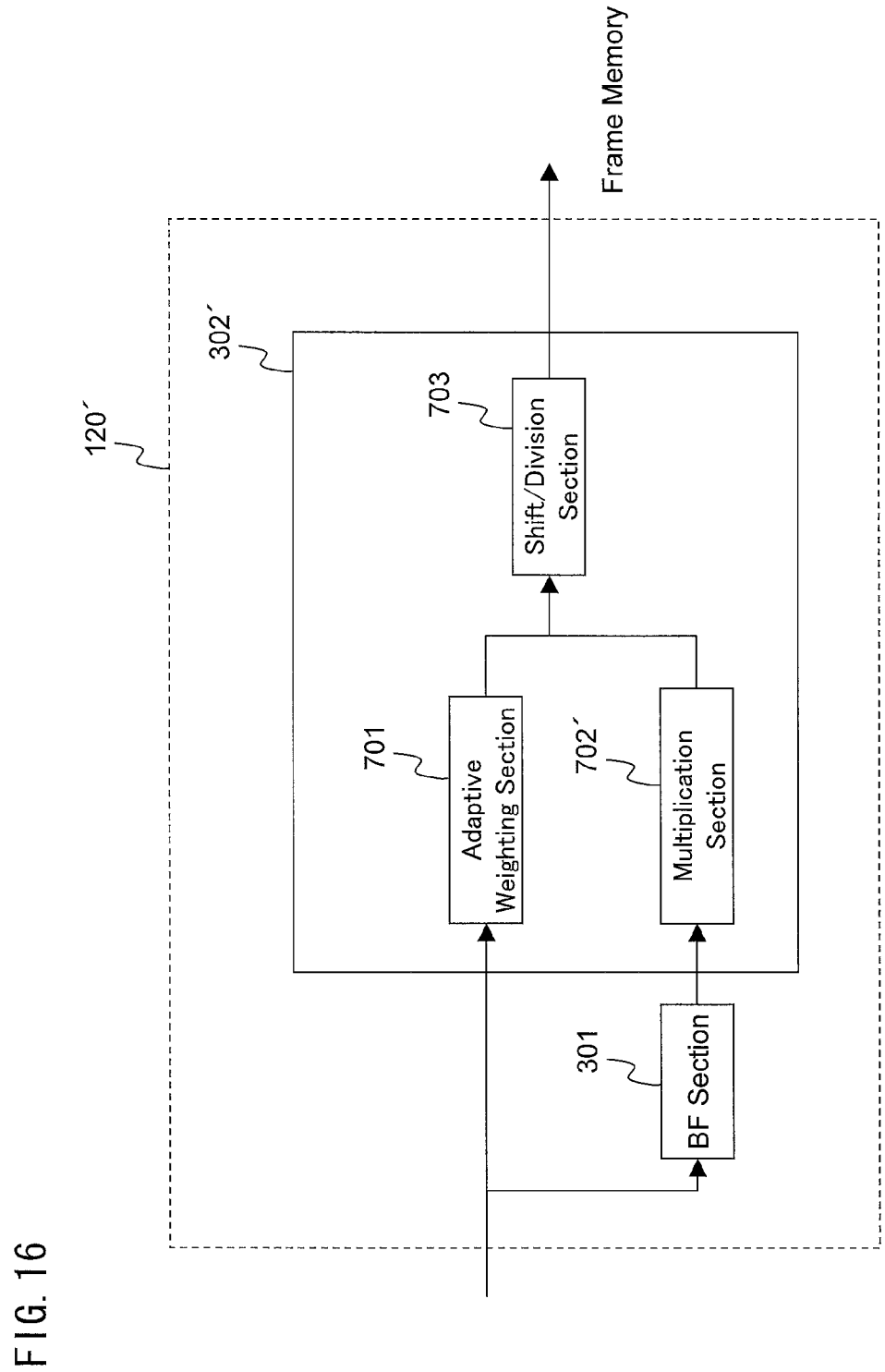
FIG. 16 is a block diagram of a loop filter section 120' according to the first embodiment of the present invention.

FIG. 16 is a block diagram showing a configuration of the loop filter section 120 in a case where N=1 (such a loop filter section 120 being hereinafter referred to as "loop filter section 120"). As shown in FIG. 16, the loop filter section 120 includes a multiplication section 702' that carries out only weighting for a single pixel serving as a post-BF pixel, instead of including the post-BF pixel value adaptive weighting section 702. That is, for a loop filter process of a single pixel (adaptive filter process of a single pixel), only a single pixel is referred to as a post-BF pixel. Use of the multiplication section 702' eliminates the need to input the tap number N, and it only necessary to input a single weighing factor b. Since this configuration has a special effect, the adaptive filter section 302 including the multiplication section 702' is called an adaptive filter section 302', and a loop filter including the adaptive filter section 302' is called a loop filter 120'. Furthermore, a moving image decoder 1 including the loop filter 120' is called a moving image decoder 1'.

(Case Where M=N=1)

In a case where M=N=1, Equation (7-1) further simplified as Equation (7-5):

$$x'(x,y) = (a \times x(x,y) + b \times xd(x,y) + o + \mathrm{total2}) >> \mathrm{shift} \quad (7\text{-}5).$$

In this case, the de-blocking strength adjusting effect can be obtained with just three weighting factors a, b, and o. Further, since these are not threshold values but weighting factors, an optimum value can be calculated by the least-squares method, which allows a small amount of computation.

Further, with use of restrictions a+b=1 and o=0, Equation (7-1) can also be simplified as Equation (7-6):

$$x'(x,y) = (a \times x(x,y) + (\mathrm{total} - a) \times xd(x,y) + \mathrm{total2}) >> \mathrm{shift} \quad (7\text{-}6).$$

In this case, the de-blocking strength adjusting effect can be obtained with a single weighting factor a.

Further, it is appropriate to use M=N=1 in cases other than such a simplified configuration, e.g., in a case where there is no need for a spatial distortion reducing effect by a sequence, a picture, or a slice or in a case where there is particular need to reduce the amount of computation. Since it is possible to further reduce the amount of computation in a case where M=0 or in a case where N=0, a process in a case where M=0 or in a case where N=0 is not particularly excluded. In this case, no corresponding weighting factor is inputted, but an operation needs only be done with a weighting factor being equal to 0. In this process, the adaptive weighting section 701 outputs an offset, and the post-BF pixel value adaptive weighting section 702 simply outputs zero.

(De-Blocking Strength Adjusting Effect)

First, a description is given with reference to a simple case where M=N=1. Equation (7-5) can be transformed, for example, as follows:

$$x' = c1 \times xd - c2 \times (xd - x) \quad (7\text{-}7)$$

where c1=(a+b)>>shift and c2=a>>shift. Further, the offset o and the position (x,y) are omitted from mention. Since it is experimentally known that (a+b)>>shift takes on substantially 1, Equation (7-7) can be further transformed into Equation (7-8):

$$x' = xd - c2 \times (xd - x) \quad (7\text{-}8)$$

where xd−x represents the amount of correction of x through the BF process. Therefore, c2>0 where c2 is multiplied by xd−x means weakening the correction, while c2<0 means strengthening the correction. Thus, with a relationship between a weighting factor applied on the pre-BF pixel value and a weighting factor applied on the post-BF pixel value, it is possible to bring about a de-blocking strength adjusting effect.

It should be noted that when M>1 or N>1, the configuration with a further increased flexibility can be provided than when M=N=1, and it is therefore possible to bring about the de-blocking strength adjusting effect brought about by the configuration with the relation of M=N=1.

(Effect Determination Experiment)

Figure 12:
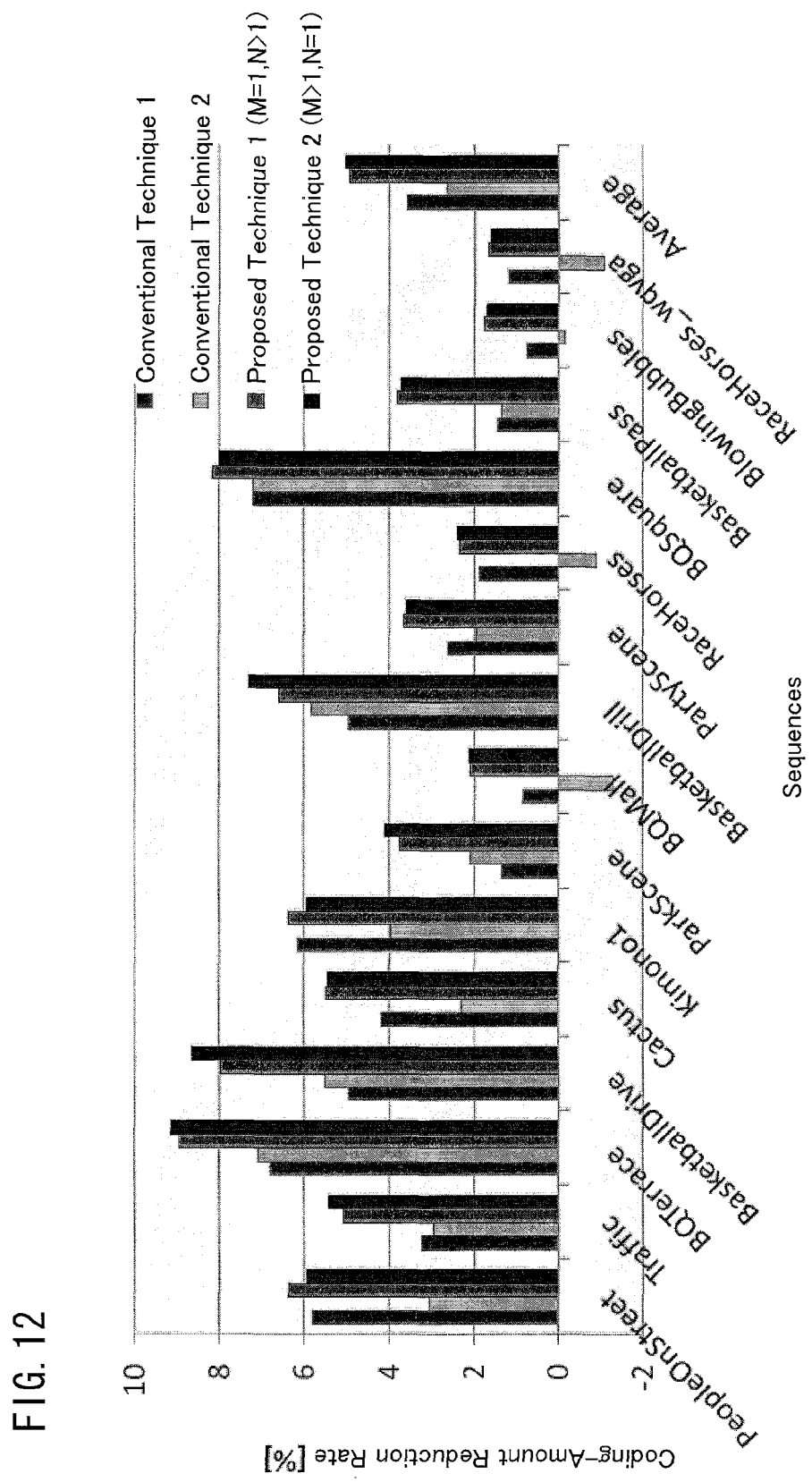
FIG. 12 is a view showing a result of effect determination experiment in the first embodiment of the present invention.

FIG. 12 shows a study concerning coding efficiencies obtained when the loop filter applying a spatial adaptive filter on a pixel value subjected to a de-blocking process (conventional technique 1 in (a) of FIG. 17), the loop filter applying a spatial adaptive filter on a pixel value yet to be subjected to a de-blocking process (conventional technique 2 in (b) of FIG. 17), the loop filter when M=1 and N>1 (proposed technique 1), and the loop filter when M>1 and N=1 (proposed technique 2) are each practically incorporated into the moving image decoder 1 and the moving image encoder 2. As a control for comparison, a loop filter including no adaptive filter (loop filter including a BF section only) is used. The coding efficiency is assessed based on the extent (rate) of reduction in coding amount (referred to as BDRATE) on the assumption that a SN ratio is constant, by using the SN ratio and the coding amount measured in a case where encoding is made with four quantization parameters. It can be said that the effect of increasing coding efficiency enhances with an increase in coding-amount reduction rate.

It should be noted that details of how to calculate the BDRATE are described in the following document:

G. Bjontegaard, "Calculation of average PSNR differences between RD-Curves," ITU-T Q.6/SG16 Doc., VCEG-M33, Austin, April 2001.

As apparent from FIG. 12, both the proposed techniques 1 and 2 offer performances higher than the conventional techniques 1 and 2. In addition, the case where a spatial adaptive filter is applied on a pixel value yet to be subjected to a de-blocking process (conventional technique 2, equivalent to the case where M>1 and N=0) often presents performances lower than the case where a spatial adaptive filter is applied on a pixel value subjected to a de-blocking process (conventional technique 1, equivalent to the case where M=0 and N>1).

However, the proposed technique 2 (M>1 and N=1) delivers a performance higher than the conventional technique 1 in which the spatial adaptive filter is applied on a pixel value subjected to a de-blocking process, although the proposed technique 2 is a technique in which a pixel referred for a pixel value is limited to one pixel and in which the spatial adaptive filter is applied on a pixel value yet to be subjected to a de-blocking process. This means that it is possible to bring about an adequate effect even when the reference range for a post-BF pixel value subjected to a BF process is limited in the adaptive filter. The moving image decoder 1' of this configuration can maximize the effects of reducing a reference range of decoded pixels, reducing the amount of data transfer from the frame memory, and improving parallelism, as well as increasing coding efficiency.

(Explanation of Parallel Processing)

Currently, a CPU and an integrated circuit generally have a plurality of computing sections. Therefore, it is an important point whether parallelism is high concerning the capability of carrying out processes in parallel with each other.

Figure 8:
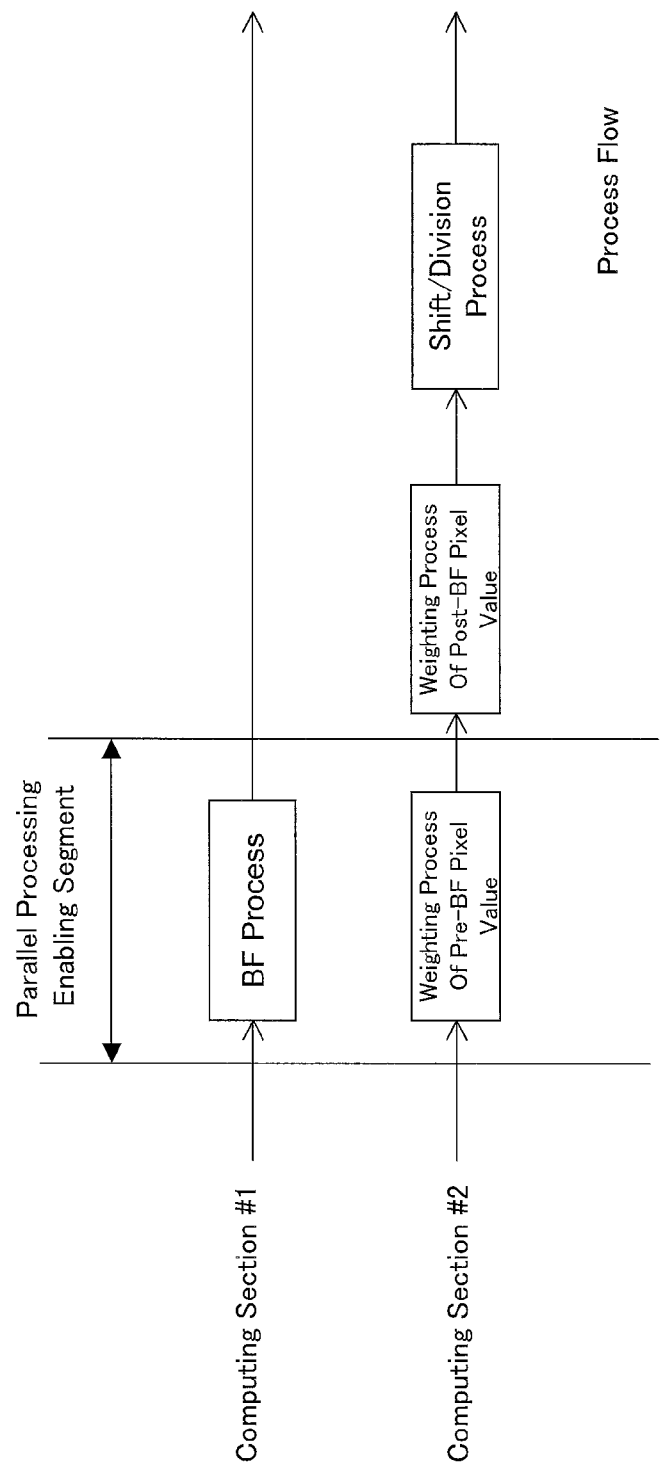
FIG. 8 is an explanatory view of a parallel processing of the loop filter section 120 according to the first embodiment of the present invention.

FIG. 8 is an explanatory view of a parallel processing in the loop filter 120. FIG. 8 shows the operation of carrying out a loop filter process in a parallel manner by using two computing sections (computing sections #1 and #2). As shown in FIG. 8, the computing section #1 carries out post-BF image generating process of the BF section, the computing section #2 implements weighting for pre-BF image (image inputted to the loop filter section 120) which weighting is carried out by the adaptive filter section 302, so that a loop filter process can be carried out in a parallel manner. Further, the computing section #2 carries out a process of weighting for a post-BF image and a shift/division process, both of which are other processes carried out by the loop filter. However, these processes may be carried out by the computing section #1. In FIG. 8, a part that can be carried out by parallel computation is indicated as parallel processing enabling segment.

It should be noted that the processing amount of the weighting process depends on the number of taps. Therefore, in a case where the tap number M of the pre-BF weighting process is much larger than the tap number N of the post-BF weighting process, a large part of adaptive filter process is occupied by the pre-BF weighting process. This enables achieving about the same effect as the effect achieved by implementation of the adaptive filter and the BF process at the same time. In this case, it is possible to bring about the effect of providing a great parallelism.

(Explanation of Reference Range)

It takes time to access a large-capacity external memory (e.g. SDRAM) in a process carried out by a CPU and an accelerator of a portable device or the like device. On this account, it is usual that data is temporarily transferred to a high-speed accessible internal memory to be processed on the internal memory, and the processed data is then transferred to the external memory.

For decoding and encoding of a moving image, a large-size frame memory is provided in a large-capacity external memory. Since an internal memory cannot store large-capacity data, the data are processed in a relatively small block such as a block of 16×16 pixels or a block of 32×16 pixels. That is, data required for a block to be processed is transferred to the internal memory, are processed, and then transferred to an external memory. Such a series of processes is repetitively carried out, so that data equivalent to a frame is processed.

Figure 9:
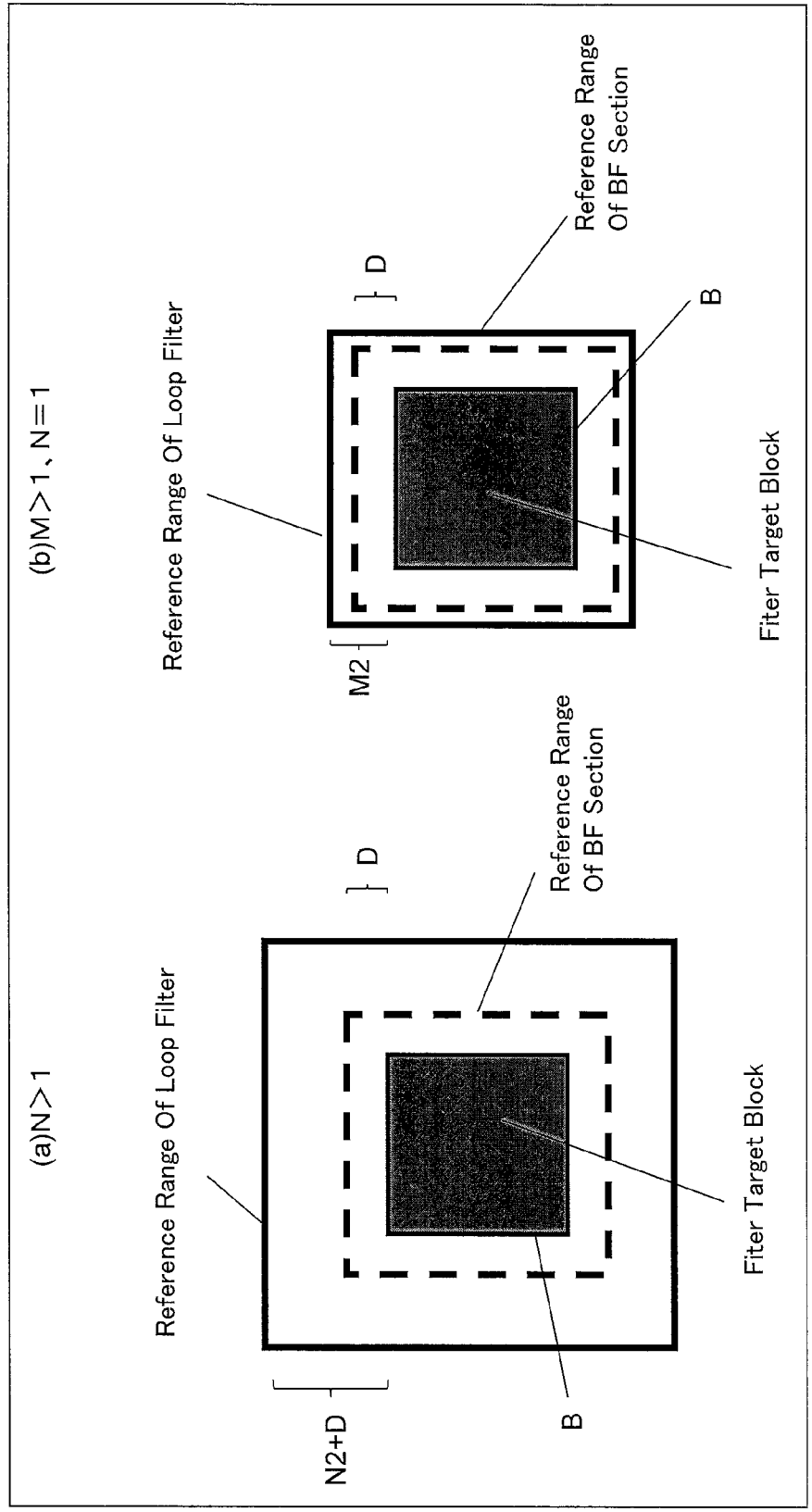
FIG. 9 is an explanatory view of a reference range of the loop filter section 120 according to the first embodiment of the present invention.

FIG. 9 is an explanatory view for describing a reference range of decoded pixels to be used by the loop filter section 102 (including the BF section 301 and the adaptive filter section 302) according to an embodiment of the present invention. The following exemplifies a case where a loop filter process is carried out for each block (for each filter target block in FIG. 9). A region defined by a prediction block boundary or by a transform block boundary is regarded as a unit. In the embodiment of the present invention, a prediction block and a transform block each have a minimum size of 4×4, and it is therefore appropriate that the size of the filter target block be a multiple of 4×4, such as 16×16 or 32×16.

In FIG. 9, a solidly filled region represents the filter target block, and B represents a boundary of the filter target block.

Figure 18:
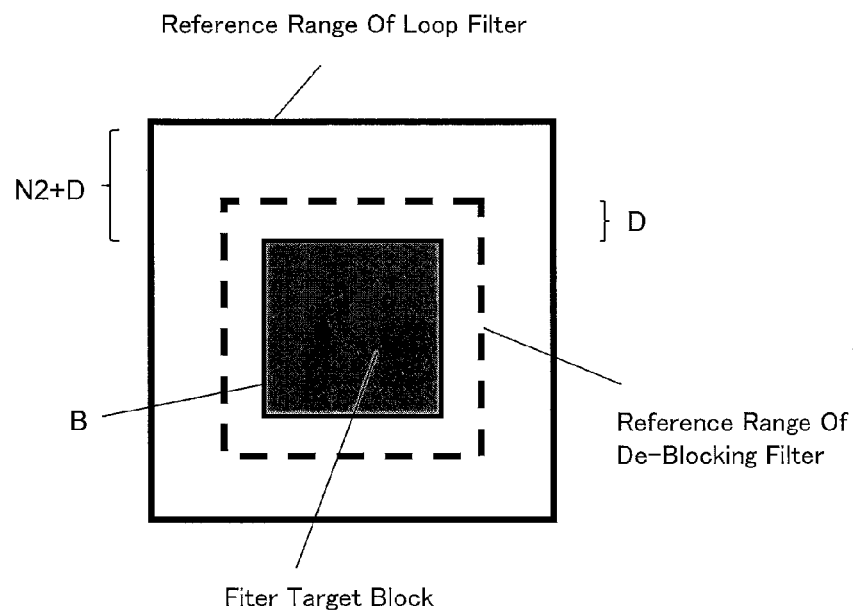
FIG. 18 is an explanatory view of a reference range of a conventional loop filter.

FIG. 18 is an explanatory view for a range of a decoded image to be used by a conventional loop filter. Also in FIG. 18, B represents a boundary of a filter target block.

In FIG. 9, a region defined by a dash line represents a range of a decoded image which range is required for subjecting the boundary B of the filter target block to a BF process. FIG. 9 exemplifies a case where D pixels from the boundary are further required for the BF process.

A region defined by a thick solid line surrounding the dash line of FIG. 9 represents a range of a decoded image which range is required for subjecting the boundary B of the filter target block to a BF process. In a case where a tap number for post-BF pixel values is N, the adaptive filter requires post-BF pixels equivalent to N2 pixels from the boundary B, where N2=(N+1)/2. In order to obtain the post-BF pixels through the BF process, a decoded image provided by not only the N2 pixels but also the D pixels is required. In total, the decoded image provided by N2+D pixels from the boundary B is required.

Usage of such a spatial adaptive filter for the post-BF pixels increases the range (reference range) of the decoded image required for subjecting the filter target block to a loop filter process. The following will describe in detail.

FIG. 18 shows an example of the conventional loop filter shown in (a) of FIG. 17. The process carried out by a de-blocking filter section requires D pixels surrounding the boundary B (see a dash line in FIG. 18). The process carried out by the adaptive filter section 302 requires N2+D pixels surrounding the boundary B (see a thick solid line in FIG. 18). Because N2+D>D, a reference range to be referred to by the loop filter is the N2+D pixels surrounding the boundary B.

(a) of FIG. 9 shows a typical case of the loop filter 120 of the present invention. The process carried out by the BF section 301 requires the D pixels surrounding the boundary B (see the dash line in (a) of FIG. 9). In a case where the tap number for the post-BF pixels is N and a tap number for pre-BF pixels is M, the adaptive filter section 302 requires MAX (N2+D, M2) pixels surrounding the boundary B to carry out a process. Note that MAX (a, b) is an arithmetic operation for calculating upper limit values of respective a and b, i.e. M2=(M+1)/2. (a) of FIG. 9 shows a case where N2+D>M2. A reference range to be referred to by the loop filter, which reference range is defined by a thick solid line, is the N2+D pixels surrounding the boundary B.

(b) of FIG. 9 shows a case where a tap number N for post-BF pixels is 1. In the case, the process carried out by the BF section 301 requires the D pixels surrounding the boundary B (see the dash line in (b) of FIG. 9), and the process carried out by the adaptive filter section 302 requires MAX (D, M2) pixels surrounding the boundary B. (b) of FIG. 9 shows a case where M2>D. A reference range to be referred to by the loop filter, which reference range is defined by a thick solid line, is M2 pixels surrounding the boundary B.

In the conventional technique (described with reference to FIG. 18) of carrying out a spatial adaptive filter process by using an image subjected to a de-blocking process, and in the case (described with reference to (a) of FIG. 9) where a post-BF image is subjected to a spatial adaptive filter process (by means of the adaptive filter of N>1), an overlap is small between a region of a decoded image required by the BF section 301, and a region of a decoded image required by the adaptive filter section 302. Meanwhile, in a case (described with reference to (b) of FIG. 9) where a pre-BF image is subjected to a spatial adaptive filter process but a post-BF image is not subjected to the spatial adaptive filter process (M>1, N=1), an overlap is large between a region of a decoded image required by the BF section 301 and a region of a decoded image required by the adaptive filter section 302.

A large overlap between the region of the decoded image required by the BF section 301 and the region of the decoded image required by the adaptive filter section 302 means that a region of a decoded image that can be used in common by both the BF section 301 and the adaptive filter section 302 is large. This makes it possible to reduce a range of an image to be referred to for a filter target block and also achieves an effect in data transfer described below.

(Explanation of Data Transfer)

Figure 10:
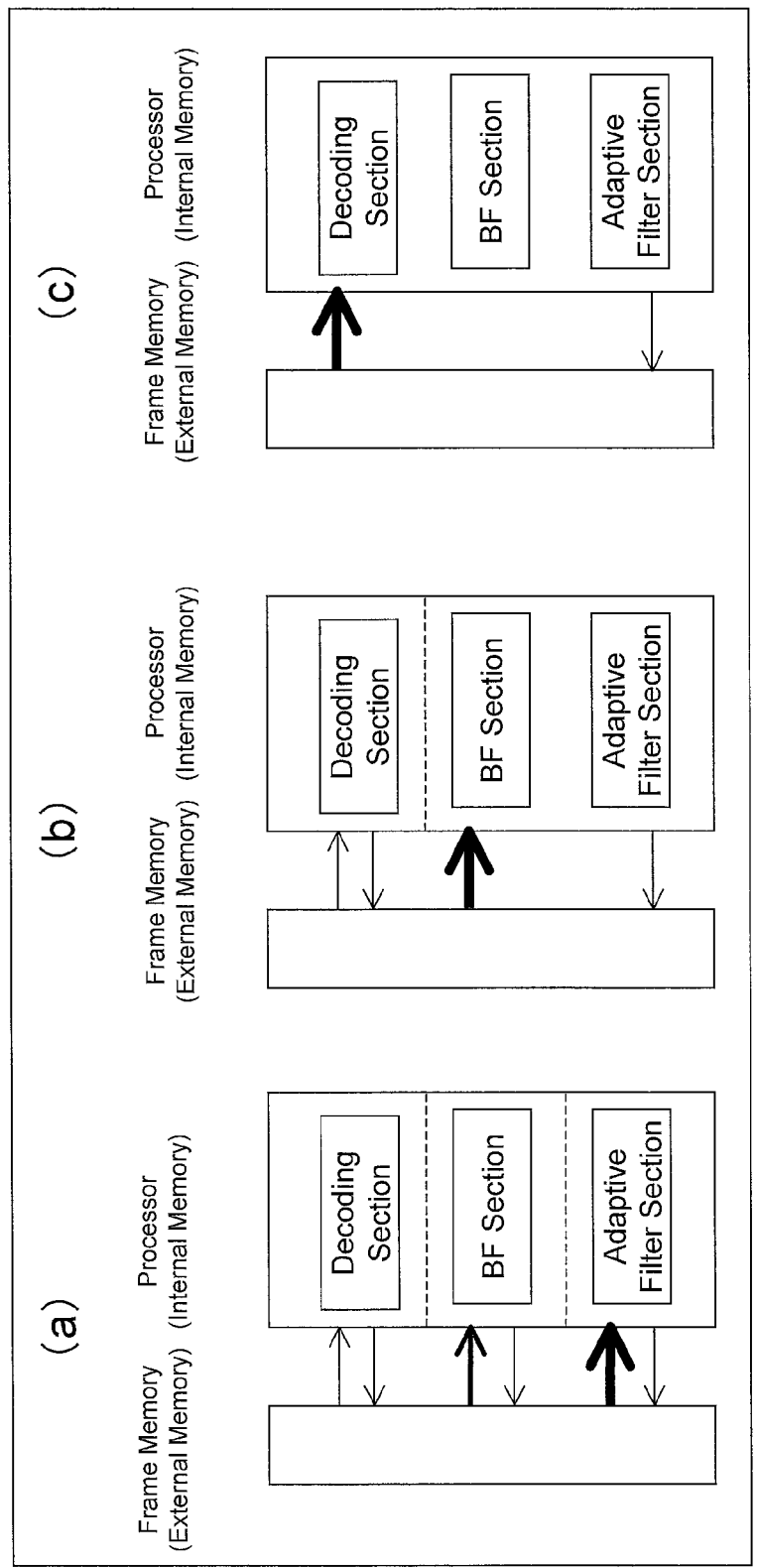
FIG. 10 is an explanatory view of data transfer in the first embodiment of the present invention.
Figure 19:
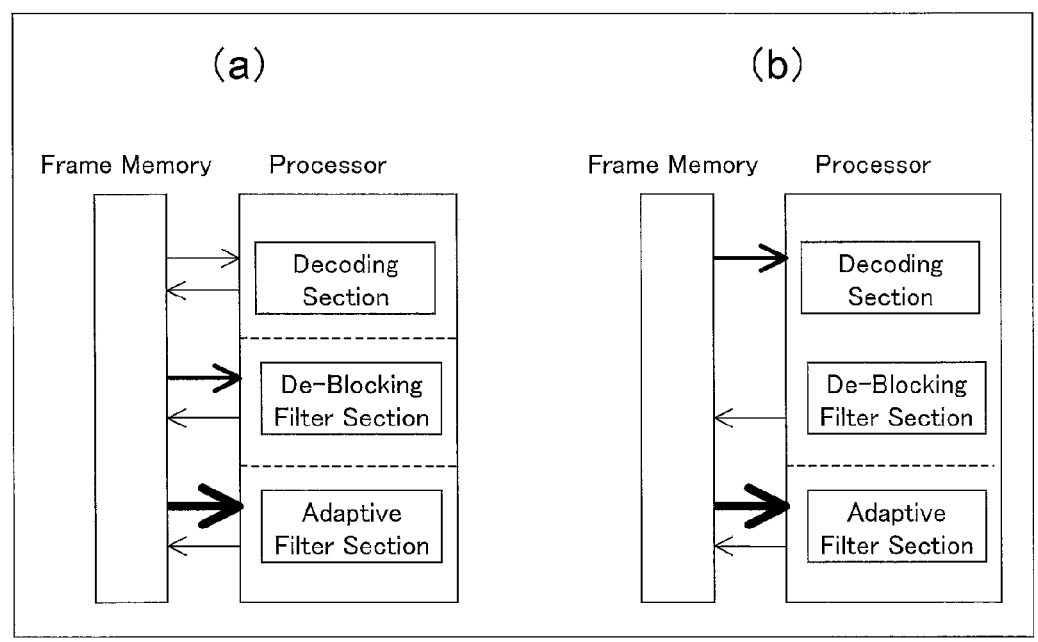
FIG. 19 is an explanatory view of data transfer of a conventional moving image decoder.

FIG. 10 is an explanatory view for describing data transfer in the moving image decoder 1 according to an embodiment of the present invention. The following particularly describes data transfer in the moving image decoder 1' including the multiplication section 702' with N being fixed to 1. FIG. 19 is an explanatory view of conventional data transfer of a moving image decoder. (a) of FIG. 19 shows a case where a decoding process, a de-blocking filter process, and an adaptive filter process are independently carried out through individual transfers. This requires data transfer between an external memory and an internal memory for each process, thus significantly increasing the amount of data transfer as a whole. On the contrary, in a case where a plurality of processes are carried out concurrently through one transfer, this eliminates the need for transfer, between an external memory and an internal memory, intermediate data (temporary data) which is required halfway during the process. This makes it possible to reduce the amount of data transfer.

However, as described with reference to FIG. 18, in the conventional technique, an overlap between a range of pixels required for the de-blocking filter process and a range of pixels required for the adaptive filter process is small. Accordingly, a small amount of data is reduced through one transfer even when the de-blocking filter process and the adaptive filter process are carried out. Therefore, according to the conventional technique, in order to carry out concurrent data transfer through one transfer, the decoding process and the de-blocking filter process should be carried out concurrently through one transfer (see (b) of FIG. 19).

(a) of FIG. 10 shows a case where a decoding process, a de-blocking filter process, and an adaptive filter process are independently carried out in the moving image decoder 1' according to the embodiment of the present invention. As described with reference to (b) of FIG. 9, an overlap between the range of pixels required for the de-blocking filter process and the range of pixels required for the adaptive filter process is large in this configuration. This achieves a great effect of reducing data, and enables the amount of data transfer to be reduced as shown in (b) of FIG. 10. Note that there appears no substantial difference in reduction in amount of data transfer between the conventional technique shown in (b) of FIG. 19 and the present invention shown in (b) of FIG. 10. However, in actual, the amount of data transfer reduced is larger in the present invention shown in (b) of FIG. 10. In the conventional technique shown in (b) of FIG. 19, the decoding process and the de-blocking filter process are carried out through one transfer. However, the de-blocking filter process requires not only data required for the decoding process but also extra data. This increases in amount of data to be transferred, correspondingly. In contrast, in (b) of FIG. 10, data to be referred to in the de-blocking filter process is included in data to be referred to in the adaptive filter process. This causes no increase in amount of data transfer.

Further, according to the present invention, it is possible to carry out three processes, i.e. the decoding process, the de-blocking filter process, and the adaptive filter process, through one transfer (see (c) of FIG. 10). This makes it possible to further reduce the amount of data transfer.

The reduction of the amount of data transfer enables achieving the effect of reducing power consumption through decrease in bus speed and for other reason(s). Further, the reduction of the amount of data transfer has a direct effect on increase in processing speed, in a case where data transfer is a bottleneck in an arithmetic process, like in a case where waiting for data required for processing is needed. This rarely applies to high-speed computers such as personal computers but often applied to portable devices or the like devices with a low bus speed. Therefore, the reduction of the amount of data transfer is important.

(Moving Image Encoder)

The following describes an image encoding device to which the present invention is applied, with reference to the drawings.

Figure 2:
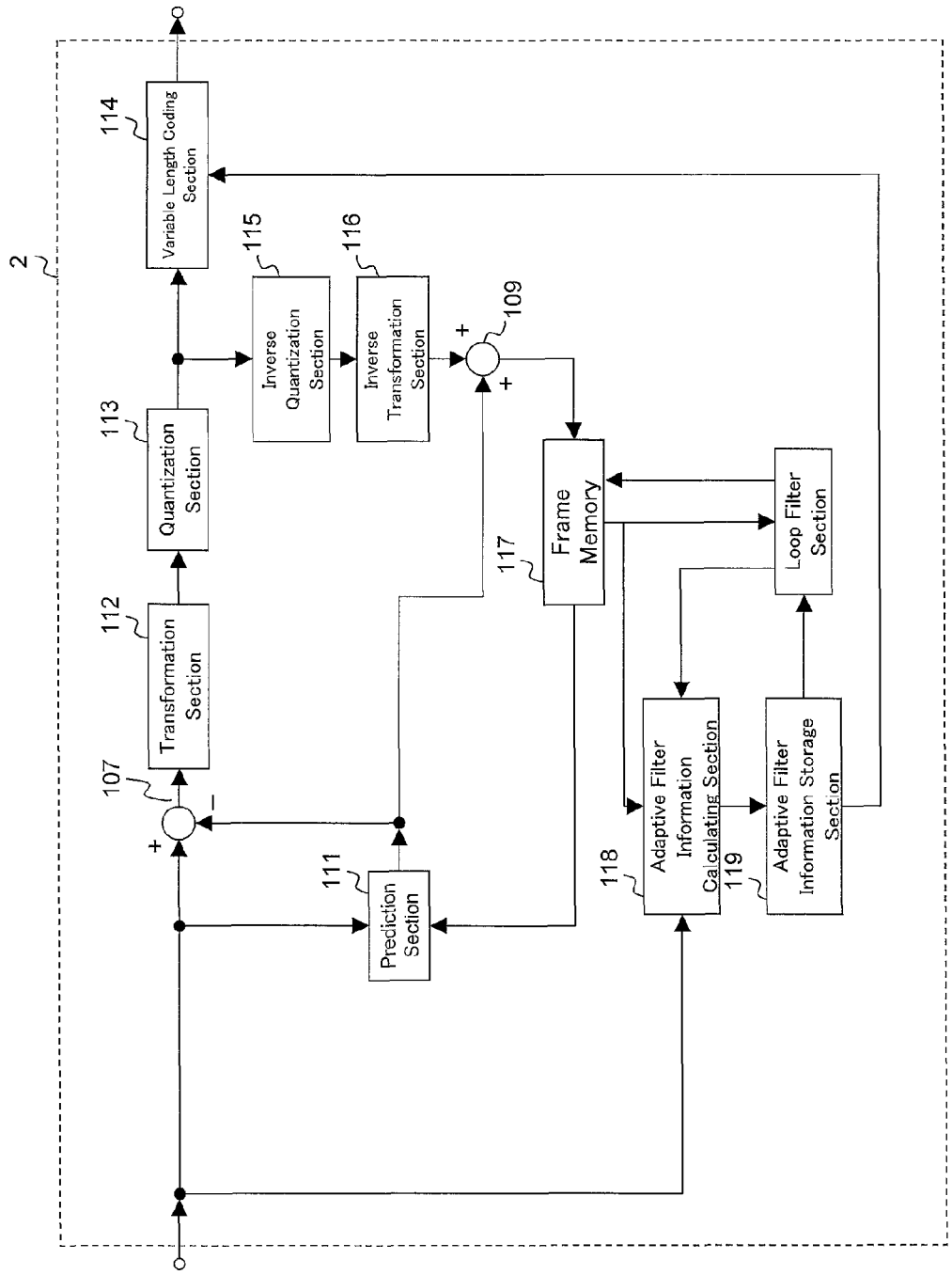
FIG. 2 is a block diagram of a moving image encoder according to the first embodiment of the present invention.

FIG. 2 is a block diagram showing a configuration of the moving image encoder 2. Members identical to those in the moving image encoder 1 are given the same reference numerals, and explanations of the members are omitted here.

As shown in FIG. 2, the moving image encoder 2 includes a prediction section 111, a transformation section 112, a quantization section 113, a variable length coding section 114, an inverse quantization section 115, an inverse transformation section 116, a frame memory 117, an adaptive filter information calculating section 118, an adaptive filter information storing section 119, a loop filter section 120, a subtraction section 107, and an addition section 109.

The moving image encoder 2 includes the loop filter section 120 that reduces distortion of a locally decoded image stored in the frame memory 117. The moving image encoder 2 also includes the adaptive filter information storing section 119 that stores adaptive filter information for controlling the loop filter section 120. The following describes how the moving image encoder 2 operates.

An image inputted to the moving image encoder 2 is segmented into blocks and then subjected to the following processes. The prediction section 111 generates a prediction block that approximates an input block. The subtraction section 107 calculates a difference value block that is a difference value between the input block and the prediction block outputted from the prediction section 111.

The transformation section 112 carries out, for example, DCT with respect to the difference value block supplied from the subtraction section 107 to calculate a transform coefficient. The quantization section 113 quantizes the transform coefficient according to a step defined by a quantization step. A quantized transform coefficient is encoded by the variable length coding section 114, and then outputted outside the moving image encoder 2.

The inverse quantization section 115 inversely quantizes the quantized transform coefficient. The inverse transformation section 116 inversely transforms an inversely quantized transform coefficient to calculate a residual block. The addition section 109 calculates the sum of the residual block and the prediction block to reproduce the input block. The input block thus reproduced is stored in the frame memory 117.

The adaptive filter information calculating section 118 calculates adaptive filter information. The adaptive filter information thus calculated is stored in the adaptive filter information storing section 119, and supplied to the variable length coding section 114. The variable length coding section 114 carries out variable length coding with respect to not only the transform coefficient and information indicative of a prediction method but also the adaptive filter information, and then supplies them outside the moving image encoder 2.

The adaptive filter information thus calculated is stored in the adaptive filter information storing section 119. The loop filter section 120 reads out the adaptive filter information stored in the adaptive filter information storing section 119, and carries out a filter process with respect to the locally decoded image stored in the frame memory 117 on the basis of a value of the adaptive filter information. The locally decoded image subjected to the filter process is stored again in the frame memory 117.

The adaptive filter information storing section 119 and the loop filter section 120 of the moving image encoder 2 operate in the same manner as those of the moving image decoder 1. Therefore, descriptions of the adaptive filter information storing section 119 and the loop filter section 120 of the moving image encoder 2 are omitted here.

(Explanation of the Adaptive Filter Information Calculating Section 118)

The following explains how the adaptive filter information calculating section 118 operates. The adaptive filter information calculating section 118 calculates a weighting factor afk (k=0 to (M×M+1)/2−1), a weighting factor bfk (k=0 to (N×N+1)/2−1), and an estimated value of an offset of from an input image xo, a decoded image x, and a post-BF pixel value xd according to the least squares method. The weighting factors afk and bfk are values necessary for minimizing Equation (8-1) below. Note here that f is an abbreviation of float and means calculating the weighting factors in the form of a point number in the least squares method.

$$\Sigma |xo(x,y)-(\Sigma af(i,j)\times x(x+i,y+j)+\Sigma bf(i,j)\times xd(x+i,y+j)+of)|^2 \qquad (8\text{-}1)$$

where ^2 represents square. The first Σ means an arithmetic operation of working out the sum of all values of (x, y), Σ in the first term means an arithmetic operation of working out the sum of −M to M for each of i and j of (i, j), and the last Σ means an arithmetic operation of working out the sum of −N to N for each of i and j of (i, j).

Note that a relationship between ak and of (i, j), and a relationship between bk and bf (i, j) are as already described in the explanation of the moving image decoder 1.

In calculation according to the least squares method, Equation (8-1) is first converted into Equation (8-2) where the weighting factors afk and bfk and the offset of are parameters.

$$\Sigma |xo(x,y)-(\Sigma x(x+i,y+j)\times afk+\Sigma xd(x+i,y+j)\times bfk+of)|^2 \qquad (8\text{-}2)$$

For the sum indicated by Σ, the sum regarding (i, j) is substituted for the sum regarding k. Note here that k corresponds to two types of (i, j), one of which is represented by (i, j), and the other is represented by (i', j').

Transformation of k to (i, j) and (i', j') is performed by the following operation. First, k0 and k0' are calculated from k according to the following equations:

$$k0=k,$$

$$k0'=(M\times M-1)-k.$$

Thereafter, i and j are calculated from k0 and k0' according to the following equations:

$$i=(k0\%M)-ofst,$$

$$j=(k0/M)-ofst,$$

$$i'=(k0'\%M)-ofst,$$

$$j'=(k0'/M)-ofst,$$

where % represents an arithmetic operation for calculating a remainder, "/" represents an arithmetic operation for doing division and discarding fractional parts to obtain an integer, and ofst=M/2.

Note that for xd, (i, j) and (i', j') are calculated by the above expressions where M is substituted for N.

Consequently, Equation (8-2) can be represented as Equation (8-3).

$$\Sigma |xo(x,y)-(\Sigma \{x(x+i,y+j)+x(x+i',y+j')\}\times afk+\Sigma \{xd(x+i,y+j)+xd(x+i',y+j')\}\times bfk+of)|^2 \qquad (8\text{-}3)$$

where the first Σ means an arithmetic operation of working out the sum of all values of (x, y), Σ in the first term means an arithmetic operation of working out the sum of 0 to (M×M+1)/2−1 for k, and the last Σ means an arithmetic operation of working out the sum of 0 to (N×N+1)/2−1 for k.

On the assumption that Equation (8-3) is an equation in which afk, bfk, and of are parameters, the parameters are partially differentiated, and the results are set to 0 (zero). Consequently, simultaneous equations in which the number of parameters is (M×M+1)/2+(N×N+1)/2+1, (called a normal equation) are obtained.

The normal equation thus obtained is solved by, for example, Gauss elimination, so that an optimal estimated value afe of the weighting factor afk, an optimal estimated value bfe of the weighing factor bfk, and an optimal estimated value ofe of the offset of are obtained.

A set of the weighting factors is referred to as an estimated value zfe. Note that the post-BF pixel value xd is calculated by the BF section 301 in the loop filter section 120.

An arithmetic operation according to the least squares method is carried out after a tap number M for pre-BF pixel values and a tap number N for the pre-BF pixel values are set to respective specific values. Note, however, that it is difficult to set an optimal combination of M and N in advance. Therefore, the least squares method is carried out with respect to all combinations of M and N obtainable by a process of expressing by the following pseudo code, and then the optimal combination of M and N is selected for optimization.

SMIN=0x7FFFFFFF (which is a sufficiently large value, and in this case, an upper limit value of a 32-bit signed integer is set).

```
LOOP (M = 1, 3, 5){
    LOOP (N = 1, 3, 5){
        Calculate a weighting factor zfe by the least
        squares method
        Denote, as S, the size of a square error
        obtained by substitution of the weighting
        factor zfe into Equation (8-3)
        IF (S < SMIN){
            Store the weighting factor zfe as an
            optimal weighting factor zfbest
            S = SMIN
        }
    }
}.
```

An optimal weighting factor set calculated here is zfbest={afbest, bfbest, ofbest}. The optimal weighting factor set is converted into an integer according to the following equations:

$$abest=(int)\{afbest \times (1>>shift)\},$$

$$bbest=(int)\{bfbest \times (1>>shift)\},$$

$$obest=(int)\{ofbest \times (1>>shift)\},$$

where (int) represents converting into an integer, and then stored in the adaptive filter information storing section 119.

In the embodiments described above, it is possible to control the moving image decoder and the moving image decoder by causing a computer system to read and execute a program, which is stored in a computer-readable storage medium, for realizing the functions of the moving image decoder and the moving image decoder. The "computer system" used herein includes an OS and hardware such as peripherals.

The "computer-readable storage medium" includes storage devices such as (i) portable media such as a flexible disk, an optical magnetic disk, a ROM, and a CD-ROM and (ii) hard disk to be incorporated into a computer system. The "computer-readable storage medium" further includes (i) a communication line, through which a program is to be transmitted, for dynamically holding a program for a short period of time, such as a network (for example, the Internet) or a communication line (for example, a telephone line), and (ii) a volatile memory that holds a program for a certain period of time in a computer system which serves as a server or a client for the above transmission. The program may be a program for causing the functions to be partially performed or for causing the functions to be performed in combination with a program which has been stored in a computer system.

(Modified Examples of the Loop Filter Section 120)

Finally, the configuration of the loop filter section 120 will be laid out, and some modified examples of the loop filter section 120 will be then described.

(Configuration of the Loop Filter Section 120)

Figure 20:
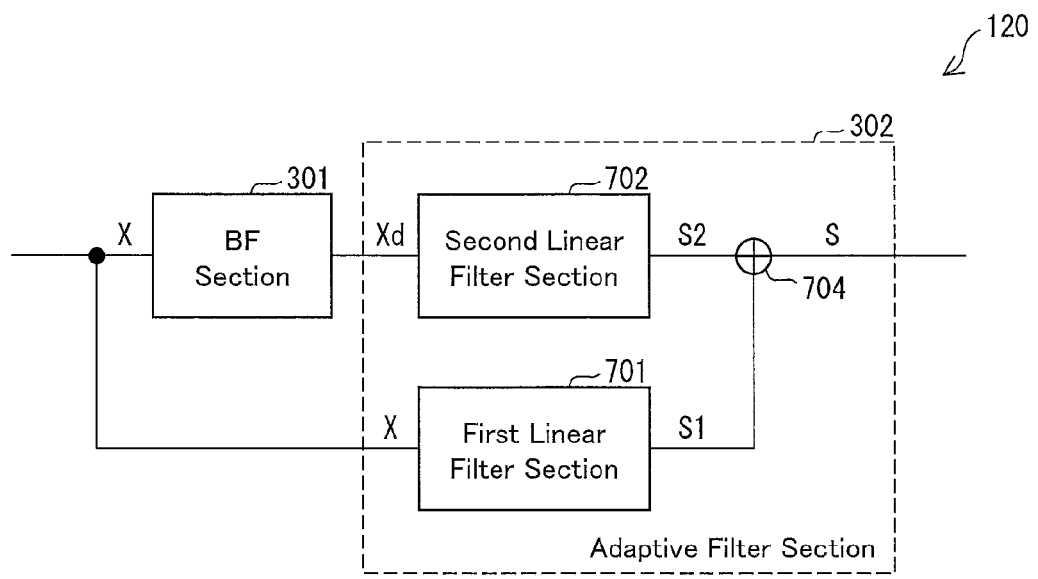
FIG. 20 is a block diagram of the loop filter section (120) according to the first embodiment of the present invention.

FIG. 20 is a block diagram showing the configuration of the loop filter section 120 shown in FIG. 3 with the internal configuration of the adaptive filter section 302 shown in FIG. 7. As shown in FIG. 20, the loop filter section 120 includes the BF section 301 and the adaptive filter section 302.

The loop filter section 120 is constituted by the BF section 301 and the adaptive filter section 302. In a case where the loop filter section 120 is incorporated into the moving image encoder 2, the loop filter section 120 receives a locally decoded image. In a case where the loop filter section 120 is incorporated into the moving image decoder 1, the loop filter section 120 receives a decoded image. Hereinafter, the locally decoded image and the decoded image are collectively referred to as "decoded image X".

The decoded image X is generated through orthogonal transform (for example, DCT), quantization, inverse quantization, and inverse orthogonal transform (for example, inverse DCT). Therefore, the decoded image X may contain block noise which causes discontinuous change in pixel values (luminance or color difference) at a boundary of a transform unit of the orthogonal transform. Further, block noise may occur at a boundary of a generation unit (prediction unit) of a predicted image, in a case where orthogonal transform, quantization, inverse quantization, and inverse orthogonal transform are carried out with respect to a prediction residual obtained by subtracting the predicted image from an encoding target image.

The BF section 301 is a filter for removing such block noise, that is, a smoothing filter which selectively acts on a block boundary (a boundary of the transform unit or a boundary of the prediction unit). The smoothing filter is referred herein to as "boundary filter" or "boundary utilization filter". A filtering operation carried out by the BF section 301 includes a nonlinear operation for, for example, condition evaluation using an if statement, and the filtering operation also requires a large volume of processing due to adaptive adjustment in filter strength. For example, in the decoding process based on H264/AVC, much of the processing time can be spent for the filtering operation through a de-blocking filter. Note that details of the BF section 301 are as described previously.

Figure 21:
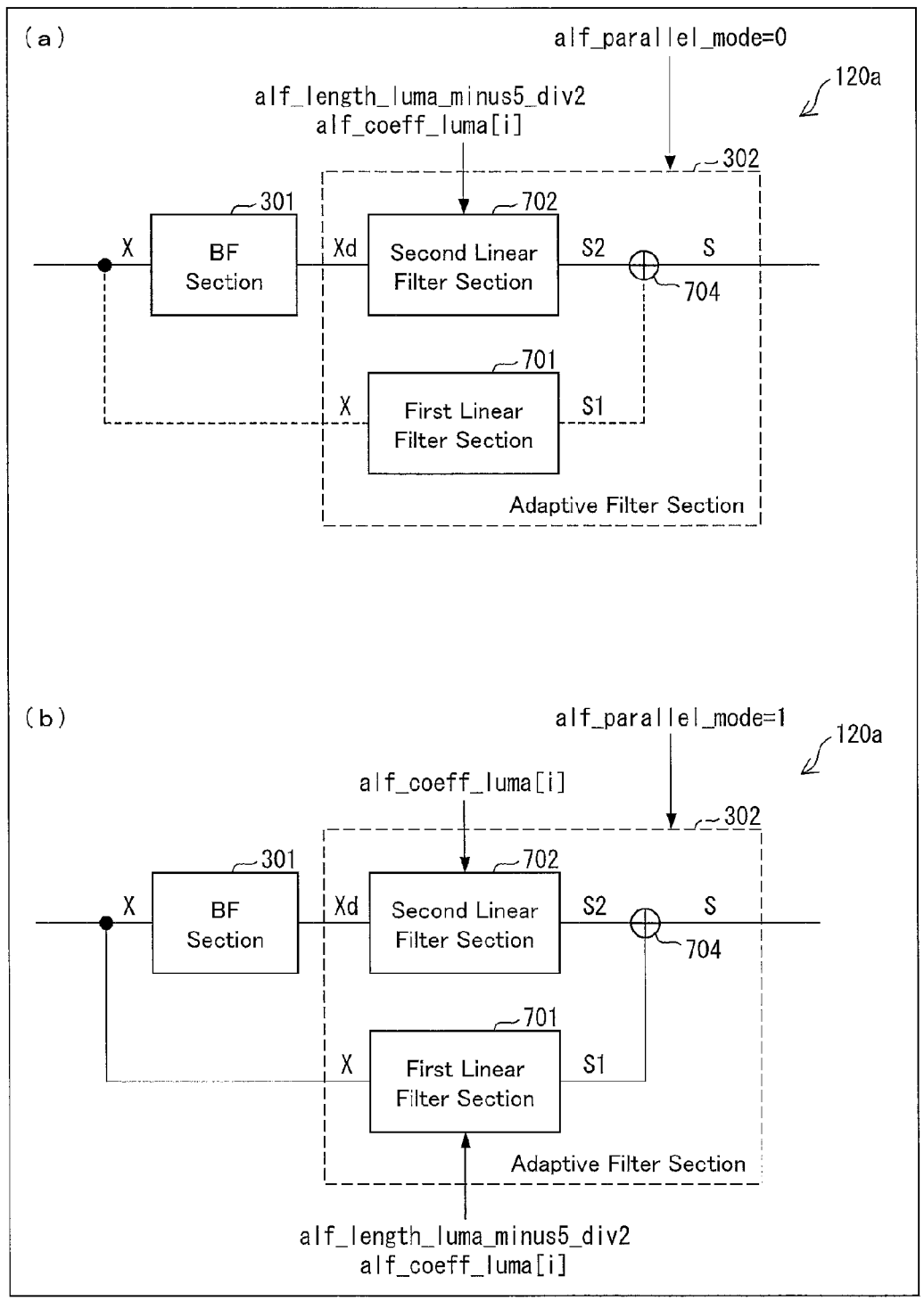
FIG. 21 is a block diagram showing a first modification example of the loop filter section shown in FIG. 20, wherein (a) shows how the loop filter section operates in the first mode, and (b) shows how the loop filter section operates in the second operation mode.

The loop filter section 120 is made up by combining the BF filter 301a s described above with the adaptive filter section 302. As shown in FIG. 21, the adaptive filter section 302 of the loop filter section 120 includes an adaptive weighting section 701 (hereinafter referred to as a "first linear filter section 701"), a post-BF pixel adaptive weighting section 702 (hereinafter referred to as a "second linear filter section 702"), and an addition section 704. As shown in FIG. 7, a shift/division section 703 may be provided at a stage subsequent to the addition section 704. However, the operation of the shift/division section 703 is not essential in the present invention. Therefore, the shift/division section 703 is not provided here.

The first linear filter section 701 is a linear filter which acts on a decoded image X (yet to be subjected to a de-blocking filter process) to be supplied to the BF section 301. That is, when a tap number of the first linear filter section 701 is M, a pixel value S1 $(x, y)$ to be outputted from the first linear filter section 701 can be represented by S1 $(x, y)=a_1 \times X_1 + a_2 \times X_2 + \ldots a_{M \times m} \times X_{M \times M} + o$ with use of a reference pixel value group $\{X_1, X_2, \ldots, \text{and } X_{M \times M}\}$, where "$a_1, a_2, \ldots, \text{and } a_{M \times M}$" are filter coefficients which are adaptively determined for each filter coefficient setting unit (for example, each slice) in the moving image encoder 2, and o is an offset value (DC component) which is determined in the same manner as the filter coefficient. The tap number M of the first linear filter section 701, which may be 1 as described previously, is a natural number of not less than 2. That is, the first linear filter section 701 is a spatial filter.

The reference pixel value group $\{X_1, X_2, \ldots, \text{and } X_{M \times M}\}$ to be referred to by the first linear filter section 701 so as to obtain the pixel value S1 $(x, y)$ of a pixel $(x, y)$ of an output image S1 is a group consisting of pixel values of respective pixels which belong to a region U (hereinafter referred to as a "reference region U") including the pixel $(x, y)$. The reference pixel value group $\{X_1, X_2, \ldots, \text{and } X_{M \times M}\}$ can be represented by $\{X(u, v) | (u, v) \in U\}$, where $X(u, v)$ is a pixel value of a pixel $(u, v)$ of the decoded image X yet to be subjected to de-blocking filter. For example, in a case where the reference region U is a square region with the center of the pixel $(x, y)$, the reference pixel value group $\{X_1, X_2, \ldots, \text{and } X_{M \times M}\}$ can be represented by $\{X(u, v) | x-(M-1)/2 \le u \le x+(M-1)/2, y-(M-1) \le v \le y+(M-1)\}$. Alternatively, in a case where the reference region U is a square region including the pixel $(x, y)$ at an upper left vertex of the square region, the reference pixel value group $\{X_1, X_2, \ldots, \text{and } X_{M \times M}\}$ can be represented by $\{X(u, v) | x \le u \le x+M-1, y \le v \le y+M-1\}$. Further, alternatively, the reference region U may be a rhombic region including the pixel $(u, v)$ which is distant from the pixel $(x, y)$ by a city block distance (Manhattan distance) that is not more than a predetermined distance. Note that the reference region U is not limited to the above-described regions provided that the reference region U includes the pixel $(x, y)$.

The second linear filter section 702 is a linear filter which acts on a decoded image Xd (subjected to a de-blocking filter process) supplied from the BF section 301. That is, when a tap number of the second linear filter section 702 is N, a pixel value S2 $(x, y)$ to be supplied from the second linear filter section 702 can be represented by S2 $(x, y) = b_1 \times Xd_1 + b_2 \times Xd_2 + \ldots + b_{N \times N} \times Xd_{N \times N}$ with use of a reference pixel value group $\{Xd_1, Xd_2, \ldots, \text{and } Xd_{N \times N}\}$, where "$b_1, b_2, \ldots,$ and $b_{N \times N}$" are filter coefficients adaptively determined together with the filter coefficients $a_1, a_2, \ldots,$ and $a_{M \times M}$ and the offset o in the moving image encoder 2. The tap number N of the second linear filter section 702 is a natural number of not less than 1. That is, the second linear filter section 702 is not necessarily a spatial filter.

The reference pixel value group $\{Xd_1, Xd_2, \ldots,$ and $Xd_{N \times N}\}$ to be referred to by the second linear filter section 702 so as to obtain the pixel value S2 $(x, y)$ of a pixel $(x, y)$ of an output image S2 is a group consisting of pixel values of respective pixels which belong to a region V (hereinafter referred to as a "reference region V") including the pixel $(x, y)$. The reference pixel value group $\{Xd_1, Xd_2, \ldots,$ and $Xd_{N \times N}\}$ can be represented by $\{Xd(u, v) | (u, v) \in V\}$, where Xd $(u, v)$ is a pixel value of a pixel $(u, v)$ of the decoded image Xd subjected to de-blocking filter. For example, in a case where the reference region V is a square region with the center of the pixel $(x, y)$, the reference pixel value group $\{Xd_1, Xd_2, \ldots,$ and $Xd_{N \times N}\}$ can be represented by $\{Xd(u, v) | x-(N-1) \le u \le x+(N-1), y-(N-1) \le v \le y+(N-1)\}$. Alternatively, in a case where the reference region V is a square region including the pixel $(x, y)$ at an upper left vertex of the square region, the reference pixel value group $\{Xd_1, Xd_2, \ldots,$ and $Xd_{N \times N}\}$ can be represented by $\{X(u, v) | x \le u \le x+(N-1), y \le v \le y+(N-1)\}$. Further, alternatively, the reference region V may be a rhombic region including the pixel $(u, v)$ which is distant from the pixel $(x, y)$ by a city block distance (Manhattan distance) that is not more than a predetermined threshold. Note that the reference region V is not limited to the above-described regions provided that the reference region V includes the pixel $(x, y)$.

The addition section 704 adds the output image S1 supplied from the first linear filter section 701 and the output image S2 supplied from the second linear filter section 702, to obtain a synthetic image S. A pixel value S $(x, y)$ of a pixel $(x, y)$ of the synthetic image S obtained by the addition section 704 is a sum $S1(x, y) + S2(x, y)$ of (i) the pixel value S1 $(x, y)$ of the pixel $(x, y)$ of the output image S1 supplied from the first linear filter section 701 and (ii) the pixel value S2 $(x, y)$ of the pixel $(x, y)$ of the output image S2 supplied from the second linear filter section 702. The loop filter section 120 outputs the synthetic image S obtained by the addition section 704 to the outside. Hereinafter, the synthetic image S is also referred to as an output image S.

The pixel value S $(x, y)$ of the pixel $(x, y)$ of the output image S of the loop filter section 120 can be represented by Equation (a):

$$S(x,y) = \Sigma a_i \times X_i + \Sigma b_j \times Xd_j + o \qquad (a),$$

where $\Sigma$ in the first term is a sum extending over $i = 1, 2, \ldots,$ and $M \times M$, and $\Sigma$ in the second term is a sum extending over $j = 1, 2, \ldots,$ and $N \times N$. Here the configuration where the offset o is added in Equation (a) by the first linear filter section 701 has been described here. However, this configuration may be replaced by the configuration where the offset o is added in Equation (a) by the second linear filter section 702.

An especially remarkable point of the loop filter section 120 shown in FIG. 20 is that (i) a member (the second linear filter section 702) of the adaptive filter section 302 is provided at a stage subsequent to the BF section 301 so as to act on a decoded image Xd, which is outputted from the BF section 301, subjected to a de-blocking filtering process and that (ii) another member (the first linear filter section 701) of the adaptive filter section 302 is provided in parallel with the BF section 301 so as to act on a decoded image X, which is inputted to the BF section 301, yet to be subjected to a de-blocking filtering process. With placement of the first linear filter section 701, which is the spatial filter, in parallel with the BF section 301, it is possible to reduce the tap number N of the second linear filter section 702, without reducing coding efficiency. In actual, as shown in FIG. 12, the coding efficiency does not decrease even when the tap number N of the second linear filter section 702 is decreased to 1.

It should be noted that the filtering operation of the first linear filter section 701 can be performed in parallel with the filtering operation of the BF section 301, while the filtering operation of the second linear filter section 702 cannot be performed in parallel with the filtering operation of the BF section 301. That is, even when the amount of computation increases with increase in tap number M of the first linear filter section 701 in a configuration including two or more computing means, reduction in amount of computation due to reduction in tap number N of the second linear filter section 702 enables reduction of a whole operation time. That is, provision of the second linear filter section 702 at a stage subsequent to the BF section 301 and provision of the first linear filter section 701 in parallel with the BF section 301 enable the loop filter section 120 to perform high-speed processing through parallelization, without decreasing in coding-amount reduction rate.

Modified Example 1

A first modified example of the loop filter section 120 shown in FIG. 20 will be described with reference to FIGS. 21 and 22.

A loop filter section 120a according to the present modified example is a filter device operable in (1) a first mode where an output image S2 supplied from the second linear filter section 702 serves as an output image S and in (2) a second mode where a synthetic image S, which is obtained by adding the output image S1 of the first linear filter section 701 and the output image S2 of the second linear filter section 702, serves as an output image S.

Whether the loop filter section 120a operates in the first mode or in the second mode is controlled by mode specification information (hereinafter also represented as "alf_parallel_mode") included in a filter parameter which is provided by the moving image encoder 2. In the present modified example, the loop filter section 120a operates in the first mode when the alf_parallel_mode=0 (zero), while the loop filter section 120a operates in the second mode when the alf_parallel_mode=1.

FIG. 21 is a block diagram showing how the loop filter section 120a according to the present modified example operates. (a) of FIG. 21 shows how the loop filter section 120a operates in the first mode. (b) of FIG. 21 shows how the loop filter section 120a operates in the second mode.

As shown in (a) of FIG. 21, in the first mode, the first linear filter section 701 stops functioning, and the loop filter section 120a outputs, as the output image S, the output image S2 of the second linear filter section 702. That is, a pixel value S (x, y) of a pixel (x, y) of the output image S can be represented by Equation (b):

$$S(x,y)=\Sigma b_j \times Xd_j \qquad (b),$$

where $\Sigma$ is a sum extending over j=1, 2, . . . , and N×N.

In the first mode, the tap number N of the second linear filter section 702 is variable, and is determined by tap number specification information (hereinafter also represented also as "alf_length_luma_minus5_div 2") included in the filter parameter to be supplied by the moving image encoder 2. Here, the alf_length_luma_minus5_div 2 is two-bit binary data indicative of a natural number of 0 through 3. In a case where the alf_length_luma_minus5_div 2 is 0 (00), 1 (01), 2 (10), or 3 (11) (the numbers in parentheses are represented in binary form), the second linear filter section 702 sets its own tap number N to 5, 7, 9, or 11, respectively.

As shown in (b) of FIG. 21, in the second mode, the loop filter section 120a outputs, as the output image S, the synthetic image S obtained by adding the output image S1 of the first linear filter section 701 and the output image S2 of the second linear filter section 702. That is, a pixel value S (x, y) of a pixel (x, y) of the output image S can be represented by Equation (c):

$$S(x,y)=\Sigma a_i \times X_i + b \times Xd(x,y) + o \qquad (c),$$

where $\Sigma$ is a sum extending over i=1, 2, . . . , and M×M.

In the second mode, the tap number M of the first linear filter section 701 is variable, and determined by the tap number specification information. When the alf_length_luma_minus5_div 2 is 0 (00), 1 (01), 2 (10), or 3 (11) (numbers in parentheses are represented in binary form), the first linear filter section 701 sets its own tap number M to 5, 7, 9, or 11, respectively. Meanwhile, in the second mode, the tap number N of the second linear filter section 702 is fixed to 1. In a configuration with two or more computing means, the loop filter section 120a can perform the filtering operation of the BF section 301 and the filtering operation (product-sum operation) of the first linear filter section 701 in parallel with each other.

In the present modified example, the tap number N of the second linear filter section 702 is set to 1. This allows the filtering operation of the second linear filter section 702 to be a remarkably light-load processing in the second mode. This enables substantially complete parallelization of the filtering operation of the BF section 301 and the filtering operation of the adaptive filter section 302 in the second mode.

On the basis of the filter parameter to be supplied by the moving image encoder 2, (i) switching between the operation modes in the loop filter section 120a, and (ii) setting of the tap numbers (setting of the tap number N of the second linear filter section 702 in the first mode and the tap number M of the first linear filter section 701 in the second mode) are carried out.

FIG. 22 is a view showing a structural example of a filter parameter (alf_param) to be supplied by the moving image encoder 2. As shown in FIG. 22, the filter parameter according to the present structural example is a filter parameter to be supplied for each slice by the moving image encoder 2, and includes a plurality of syntaxes (adaptive_loop_filter_flag, alf_pred_coef_mode, alf_parallel_mode, alf_length_luma_minus5_div 2, and alf_coeff_luma[i]) defining how the adaptive filter section 302 operates with respect to the target slice.

The syntax adaptive_loop_filter_flag is information specifying whether or not the adaptive filter 11 operates for a target slice. When the syntax adaptive_loop_filter_flag=0 (zero), the loop filter section 120a outputs, as an output image S, a decoded image Xd subjected to a de-blocking filtering.

The syntax alf_pred_coef_mode is information specifying whether to subject a filter coefficient to a predictive encoding process. When the syntax alf_pred_coef_mode=0, it indicates that the filter coefficient is not subjected to the predictive encoding process. When the syntax alf_pred_coef_mode=1, it indicates that the filter coefficient is subjected to the predictive encoding process. For example, when the syntax alf_pred_coef_mode=0, the first linear filter section 701 sets a value of a filter coefficient $a_i$ to the syntax alf_coeff_luma[i]. On the other hand, when the syntax alf_pred_coef_mode=1, the first linear filter section 701 sets the value of the filter coefficient $a_i$ to the sum of the syntax alf_coeff_luma[i] and a value of the filter coefficient $a_i$ in the previous frame.

The syntax alf_parallel_mode is information (mode specification information) specifying whether the loop filter section 120 is to be operated in the first mode or in the second mode when the syntax adaptive_loop_filter_flag=1. In other words, the syntax alf_parallel_mode is information specifying whether or not the filtering operation of the BF section 301 and the filtering operation of the first linear filter section 701 are to be performed in parallel with each other. As described previously, when the syntax alf_parallel_mode=0, the loop filter section 120a operates in the first mode, and when the syntax alf_parallel_mode=1, the loop filter section 120a operates in the second mode.

As described previously, the syntax alf_length_luma_minus5_div 2 is information (tap number specification information) specifying (i) the tap number N of the second linear filter section 702 in the first mode and (ii) the tap number M of the first linear filter section 701 in the second mode. As described previously, when the syntax alf_length_luma_minus5_div 2=0, 1, 2 or 3, each of the tap number M (in the second mode) and the tap number N (in the first mode) is set to 5, 7, 9 or 11, respectively. In order to decrease a data size of the filter parameter as much as possible, the loop filter section 120a is configured such that the tap number N of the second linear filter section 702 in the first mode and the tap number M of the first linear filter section 701 in the second mode are specified by a single parameter.

The syntax alf_coeff_luma[i] is information specifying (i) each filter coefficient of the first linear filter section 701 and the second linear filter section 702 and (ii) an offset o. For example, when the tap number N=5 in the first mode, the syntax alf_coeff_luma[i] specifies 25 filter coefficients of the second linear filter section 702 and one (1) offset. Note that in a case where the second linear filter section 702 is a symmetric linear filter (in a case where aij (which is a matrix representation of a filter coefficient)=aji), the number of filter coefficients to be specified for the second linear filter section 702 is (N×N+1)/2=13. When the tap number M is 5 in the second mode, the syntax alf_coeff_luma[i] specifies 25 filter coefficients of the first linear filter section 701, one (1) filter coefficient of the second linear filter section 702, and one (1) offset c. Note that in a case where the first linear filter section 701 is a symmetric linear filter, the number of filter coefficients to be specified for the first linear filter section 701 is (M×M+1)/2.

If the moving image decoder 1 further includes an adaptive filter which acts on the color difference signals, the filter parameter may further include syntaxes (alf_chroma_idc, alf_length_chroma_minus5_div 2, and alf_coeff_chroma[i]) which are associated with color difference signals. The syntax alf_chroma_idc is information indicative of whether or not to cause the adaptive filter to act on the color difference signals. The syntax alf_length_chroma_minus5_div is information indicative of a tap number of the adaptive filter. The syntax alf_coeff_chroma[i] is information indicative of a filter coefficient and an offset of the adaptive filter.

Modified Example 2

Next, a second modified example of the loop filter section 120 shown in FIG. 20 will be described with reference to FIG. 23.

A loop filter section 120b according to the present modified example is a filter device operable in (1) a first mode where an upper limit value settable for a tap number N of a second linear filter section 702 is not determined, and (2) a second mode where the upper limit value settable for the tap number N of the second linear filter section 702 is determined to Nmax. The tap number N of the second linear filter section 702 is not determined to a value larger than Nmax in the second mode. That is, the second linear filter section 702 does not carry out an excessively heavy-load filtering operation in the second mode.

Whether the loop filter section 120b operates in the first mode or in the second mode is controlled by mode specification information (which is represented herein by "alf_parallel_mode") included in a filter parameter to be supplied by the moving image encoder 2. In the present modified example, when the alf_parallel_mode=0 (zero), the loop filter section 120b operates in the first mode, and when the alf_parallel_mode=1, the loop filter section 120b operates in the second mode.

Figure 23:
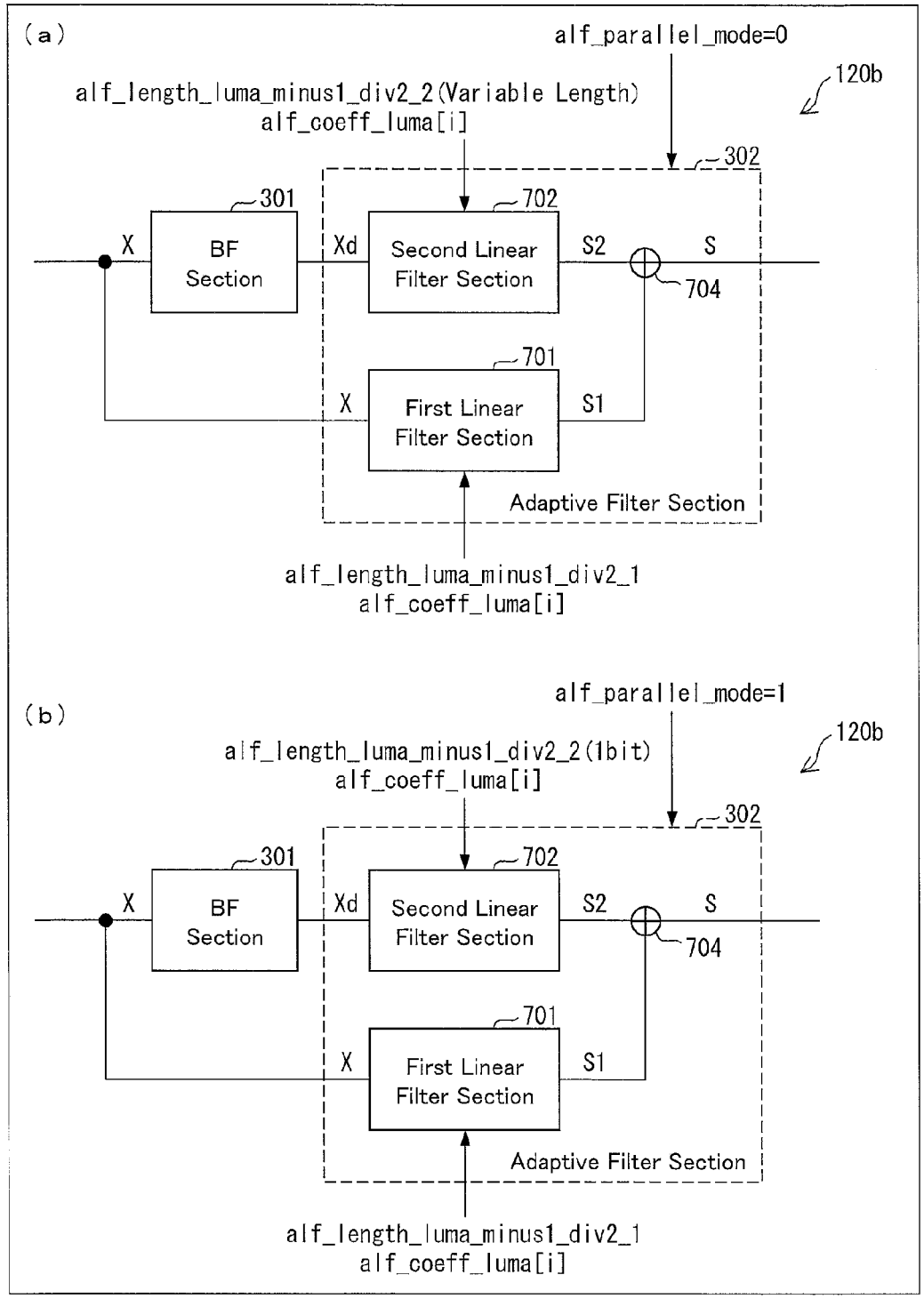
FIG. 23 is a block diagram showing a second modification example of the loop filter section shown in FIG. 20, wherein (a) shows how the loop filter section operates in the first mode, and (b) shows how the loop filter section operates in the second operation mode.

FIG. 23 is a block diagram showing how the loop filter section 120b of Modified Example 2 operates. (a) of FIG. 23 shows how the loop filter section 120b operates in the first mode. (b) of FIG. 23 shows how the loop filter section 120b operates in the second mode.

In the first mode, as shown in (a) of FIG. 23, the second linear filter section 702 receives, from the moving image encoder 2, variable-length tap number specification information alf_length_luma_minus1_div 2__2 that is tap number specification information specifying the tap number of the second linear filter section 702. When the alf_parallel_mode=0 (zero), the second linear filter section 702 decodes its own tap number N of alf_length_luma_minus1_div 2__2×2+1 on the basis of the variable-length tap number specification information alf_length_luma_minus1_div 2__2. In the first mode, the tap number N of the second linear filter section 702 can be decoded into any odd number.

Meanwhile, in the second mode, as shown in (b) of FIG. 23, the second linear filter section 702 receives, from the moving image encoder 2, one-bit tap number specification information alf_length_luma_minus1_div 2__2, as the tap number specification information for specifying the tap number of the second linear filter section 702. When the alf_parallel_mode=1, the second linear filter section 702 decodes its own tap number N of alf_length_luma_minus1_div 2__2×2+1 on the basis of the one-bit tap number specification information alf_length_luma_minus1_div 2__2. In the second mode, the tap number N of the second linear filter section 702 can be decoded into 1 or 3. In this case, an upper limit value Nmax settable for the tap number N of is 3.

Since the tap number N of the second linear filter section 702 is set to a value equal to or smaller than the upper limit Nmax, the filtering operation of the second linear filter section 702 becomes light-load processing in the second mode. Therefore, the filtering operation of the BF section 301 and the filtering operation of the adaptive filter section 302 can be generally parallelized.

A first linear filter section 701 decodes its own tap number M of alf_length_luma_minus1_div 2__1×2+1 on the basis of another tap number specification information alf_length_luma_minus1_div 2__1 included in the filter parameter. That is, the loop filter section 120b decodes the tap number M of the first linear filter section 701 and the tap number N of the second linear filter section 702 on the basis of the two pieces of tap number specification information included in the filter parameter.

In the present modified example, the first mode is an operation mode where the upper limit value settable for the tap number N of the second linear filter section 702 is not determined. However, the first mode is not limited to the operation mode but may be an operation mode where the upper limit value settable for the tap number N of the second linear filter section 702 is determined to Nmax'. In this case, for example, two-bit tap number specification information can be used as the tap number specification information alf_length_luma_minus1_div 2__2. Even in such a configuration, it is apparent that the same effect as that achieved by the present modified example can be achieved provided that the upper limit value Nmax' in the first mode is larger than the upper limit value Nmax in the second mode.

The filter parameter shown in FIG. 22 is applicable to the present modified example by substituting the tap number specification information alf_length_luma_minus1_div 2__1 and the tap number specification information alf_length_luma_minus1_div 2__2 for the tap number specification information alf_length_luma_minus5_div 2.

Modified Example 3

Figure 24:
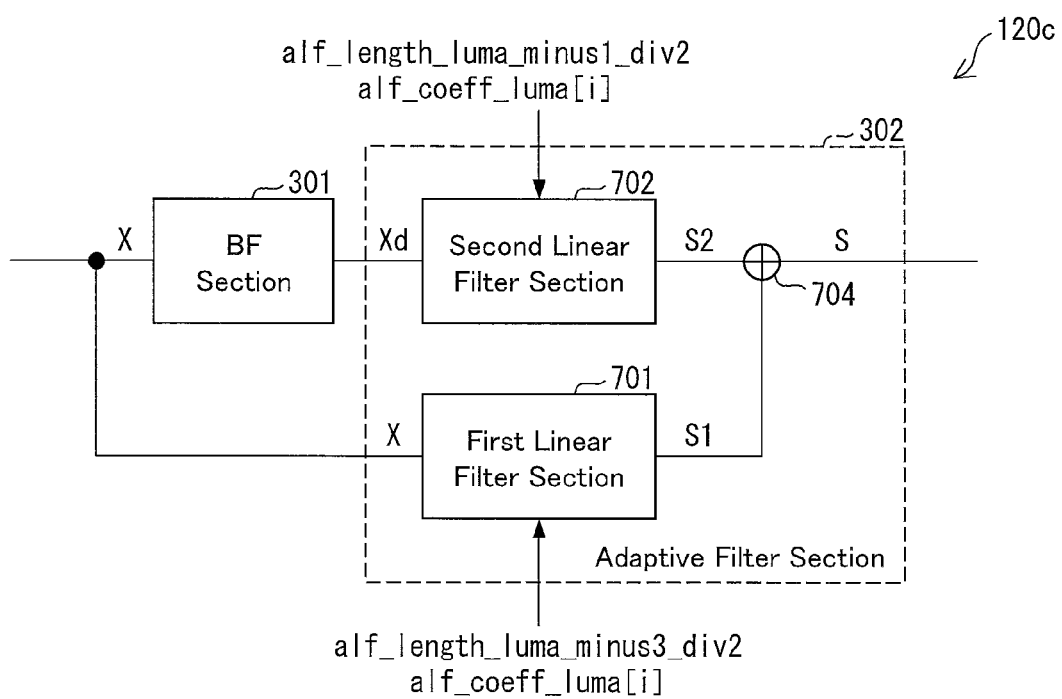
FIG. 24 is a block diagram showing a third modification example of the loop filter section shown in FIG. 20.

A third modified example of the loop filter section 120 shown in FIG. 20 will be described with reference to FIG. 24.

A loop filter section 120c according to the present modified example, as with the loop filter 120b according to the second modified example, decodes the tap number M of the first linear filter section 701 and the tap number N of the second linear filter section 702 on the basis of two pieces of tap number specification information contained in a filter parameter. Note, however, that an operation mode is not switched, unlike the loop filter section 120b according to the second modified example.

More specifically, the first linear filter section 701 decodes its own tap number M of alf_length_luma_minus3_div 2×2+3 on the basis of two-bit tap number specification information alf_length_luma_minus3_div 2. Therefore, the tap number M of the first linear filter section 701 is decoded into any one of 3, 5, 7 and 9. The second linear filter section 702 decodes its own tap number N of alf_length_luma_minus1_div 2×2+1 on the basis of one-bit second tap number specification information alf_length_luma_minus1_div 2. Therefore, the tap number N of the second linear filter section 702 is decoded into 1 or 3. That is, an upper limit value Nmax settable for the tap number N is 3, as in the loop filter section 120b according to the second modified example.

Since the tap number N of the second linear filter section 702 is set to a value equal to or smaller than the upper limit value Nmax, the filtering operation of the second linear filter section 702 becomes light-load processing in the loop filter section 120c according to the present modified example. Therefore, the filtering operation of the BF section 301 and the filtering operation of the adaptive filter section 302 can be generally parallelized.

The filter parameter shown in FIG. 22 is applicable to the present modified example by (1) eliminating the mode specification information alf_parallel_mode from the filter parameter and (2) substituting the tap number specification information alf_length_luma_minus3_div 2 and the tap number specification information alf_length_luma_minus1_div 2 for the tap number specification information alf_length_luma_minus5_div 2.

The present modified example has adopted the configuration where the tap number M of the first linear filter section 701 and the tap number N of the second linear filter section 702 are determined on the basis of two respective pieces of tap number specification information if these two tap numbers are variable. Alternatively adopted may be the configuration where if either the tap number M of the first linear filter section 701 or the tap number N of the second linear filter section 702 is variable, a variable one of these tap numbers is determined on the basis of a piece of tap number specification information. For example, in a case where the tap number N of the second linear filter section 702 is fixed to 1 while the tap number M of the first linear filter section 701 is variable, the tap number M can be determined on the basis of a piece of tap number specification information contained in a filter parameter.

Embodiment 2

As is already described above, Non-Patent Literature 3 discloses a configuration in which a prediction residual, a prediction image, and a decoded image (sum of the prediction residual and the prediction image) applied to non-linear de-noising filter is regarded as an input image of ALF, and in which a de-blocking filter is provided at a stage subsequent to the ALF.

There is, however, the problem that necessary amount of processing and processing time are undesirably increased in the case where use is made, without modification, of the arrangement disclosed in Non Patent Literature 3, that is, the arrangement in which the above three input images are inputted to an ALF.

The present embodiment describes, with reference to FIGS. 25 through 30, a filter device that can, even in the case where the number of inputs is three, reduce at least one of the amount of processing and the processing time, while maintaining high coding efficiency.

Figure 25:
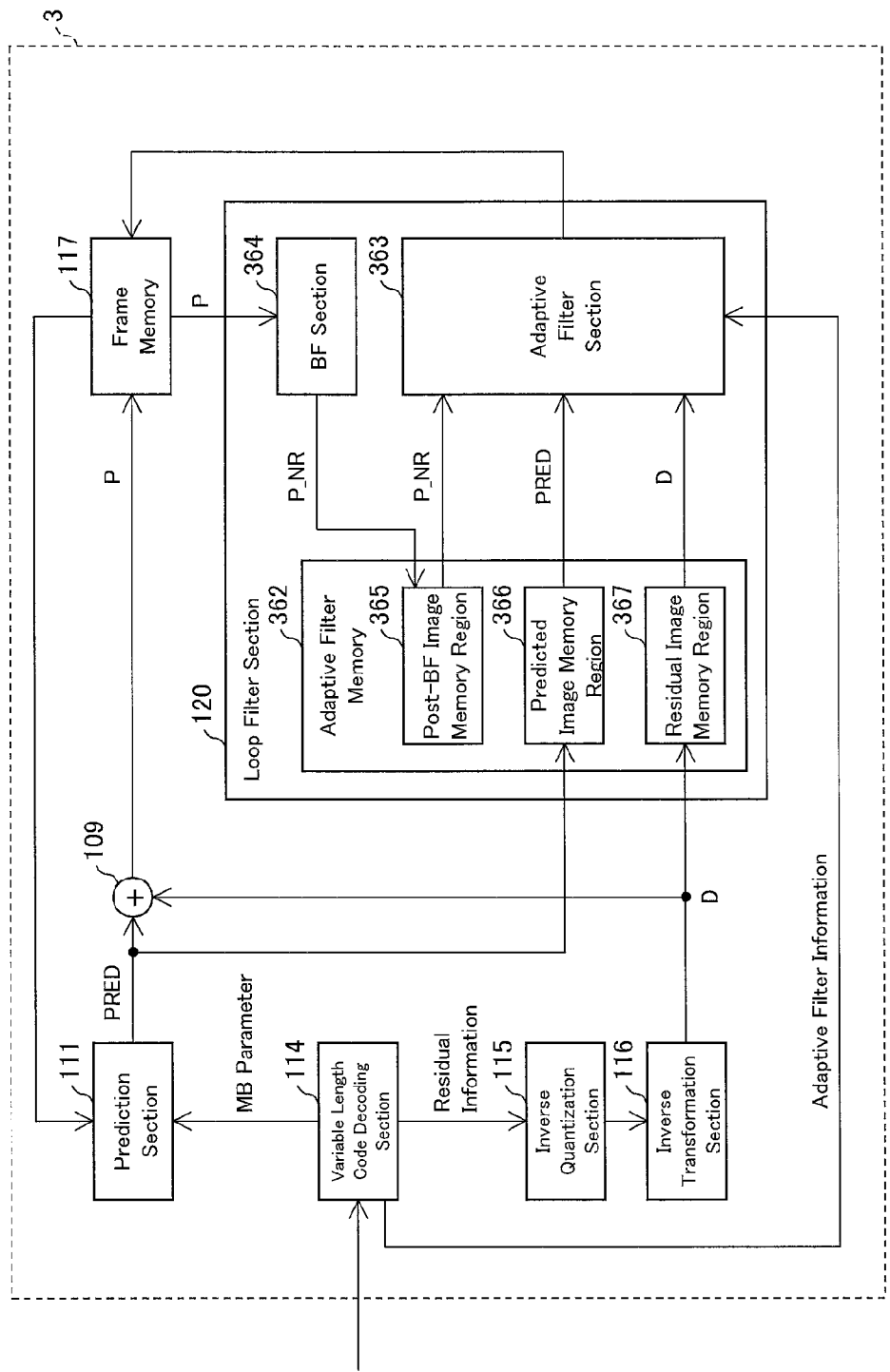
FIG. 25 is a block diagram of a moving image decoder according to a second embodiment of the present invention.

FIG. 25 is a block diagram showing a configuration of a moving image decoder 3 of the present embodiment. As shown in FIG. 25, the moving image decoder 3 includes: a variable length code decoding section 114; an inverse quantization section 115; an inverse transformation section 116; a frame memory 117; a prediction section 111; an addition section 109; and a loop filter section 120. The moving image decoder 3 is a device that decodes coded data to generate a moving image. The variable length code decoding section 114, the prediction section 111, the inverse quantization section 115, the inverse transformation section 116, the addition section 109, and the frame memory 117 are identical in arrangement to the respective corresponding members included in the moving image decoder 1, and are thus not described for their respective arrangements. The description below deals with the loop filter section 120.

The description below of the present embodiment may use (i) the term "predicted image Pred" to refer to a predicted image generated by the prediction section 111, (ii) the term "residual image (prediction residual) D" to refer to a residual image generated by the inverse transformation section 116, and (iii) the term "decoded image P" to refer to a decoded image generated by the addition section 109.

(Loop Filter Section 120)

The loop filter section 120 of the present embodiment carries out a noise elimination process with respect to a decoded image P to generate a post-BF image (hereinafter also referred to as "post-BF image P_NR" in the present embodiment). The loop filter section 120 of the present embodiment further (i) carries out an adaptive filter process with respect to at least one of (1) the post-BF image P_NR, (2) the predicted image PRED outputted from the prediction section 111, and (3) the prediction residual D outputted from the inverse transformation section 116, and thus (ii) generates a post-adaptive-filter decoded image P_ALF.

With reference to FIG. 25, the following will more specifically the configuration of the loop filter section 120 of the present embodiment. As shown in FIG. 25, the loop filter section 120 includes: an adaptive filter memory 362; an adaptive filter section 363; and a BF section 364. The BF section 364 is identical in arrangement to the BF section 301 described above with reference to FIG. 3, and is thus not described here. The adaptive filter memory 362 includes three memory regions for storing respective images (namely, a predicted image PRED, a prediction residual D, and a post-BF image P_NR) used in the adaptive filter section 363. More specifically, the adaptive filter memory 362 includes: a predicted image memory region 366 for storing a predicted image PRED; a residual image memory region 367 for storing a prediction residual D; and a post-BF image memory region 365 for storing a post-BF image P_NR.

(Adaptive Filter Section 363)

As shown in FIG. 25, the adaptive filter section 363 (i) carries out, with respect to the predicted image PRED, the prediction residual D, and the post-BF image P_NR, an adaptive filter process involving use of a filter coefficient and an offset both included in adaptive filter information obtained by decoding coded data, and thus (ii) generates a post-adaptive-filter decoded image P_ALF. The adaptive filter section 363 then stores, in the frame memory 117, the post-adaptive-filter decoded image P_ALF thus generated. The adaptive filter section 363 can carry out an adaptive filter process with respect to any of a sequence, a picture, and a slice as a processing unit. In other words, the adaptive filter section 363 can vary details of the adaptive filter process for each sequence, picture, or slice. The description below deals with an example case in which the adaptive filter section 363 carries out an adaptive filter process with respect to a slice as a processing unit.

Figure 26:
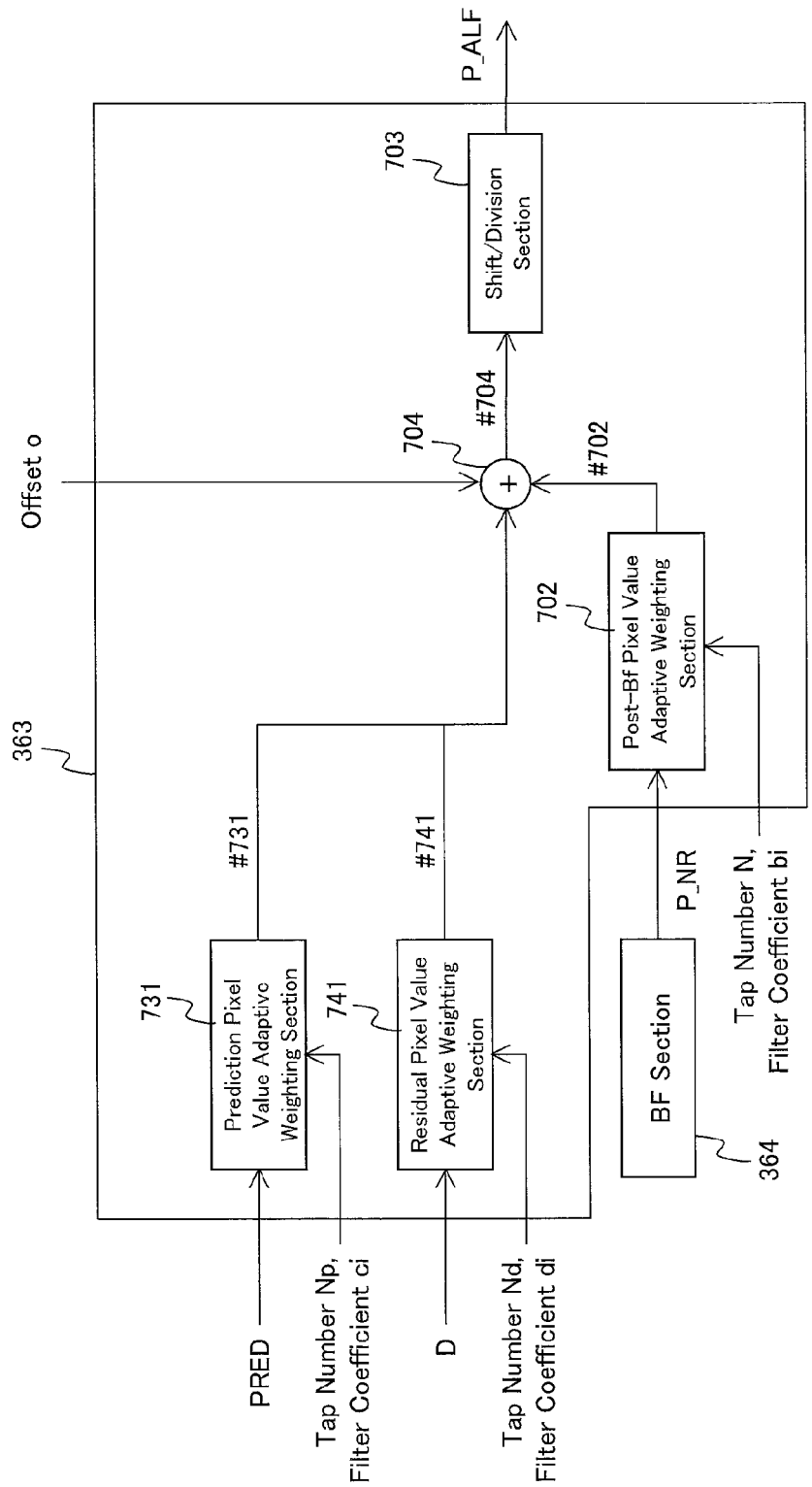
FIG. 26 is a block diagram of an adaptive filter section according to the second embodiment of the present invention.

FIG. 26 is a block diagram showing a configuration of the adaptive filter section 363. As shown in FIG. 26, the adaptive filter section 363 includes: a prediction pixel value adaptive weighting section 731; a residual pixel value adaptive weighting section 741; a post-BF pixel value adaptive weighting section 702; a shift/division section 703; and an addition section 704. The description below may refer to the prediction pixel value adaptive weighting section 731, the residual pixel value adaptive weighting section 741, and the post-BF pixel value adaptive weighting section 702 as "linear filter (section) 731", "linear filter (section) 741", and "linear filter (section) 702", respectively.

(Prediction Pixel Value Adaptive Weighting Section 731)

The prediction pixel value adaptive weighting section 731 works out a weighted sum (weighted linear sum) of individual pixel values of the predicted image PRED with use of filter coefficients ci (i=1 to Nc, where Nc is the total number of filter coefficients ci) to generate a first output image #731. The filter coefficients ci are, among the filter coefficients included in adaptive filter information of coded data, filter coefficients by which the respective pixel values of the predicted image PRED are to be multiplied. The individual filter coefficients ci are hereinafter referred to also as $c(u, v)$.

Specifically, assuming that the first output image #731 has pixel values represented by $S1(x', y')$ and that the predicted image PRED has pixel values represented by $SPred(x, y)$, the prediction pixel value adaptive weighting section 731 calculates the pixel values $S1(x', y')$ from Equation (9-1) below.

[Math. 1]

$$S_1(x', y') = \sum_{(u,v) \in RPred} c(u, v) \times S_{Pred}(x+u, y+v) \quad (9\text{-}1)$$

In the above Equation, the coordinates (x, y) may be (i) identical to the coordinates (x', y'), or may be (ii) different from the coordinates (x', y') as long as the coordinates (x, y) are in one-to-one correspondence with the coordinates (x', y'). $c(u, v)$ represents, among the filter coefficients included in adaptive filter information of coded data, filter coefficients by which the pixel values $SPred(x+u, y+v)$ for the predicted image PRED are to be multiplied.

The present embodiment sets a filter reference region RPred in the predicted image PRED in accordance with the respective positions of pixels (filter target pixels) targeted for calculation of post-filter pixel values. The filter reference region RPred has a size of Np×Np' pixels (where Np may or may not be equal to Np').

The prediction pixel value adaptive weighting section 731, as described above, functions as an Np×Np' tap filter that acts on the predicted image PRED.

(Residual Pixel Value Adaptive Weighting Section 741)

The residual pixel value adaptive weighting section 741 works out a weighted sum (weighted linear sum) of individual pixel values of the prediction residual D with use of filter coefficients di (i=1 to Nd, where Nd is the total number of the filter coefficients di) to generate a second output image #741. The filter coefficients di are, among the filter coefficients included in adaptive filter information of coded data, filter coefficients by which the respective pixel values of the image represented by the prediction residual D are to be multiplied. The individual filter coefficients di are hereinafter referred to also as $d(u, v)$.

Specifically, assuming that the second output image #741 has pixel values represented by $S2(x', y')$ and that the prediction residual D has pixel values represented by $SD(x, y)$, the residual pixel value adaptive weighting section 741 calculates the pixel values $S2(x', y')$ from Equation (9-2) below.

[Math. 2]

$$S_2(x', y') = \sum_{(u,v) \in RD} d(u, v) \times S_D(x+u, y+v) \quad (9\text{-}2)$$

In the above Equation, the coordinates (x, y) may be (i) identical to the coordinates (x', y'), or may be (ii) different from the coordinates (x', y') as long as the coordinates (x, y) are in one-to-one correspondence with the coordinates (x', y'). $d(u, v)$ represents, among the filter coefficients included in adaptive filter information of coded data, filter coefficients by which the pixel values $SD(x+u, y+v)$ of the image represented by the prediction residual D are to be multiplied.

The present embodiment sets a filter reference region RD in the prediction residual D in correspondence with the respective positions of pixels (filter target pixels) targeted for calculation of post-filter pixel values. The filter reference region RD has a size of Nd×Nd' pixels (where Nd may or may not be equal to Nd').

The residual pixel value adaptive weighting section 741, as described above, functions as an Nd×Nd' tap filter that acts on the prediction residual D.

(Post-BF Pixel Value Adaptive Weighting Section 702)

The post-BF pixel value adaptive weighting section 702 works out a weighted sum (weighted linear sum) of individual pixel values of the post-BF image P_NR with use of filter coefficients bi (i=1 to Nb, where Nb is the total number of the filter coefficients bi) to generate a third output image #702. The filter coefficients bi are, among the filter coefficients included in adaptive filter information of coded data, filter coefficients by which the respective pixel values of the post-BF image P_NR are to be multiplied. The individual filter coefficients bi are hereinafter referred to also as $b(u, v)$.

Specifically, assuming that the third output image #702 has pixel values represented by $S3(x', y')$ and that the post-BF image P_NR has pixel values represented by $SPNR(x, y)$, the post-BF pixel value adaptive weighting section 702 calculates the pixel values $S3(x', y')$ from Equation (9-3) below.

[Math. 3]

$$S_3(x', y') = \sum_{(u,v) \in RPNR} b(u, v) \times S_{PNR}(x+u, y+v) \quad (9\text{-}3)$$

In the above Equation, the coordinates (x, y) may be (i) identical to the coordinates (x', y'), or may be (ii) different from the coordinates (x', y') as long as the coordinates (x, y) are in one-to-one correspondence with the coordinates (x', y'). $b(u, v)$ represents, among the filter coefficients included in adaptive filter information of coded data, filter coefficients by which the pixel values $SPNR(x+u, y+v)$ of the post-BF image P_NR are to be multiplied.

The present embodiment sets a filter reference region RPNR in the post-BF image P_NR in accordance with the respective positions of pixels (filter target pixels) targeted for calculation of post-filter pixel values. The filter reference region RPNR has a size of N×N' pixels (where N may or may not be equal to N').

The post-BF pixel value adaptive weighting section 702, as described above, functions as an N×N' tap filter that acts on the post-BF image P_NR.

(Addition Section 704)

The addition section 704 performs addition of each pixel value of the first output image #731, the corresponding pixel value of the second output image #741, the corresponding pixel value of the third output image #702, and an offset o to generate an output image #704. Specifically, assuming that the output image #704 has pixel values represented by So(x, y), the addition section 704 calculates the pixel values So(x, y) from Equation (9-4) below.

[Math. 4]

$$S_0(x,y) = (x,y) + S_2(x,y) + S_3(x,y) + o \quad (9\text{-}4)$$

In the above Equation, the offset o represents an offset included in adaptive filter information of coded data.

(Shift/Division Section 703)

The shift/division section 703 carries out, with respect to the individual pixel values of the output image #704 generated by the addition section 704, a division process involving a rounded shift arithmetic operation, and thus generates a post-adaptive-filter decoded image P_ALF. The process carried out by the shift/division section 703 is as detailed in Embodiment 1, and is thus not described here.

As described above, the adaptive filter section 363 (i) includes the post-BF pixel value adaptive weighting section 702 at a stage subsequent to the BF section 364 and causes the post-BF pixel value adaptive weighting section 702 to act on the post-BF image P_NR outputted from the BF section 364, and (ii) includes the prediction pixel value adaptive weighting section 731 and the residual pixel value adaptive weighting section 741 both in parallel with the BF section 364 and causes the prediction pixel value adaptive weighting section 731 and the residual pixel value adaptive weighting section 741 to each act on a pre-BF image inputted to the BF section 364.

The description below deals with arrangement examples, with greater details, of the adaptive filter section 363.

Arrangement Example 1

Providing the prediction pixel value adaptive weighting section 731 and the residual pixel value adaptive weighting section 741 (each of which is a spatial filter) in parallel with the BF section 364 can reduce the tap number N×N' of the post-BF pixel value adaptive weighting section 702 without decreasing coding efficiency.

Reducing the tap number N×N' of the post-BF pixel value adaptive weighting section 702 can further reduce the processing time required to generate the first output image #731, the second output image #741, and the third output image #702 by parallel processing. In particular, setting the tap number of the post-BF pixel value adaptive weighting section 702 to a 1×1 tap can most reduce the processing time required for the parallel processing, that is, most improve parallelism. This corresponds to the case in which the post-BF pixel value adaptive weighting section 702 refers to only one pixel (filter target pixel) of the post-BF image P_NR, and calculates only the product of that pixel and a weighting factor. The tap number Nc x Nc' for the predicted image PRED and the tap number Nd x Nd' for the residual image D may each be any value (which may even be 0).

As described above, according to the present arrangement example, limiting the tap number for the post-BF image P_NR can improve parallelism.

Arrangement Example 2

The arrangement described below intends to limit the tap number Nd×Nd' for the residual image D to achieve the effect of reducing the amount of processing and the amount of data transfer. More specifically, the arrangement below intends to reduce the tap number Nd×Nd' for the residual image D to achieve the effect of reducing the amount of processing and the amount of data transfer. The present arrangement example achieves its maximum effect in the case where the tap number Nd×Nd' for the residual image D is 1×1. The residual image D is an image produced by inverse quantization and inverse transformation of decoded transform coefficients. In a quantization process in which an encoding device generates transform coefficients, the encoding device, in order to reduce the number of the transform coefficients, often carries out, not a rounding process for rounding off transform coefficients, but a rounding process for rounding down a figure smaller than ⅓ and rounding up a figure not smaller than ⅓ (or rounding down a figure smaller than ⅙ and rounding up a figure not smaller than ⅙). In this case, the residual image D is likely to have pixel values that are each shifted to be smaller in absolute value than its original value. It should thus be appropriate to correct (increase) each pixel value with use of the product of filter coefficients. Such a measure is effective even in the case where the reference range is small. It is thus appropriate to limit the tap number for the residual image D (to 1 in order to achieve the maximum effect) so that the number is small. The above description explains that the residual image D is likely to have pixel values that are each shifted to be smaller in absolute value than its original value. However, in the case where the inverse quantization includes a process that compensates for such a shift (that is, a process that increases the absolute values), the shift direction may be opposite. Further, since the quantization is carried out within a frequency domain, the above description may or may not apply to a change in a pixel region. It is thus appropriate to carry out a process involving use of an adaptive filter including a residual image D with use of adaptive weighting factors.

The present arrangement example, as described above, intends to reduce the tap number N×N' of the linear filter section 702 without decreasing coding efficiency, and thus achieves the effect of reducing the amount of computation and the amount of data transfer.

Arrangement Example 2'

The tap number Nd×Nd' for the residual image D can be limited in conjunction with a limit to the tap number N×N' for the post-BF image P_NR. In this case, however, the two linear filters cannot easily achieve the effect as spatial (planar, two-dimensional) filters. For instance, in the case where the tap number Nd×Nd' for the residual image D and the tap number N×N' for the post-BF image P_NR are each set to 1×1, two-dimensional correlation of the image cannot be utilized. In such a case, it is appropriate to not limit the tap number for the predicted image PRED to such a number as one (1) tap, but to achieve the effect as planar filters.

The predicted image PRED, particularly in intra prediction, tends to be highly correlated with a particular direction (typically, correlated with a left direction or an upward direction). This tendency arises from a constraint under which already decoded pixels are used for prediction. A typical image, however, has correlation along an edge direction, and has correlation in point symmetry with respect to a certain pixel. To utilize such correlation, it is appropriate to use a two-dimensional filter. Specifically, using pixels in a direction (for example, downward or right) that was unable to be referred to can make an image more similar to its original image. It is thus appropriate to use a two-dimensional filter for the predicted image PRED. To further reduce the amount of computation, the tap number for the predicted image PRED may simply be limited. The maximum effect can be achieved in the case where the tap number for the predicted image PRED is 1. In the case where the reference range corresponds to one (1) pixel, it is simply necessary to refer to the pixel present at the position corresponding to a filter target pixel.

Arrangement Example 2''

As an alternatively arrangement, it is appropriate to limit the tap number Nd×Nd' for the residual image D in conjunction with a limit to the tap number Nc×Nc' for the predicted image PRED. The maximum effect is achieved in the case where Nd=Nd'=Nc=Nc'=1. This alternatively arrangement also refers to the pixel present at the position corresponding to a filter target pixel.

In the above case, it is appropriate to not limit the tap number N×N' for the post-BF image P_NR to 1×1 tap, but to utilize two-dimensional correlation of the image. This case, however, requires a large amount of processing to be handled by the linear filter 702, which cannot carry out a process simultaneously with the BF process. There is thus only a small effect achieved by allowing parallel processing by the linear filters 731 and 741 and the linear filter 702. However, the present arrangement example, as described below, achieves a great effect of reducing the amount of data transfer.

As is already described above with reference to the diagram shown in FIG. 10 to explain data transfer, in the case where a decoding process can be carried out simultaneously with respective processes of the BF section and the adaptive filter section 363, there is no need to transfer, between the moving image decoder 3 and an external memory, intermediate data (namely, the predicted image PRED, the prediction residual D, and the post-BF image P_NR in the present embodiment) generated during the above processes. The configuration of (a) of FIG. 10, for example, requires an adaptive filter memory 362 that stores a processing unit for a loop filter, for example, images (namely, the post-BF image P_NR, the predicted image PRED, and the prediction residual D in the present embodiment) necessary for the adaptive filter section 363 to process one (1) slice. In the case where the predicted image PRED is processed by an internal memory during a decoding process, these are transferred to an external memory for storage. When the predicted image PRED is processed by the adaptive filter section 363, the predicted image PRED needs to be transferred from the external memory back to the internal memory.

The prediction section 111, the inverse quantization section 115, the inverse transformation section 116, and the addition section 109 each carry out its process in blocks. In the case where only one pixel is referred to for each of the predicted image PRED and the prediction residual D as described above, this decoding process can be carried out simultaneously with both of the respective processes of the linear filters 731 and 741. Specifically, (i) immediately after the prediction section 111 generates a predicted image PRED, the linear filter 731 simultaneously calculates the product of the predicted image PRED and weighting factors $c_i$, and similarly (ii) immediately after the inverse quantization section 115 and the inverse transformation section 116 generate a prediction residual D, the product of the prediction residual D and weighting factors $d_i$ can be calculated.

Respective outputs of the linear filters 731 and 741 may need to be transferred to an external memory. Even in this case, transferring the sum of the two outputs to an external memory can reduce the number of transfers from 2 to 1. Not only the present arrangement example but also any other arrangement of the present invention can use the method of reducing the number of transfers by transferring, to an external memory through a single operation, the sum of respective outputs of a plurality of filter processes making up a loop filter (or an adaptive filter).

The arrangement described above can, instead of transferring the predicted image PRED and the prediction residual D to an external memory, cause the linear filters 731 and 741 to process the predicted image PRED and the prediction residual D in an internal memory, and thus reduces the amount of data transfer. The above arrangement can further reduce transfer time, and thus allows an extremely high-speed processing.

Arrangement Example 3

The arrangement described above limits the tap number for a signal inputted to the adaptive filter section 363, and thus achieves the effect of (i) improving parallelism and (ii) reducing the amount of computation and the amount of transfer. Such reduction in amount of computation and amount of transfer can also be achieved by limiting a reference range to a decoded image as described below.

Figure 27:
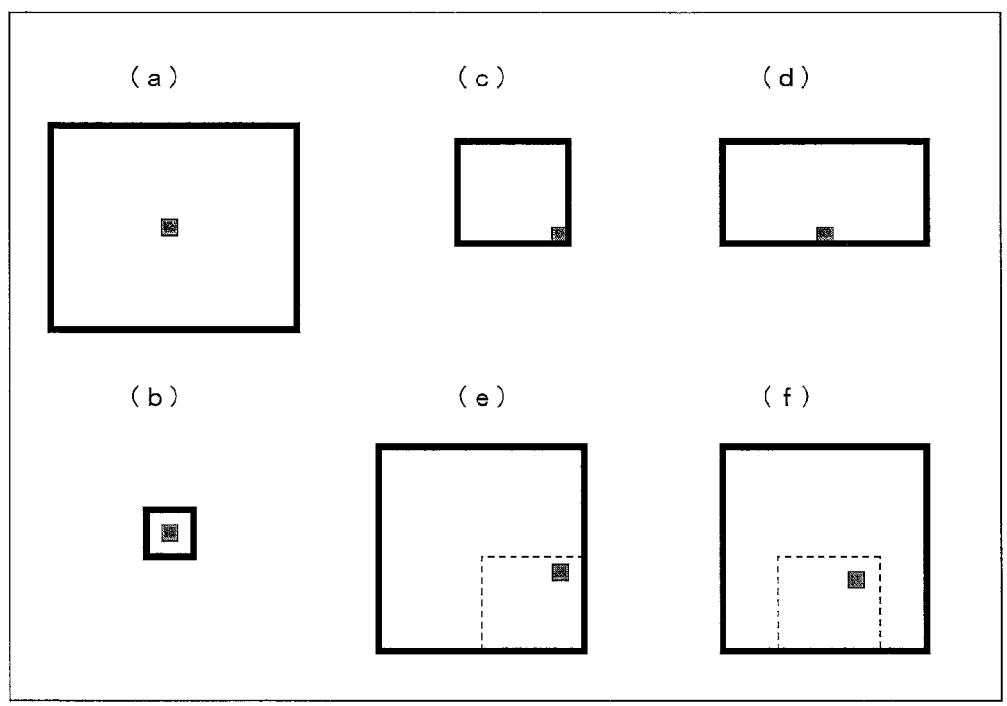
FIG. 27 is a view exemplifying the reference range of an adaptive filter section according to the second embodiment of the present invention.

(a) through (f) of FIG. 27 are each an example of a reference range in an input image supplied to each of the linear filters 731, 741, and 702 included in the adaptive filter section 363 which reference range is referred to by each linear filter in calculating the pixel value of a filter target pixel. The reference range is a range that at least partially overlaps the filter reference region described above. In the present arrangement example, each linear filter included in the adaptive filter section 363 calculates its output with reference to the pixel values of each input image present in a reference range set in correspondence with the position of filter target pixels.

In (a) through (f) of FIG. 27, (i) the gray rectangle indicates the position of a filter target pixel, (ii) the rectangle in solid lines indicates a range (reference range) in an image which area is referred to by each linear filter included in the adaptive filter section 363, and (iii) the rectangle in dash lines indicates a block containing the filter target pixel. Such a block containing the filter target pixel may be any of the following units called a transform block, a prediction block, a macroblock, a coding unit, and a largest coding unit. For example, in the description below, the phrase "right-side block" refers to (i) a right-side macroblock in the case where the "block" is a macroblock and (ii) a "right-side largest coding unit" in the case where the "block" is a largest coding unit.

(a) of FIG. 27 illustrates an example that involves no particular constraint and that refers to an N×N image in the case where the tap number of the reference range is N. In other words, the example of (a) of FIG. 27 refers to all the pixels present in the filter reference region. The above statement that no constraint is involved means the above reference to all the pixels present in the filter reference region. (b) of FIG. 27 illustrates an example that limits the reference range to a range smaller than that of (a). In the case where the reference range is limited most, the reference range corresponds to 1×1 pixel. (c) of FIG. 27 illustrates an example that refers to only an image present to the left of and above a filter target image. (d) of FIG. 27 illustrates an example that refers to only an image present not below a filter target image. (e) of FIG. 27 illustrates an example that refers to only an image present (i)

in the block to which a filter target image belongs and (ii) to the left of and above that block. (f) of FIG. 27 illustrates an example that does not refer to pixels present below the block to which a filter target image belongs. The above description uses the expressions such as "to the left of" and "above" on the assumption that a decoding process is carried out in blocks in a raster scan order. (c) of FIG. 27, to be more precise, illustrates an example that refers to a decoded image. (d) of FIG. 27 illustrates an example that refers to (i) a decoded image and (ii) an image present to the right of the decoded image (that is, an example that does not refer to an image in a block yet to be decoded). (e) of FIG. 27 illustrates an example that refers to (i) a decoded image and (ii) an image in the block containing a filter target pixel. Finally, (f) of FIG. 27 illustrates an example that refers to (i) a decoded image, (ii) an image in the block containing a filter target pixel, and (iii) an image in a block present to the right of the above block (for example, the block adjacent to the right side of the above block), that is, an example that does not refer to an image in a block yet to be decoded except for blocks present on the same line as a filter target block. While the preceding sentence uses the expression "on the same line", a block present on a line above the same line as a filter target block may be referred to. For instance, (i) in the case where images are sectioned in macroblocks, even an image yet to be decoded which image is present on the same macroblock line may be referred to, and (ii) in the case where images are sectioned in largest coding units, even an image yet to be decoded which image is present on the same largest coding unit line may be referred to.

The respective reference ranges shown in (c) through (f) of FIG. 27 may alternatively be described as follows: (c) of FIG. 27 illustrates a reference range set so that a portion of its lower side and a portion of its right side overlap the lower side and right side of a target pixel, respectively. (d) of FIG. 27 illustrates a reference range set so that a portion of its lower side overlaps the lower side of a target pixel. (e) of FIG. 27 illustrates a reference range composed of (i) the target block containing a target pixel and (ii) a decoded block around the target block. (f) of FIG. 27 illustrates a reference range composed of (i) the target block containing a target pixel, (ii) a decoded block around the target block, and (iii) a block to be decoded immediately after the target block.

The above reference ranges may be used for any of the pre-BF image, the post-BF image, the predicted image PRED, and the residual image D. In other words, the above reference ranges may each be used as an input signal for at least one of the linear filter sections 701, 702, 731, and 741.

In the case where only an image present to the left of and above a filter target pixel is referred to as under the constraint shown in (c) of FIG. 27, such an image is an already decoded image. This eliminates the need to wait for a process by a corresponding linear filter section until the entire reference image in the reference range becomes able to be referred to. For instance, in the case where a reference image for the pre-BF image is simply limited to the reference range, the linear filter section 701 can carry out a process when the filter target pixel is decoded. Similarly, when the filter target pixel is decoded, (i) the linear filter section 731 can start a process for the predicted image PRED, and (ii) the linear filter section 741 can start a process for the residual image D.

In an arrangement in which a linear filter constituting an adaptive filter receives an input that refers to only an image present not below a filter target pixel as under the constraint of (d) of FIG. 27, there is no need to wait for decoding of an image present below which image may be processed one block line later. In the case where a decoding process is carried out in a raster scan order in units of blocks, there is a need to process a large number of blocks before the respective pixel values of pixels present below a filter target pixel are decoded and referred to. This indicates that there is a need to wait, until the blocks below a filter target pixel are completely decoded (that is, for at the longest a period necessary to decode one block line), to carry out a process of calculating the pixel value of the filter target pixel. In the case where the pixels present below a filter target pixel are referred to, not all input signals can be stored in an internal memory due to its limited capacity. Such input signals need to be temporarily transferred to an external memory. In contrast, there is only a short wait before the pixels present to the right of the target block containing a filter target pixel are completely decoded. This makes it possible to store all the necessary input signals in an internal memory. This arrangement, which involves a constraint under which the pixels present below a filter target pixel are not referred to, achieves a great effect of reducing the amount of data transfer. More specifically, in the case where one or more of the signals (namely, the post-BF image P_NR, the predicted image PRED, and the residual image D) inputted to the adaptive filter section 363 are under one or more of the above constraints, such signals do not need to be transferred to an external memory.

The constraint shown in (e) of FIG. 27 is an example that refers to only an image present to the left of and above the target block to which a filter target pixel belongs. In the case where a linear filter serving as an adaptive filter receives an input that refers to only such an image, there is no need to wait for decoding of an image present to the right of a filter target pixel which image may be processed one block later. Specifically, since the entire image necessary for a process by the linear filter has been produced when decoding of the block to which the above input belongs is finished, an immediate process can be carried out without needing to wait for decoding of the following block. There is a need to wait for the end of decoding of the target block as compared to the case shown in (c) of FIG. 27, and is thus a need to internally store an image inputted by the end of the decoding. However, in the case where the unit block is a transform block, a prediction block, a macroblock, a coding unit, or a largest coding unit, such a block is a sufficiently small unit. This prevents a problem related to an internal memory. The arrangement described above achieves a great effect of reducing the amount of data transfer. Specifically, in the case where the above input is a post-BF image P_NR, a predicted image PRED, or a residual image D, there is no need to transfer such an input to an external memory.

The constraint shown in (f) of FIG. 27 is an example that does not refer to an image present below the target block to which a filter target pixel belongs. In the case where a linear filter serving as an adaptive filter receives an input that refers to only such an image, there is no need to wait for decoding of an image present below a filter target pixel which image may be processed one block line later. Specifically, since the entire image (except for pixels that belong to the block present to the right of the target block) necessary to calculate the pixel value of a filter target pixel has been produced when decoding of the block to which the above input belongs is finished, a filter process can be carried out without waiting for a process to be carried out with respect to the block present below the filter target pixel. Specifically, a linear filter process can be carried out with respect to the block present to the left of the block with respect to which a decoding process is being carried out. The arrangement described above achieves a great effect of reducing the amount of data transfer. Specifically, in the case where the above input is a post-BF image P_NR, a predicted image PRED, or a residual image D, there is no need to transfer such an input to an external memory.

The respective examples of (c) and (d) of FIG. 27 each have a reference range that is uniquely defined in correspondence with the position of a filter target pixel. In contrast, according to the respective examples of (e) and (f) of FIG. 27, in the case where the filter target pixel is present closely to the right-side boundary and lower boundary of the target block, the reference range is limited, whereas in the case where the filter target pixel is not present closely to the right-side boundary and lower boundary of the target block, the reference range may, as shown in (a) of FIG. 27, not be limited that is may be identical to the filter reference region.

Stated differently, the respective examples of (c) and (d) of FIG. 27 each have a reference range that does not change depending on the positional relationship between the filter target pixel and a block boundary. In contrast, the respective examples of (e) and (f) of FIG. 27 each have a reference range that does change depending on the positional relationship between the filter target pixel and a block boundary. Specifically, in the case of a filter process in which weighting factors are assigned to a filter target image having a rectangular region with 9×9 taps, a pixel present five pixels away from the filter target pixel is used. Conversely, under the limit shown in (e) of FIG. 27, for example, reference is limited in the case where there are not five or more pixels present between the filter target pixel and the right-side or lower block boundary.

Assuming that for each linear filter, the pixel value of a filter target pixel is set to be calculated by finding the product-sum of each pixel value belonging to the filter reference region and a filter coefficient, it is preferable, in the case where setting a reference range causes any pixel in the filter reference region to be unable to be referred to, to refer to the pixel value of an alternative pixel instead of the above pixel that cannot be referred to. One method to achieve this is to use a conventional padding method to expand the area of pixels that can be referred to. Another method is to use a pixel positioned in point symmetry with respect to a filter target pixel. For instance, in the case where use of an image present below a filter target pixel is limited, a symmetrically positioned image present above the filter target pixel is used. Yet another method is to use a pixel present at the position of a filter target pixel.

As described above, limiting a reference range to a decoded image also can reduce the amount of computation and the amount of transfer. In the case where some filter processes are carried out in advance and the remaining linear filter processes are carried out last, there may be a need to transfer, to an external memory, outputs of the filter processes carried out in advance. Even in such a case, the number of transfers can be reduced by transferring, to an external memory through a single operation, the sum of outputs of the linear filter processes carried out in advance.

FIG. 28 is a diagram partially illustrating structures of a filter parameter (alf_param) included in adaptive filter information to be supplied by a moving image encoder 4 described below. (a) of FIG. 28 illustrates a structure including a mode named "alf_parallel_mode". As is already described above, in the case where the alf_parallel_mode is 1, the post-BF image has a tap number limited to 1. (b) of FIG. 28 illustrates a structure including a mode named "alf_reference_mode". In the case where the alf_reference_mode is 0, the reference range is not limited as shown in (a) of FIG. 27. In the case where the alf_reference_mode is 1, 2, 3, 4, or 5, the reference range is limited as shown in (b), (c), (d), (e), or (f) of FIG. 27, respectively. As described above, while the moving image encoder and the moving image decoder need to share an identical reference range, the reference range may be set in advance, or it is also suitable to specifically change a limit to the reference range by using a filter parameter (adaptive filter information) as described here.

FIG. 29 is a view showing structural examples of the filter parameter (alf_param) included in adaptive filter information to be supplied by a moving image encoder 4 described below. As shown in FIG. 29, the filter parameter of the present structural example is a filter parameter to be supplied for each slice by the moving image encoder 4, and includes all or part of a plurality of syntaxes (adaptive_loop_filter_flag, alf_length_df_minus1_div 2, alf_coeff_df[i], alf_length_error_minus alf_coeff_error[i], alf_length_pred_minus1_div 2, and alf_coeff_pred[i]) for a target slice which are indicative of how the adaptive filter section 363 operates.

The syntax adaptive_loop_filter_flag is information specifying whether or not the adaptive filter section 363 operates for a target slice.

The syntax alf_length_df_minus1_div 2 is information (tap number specification information) specifying the tap number N×N of the linear filter section 702. In the case where the syntax alf_length_df_minus1_div 2=0, 1, 2, or 3, the tap number N is set to 1, 3, 5, or 9, respectively.

The syntax alf_coeff_df[i] is information specifying filter coefficients bi of the linear filter section 702 and an offset o. In a case where the tap number N=5, the syntax alf_coeff_df[i] specifies 25 filter coefficients of the linear filter section 702 and one (1) offset. Note that in a case where the linear filter section 702 is a symmetric linear filter (in a case where aij (which is a matrix representation of a filter coefficient)=aji), the number of filter coefficients of the linear filter section 702 is (N×N+1)/2=13.

Similarly, the syntax alf_length_pred_minus1_div 2 is information specifying the tap number of the linear filter section 731, and the syntax alf_coeff_pred[i] is information specifying filter coefficients ci of the linear filter section 731.

Similarly, the syntax alf_length_error_minus1_div 2 is information specifying the tap number of the linear filter section 741, and the syntax alf_coeff_error[i] is information specifying filter coefficients di of the linear filter section 741.

(a) of FIG. 29 illustrates a configuration that allows respective tap numbers for the post-BF image P_NR, the predicted image PRED, and the prediction residual D to be decoded freely. With use of this configuration as well, in the case where the decoded tap number is 1 or the tap number is small, parallel processing can be carried out. it is possible to carry out an operation, as shown in (c) of FIG. 10, that reduces the amount of data transfer. While the tap number can be selected freely in terms of syntax, it is also appropriate to limit the respective tap numbers for the post-BD image P_NR, predicted image PRED, and the prediction residual D with use of, for example, profile information that limits usable semantics.

(b) of FIG. 29 illustrates a syntax configuration that limits the tap number for the post-BF image P_NR to 1. With use of this configuration as well, since the tap number for the post-BF image P_NR is 1, it is possible to (i) operate the BF section 364 in parallel with the linear filters 731 and 741 and (ii) achieve the effect of reducing the amount of data transfer as described above with reference to FIG. 18. It is also possible to (i) suitably carry out parallel processing of the BF section 364 with the linear filter sections 731 and 741 and (ii) carry out an operation that reduces the amount of data transfer as shown in (c) of FIG. 10.

(c) of FIG. 29 illustrates a syntax configuration that limits the tap number for the prediction residual D to 1. This configuration makes it possible to process the linear filter 741 simultaneously with decoding. This configuration eliminates the need to output the prediction residual D to an external memory.

(d) of FIG. 29 illustrates a syntax configuration that limits the respective tap numbers for the post-BF image P_NR and the prediction residual D to 1. This configuration makes it possible to (i) operate the BF section 364 in parallel with the linear filters 731 and 741 and (ii) process the linear filter 741 simultaneously with decoding. This configuration eliminates the need to output the prediction residual D to an external memory.

(Moving Image Encoder 4)

The description below deals with an arrangement of a moving image encoder 4 of the present embodiment with reference to FIG. 30. The moving image encoder 4 is a decoding device including a portion that uses a technique used in H.264/MPEG-4.AVC and KTA software.

Figure 30:
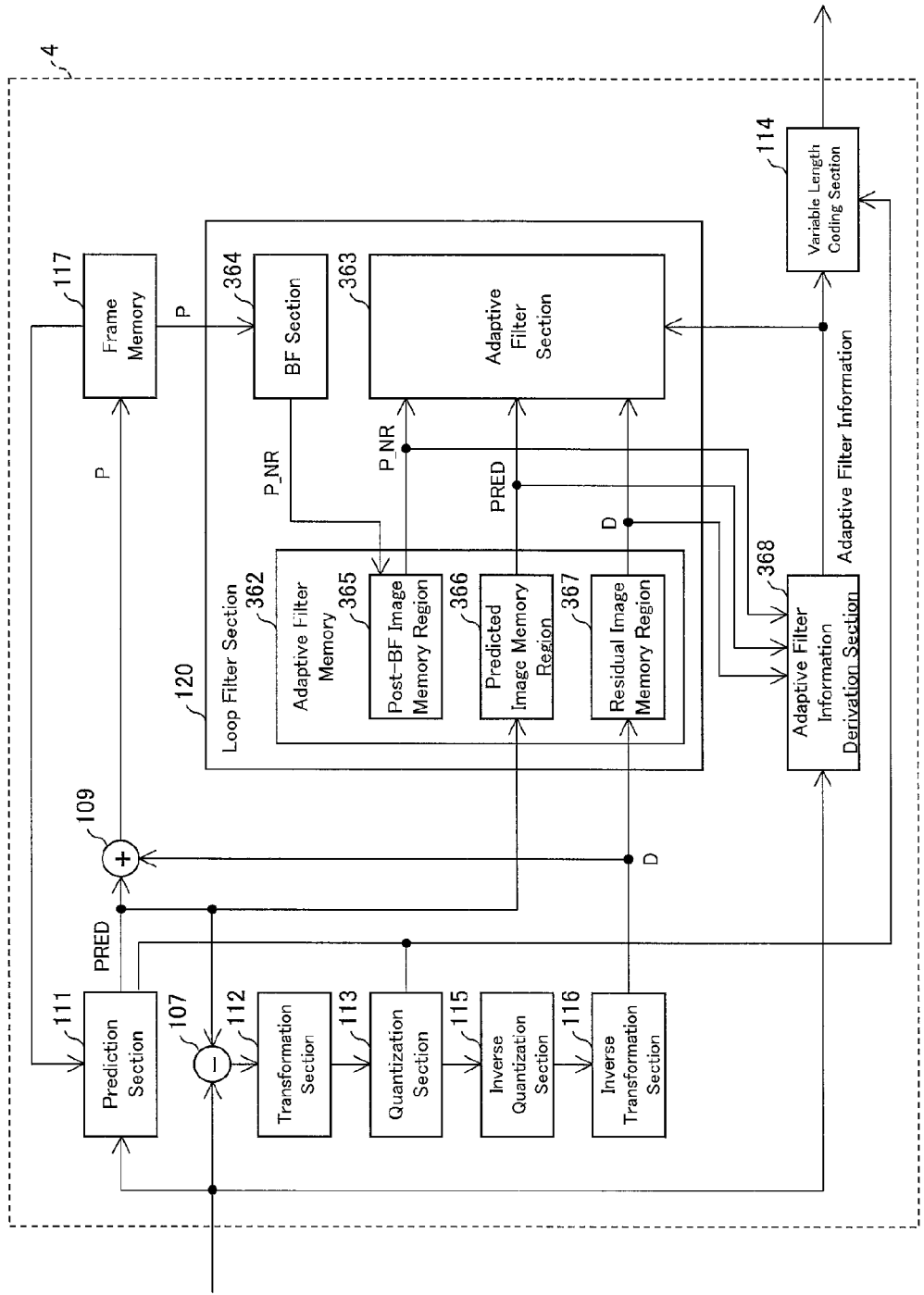
FIG. 30 is a block diagram of a moving image encoder according to the second embodiment of the present invention.

FIG. 30 is a block diagram illustrating a configuration of the moving image encoder 4. As shown in FIG. 30, the moving image encoder 4 includes: a subtraction section 107; an addition section 109; a prediction section 111; a transformation section 112; a quantization section 113; an inverse quantization section 115; an inverse transformation section 116; a frame memory 117; a variable length coding section 114; an adaptive filter information derivation section 368; and a loop filter section 120. The subtraction section 107, the addition section 109, the prediction section 111, the transformation section 112, the quantization section 113, the inverse quantization section 115, the inverse transformation section 116, the frame memory 117, and the variable length coding section 114 are similar to the respective corresponding members included in the moving image encoder 2, and are thus not described here. Further, the individual sections included in the loop filter section 120 of the moving image encoder 4 are similar to the respective corresponding sections of the loop filter section 120 included in the moving image decoder 3, and are thus not described here. Note that the post-BF image P_NR, the predicted image PRED, and the prediction residual D read out from the post-BF image memory region 365, the predicted image memory region 366, and the residual image memory region 367, respectively, are fed to the adaptive filter information derivation section 358, whereas adaptive filter information generated by the adaptive filter information derivation section 368 is fed to the adaptive filter section 363.

(Adaptive Filter Information Derivation Section 368)

The adaptive filter information derivation section 368 generates adaptive filter information that is referred to by (i) the loop filter section 120 included in the moving image decoder 3 and (ii) the loop filter section 120 included in the moving image encoder 4.

The adaptive filter information derivation section 368 determines (1) through (9) below to achieve maximum coding efficiency.

(1) whether to turn on or off the BF section 364 and the adaptive filter section 363

(2) the kinds and combination of images (that is, one or a plurality of a combination of the post-BF image P_NR, the prediction residual D, and the predicted image Pred) to be inputted to the adaptive filter section 363

(3) the tap number of a filter that acts on the post-BF image P_NR (4) filter coefficients that act on the post-BF image P_NR (5) the tap number of a filter that acts on an image represented by the prediction residual D (6) filter coefficients that act on the image represented by prediction residual D (7) the tap number of a filter that acts on the predicted image PRED (8) filter coefficients that act on the predicted image PRED (9) the offset o The adaptive filter information derivation section 368 (i) determines the tap numbers, the filter coefficients, and the offset so that the square error between an encoding target image (original image) and a post-filter image is at its minimum, and (ii) includes the determined tap numbers, filter coefficients, and offset in adaptive filter information. The adaptive filter information thus generated is fed to the adaptive filter section 363 and the variable length coding section 114, and is then included in coded data.

The adaptive filter information derivation section 368 determines filter coefficients b(u, v) of a filter that acts on the post-BF image P_NR, filter coefficients d(u, v) of a filter that acts on the prediction residual D, filter coefficients c(u, v) of a filter that acts on the predicted image PRED, and the offset o so that the error between a post-filter image and an encoding target image (original image) is at its minimum. The adaptive filter information derivation section 368, for instance, determines the filter coefficients b(u, v), the filter coefficients d(u, v), the filter coefficients c(u, v), and the offset o so that the square error E indicated in Equation (10) below is at its minimum.

[Math. 5]

$$E = \sum_{x,y} \left[ \begin{array}{l} S_O(x, y) - \left( \sum_{(u,v) \in RPNR} b(u, v) \times S_{PNR}(x+u, y+v) \right) - \\ \left( \sum_{(u,v) \in RD} d(u, v) \times S_D(x+u, y+v) \right) - \\ \left( \sum_{(u,v) \in RPred} c(u, v) \times S_{Pred}(x+u, y+v) \right) - o \end{array} \right]^2 \quad (10)$$

In the above Equation, SPNR(x, y) represents pixel values of the post-BF image P_NR, SD(x, y) represents pixel values of the prediction residual D, SPred(x, y) represents pixel values of the predicted image PRED, and S0(x, y) represents pixel values of the encoding target image. RPNR, RD, and RPred represent filter reference regions in the post-BF image P_NR, the prediction residual D, and the predicted image PRED, respectively. The adaptive filter information derivation section 368 selects, for each of the tap numbers defining the respective sizes of the filter reference regions RPNR, RD, and RPred, one from among a plurality of candidates (for example, 1 tap, 3 taps, 5 taps, 7 taps, and 9 taps) which achieves maximum coding efficiency.

The process carried out by the adaptive filter information derivation section 368 to calculate the filter coefficients and offset is similar in detail to the above-described calculating process carried out by the adaptive filter information calculating section 118, and is thus not described here.

The filter coefficients b(u, v) determined as above are included as the syntax alf_coeff_df[i] in adaptive filter information (more specifically, filter parameters as a part of the adaptive filter information). The above-determined parameter that specifies the tap number of the filter reference region RPNR is included as alf_length_df_minus1_div 2 in filter parameters (adaptive filter information alf_param( ).

The filter coefficients d(u, v) determined as above are included as the syntax alf_coeff_error[i] in filter parameters (adaptive filter information alf_param( ). The above-determined parameter that specifies the tap number of the filter reference region RD is included as alf_length_error_minus1_div 2 in filter parameters (adaptive filter information alf_param( )).

The filter coefficients c(u, v) determined as above are included as the syntax alf_coeff_pred[i] in filter parameters (adaptive filter information alf_param( )). The above-determined parameter that specifies the tap number of the filter reference region RPred is included as alf_length_pred_minus1_div 2 in filter parameters (adaptive filter information alf_param( )).

The above-determined offset o is included in filter parameters (adaptive filter information alf_param( )) as a component of the syntax alf_coeff_df[i].

The present embodiment may be arranged such that (i) the adaptive filter information derivation section 368 determines (10) through (12) below,

(10) the reference range referred to by a filter that acts on the post-BF image P_NR

(11) the reference range referred to by a filter that acts on an image represented by the prediction residual D

(12) the reference range referred to by a filter that acts on the predicted image PRED, and that (ii) alf_reference_mode specifying the determined reference ranges is included in adaptive filter information. For instance, in the case where the alf_reference_mode is 0, the reference range is not limited as shown in (a) of FIG. 27. In the case where the alf_reference_mode is 1, 2, 3, 4, or 5, the reference range is limited as shown in (b), (c), (d), (e), or (f) of FIG. 27, respectively.

The adaptive filter information derivation section 368 may alternatively be arranged to (i) determine whether to limit the tap number of the post-BF image to 1 and (ii) include, in adaptive filter information, alf_parallel_mode indicative of the result of the determination. As is already described above, in the case where alf_parallel_mode is 1, the tap number of the post-BF image is limited to 1.

As described above, the adaptive filter 120 included in the moving image encoder 4 carries out a filter process involving use of filter parameters that are set so as to achieve maximum coding efficiency. The use of the moving image encoder 4 thus allows generation of coded data #3 having high coding efficiency.

The kind of an image inputted to the adaptive filter section 363 may be specified by information that the moving image encoder 4 obtains from outside. In this case, the adaptive filter information derivation section 368 simply needs to be arranged to determine filter coefficients and offset that are optimum for an image specified by such information.

In the embodiments described above, it is possible to control the moving image decoder and the moving image decoder by causing a computer system to read and execute a program, which is stored in a computer-readable storage medium, for realizing the functions of the moving image decoder and the moving image decoder. The "computer system" used herein includes an OS and hardware such as peripherals.

The "computer-readable storage medium" includes storage devices such as (i) portable media such as a flexible disk, an optical magnetic disk, a ROM, and a CD-ROM, and (ii) hard disk to be incorporated in a computer system. The "computer-readable storage medium" further includes (i) a communication line, through which a program is to be transmitted, for dynamically holding a program for a short period of time, such as a network (for example, the Internet) or a communication line (for example, a telephone line), and (ii) a volatile memory that holds a program for a certain period of time in a computer system which serves as a server or a client for the above transmission. The program may be a program for causing the functions to be partially performed or for causing the functions to be performed in combination with a program which has been stored in a computer system.

[Inventions (1) Described Herein]

It should be noted that at least the following inventions are described herein.

1. A filter device for generating a post-filter image from a filter input image which is an image segmented into blocks and processed, comprising: adaptive filter information storing means for storing adaptive filter information corresponding to the filter input image; and boundary utilization filter means (BF means) for generating a boundary utilization filter image (post-BF image) from the filter input image by using pixels located near a boundary of a block neighboring a filter target pixel and by operating a filter for generating a pixel value of the filter target pixel; and adaptive filter means for carrying out an adaptive filter process, which is controlled by the adaptive filter information, on a basis of the filter input image and the post-BF image.

The BF means selects a block boundary or a pixel neighboring a block boundary to generate the image to be inputted to the adaptive filter. The combination of (i) the BF process of explicitly referring to a boundary and pixels near the boundary and (ii) the adaptive filter enables de-blocking strength adjustments appropriate for the characteristics of sequences and frames and the characteristics of boundaries, thus increasing the distortion correction effect.

The filter means configured as described above achieves the effect of enabling de-blocking strength adjustments appropriate for the characteristics of sequences and frames and the positional relations with the boundaries, through the use of adaptive filter information of a low volume of codes.

2. The filter device according to the above aspect 1, wherein the BF means is de-blocking filter means for generating the post-BF image by carrying out de-blocking filter process for reducing block noise of the filter input image according to the state of the boundary.

The filter means configured as described above achieves the effect of enabling de-blocking strength adjustments appropriate for the characteristics of sequences and frames and the characteristics of the boundaries, through the use of adaptive filter information of a low volume of codes.

3. The filter device according to the above aspect 2, wherein the BF means is degree-of-activity calculating means calculates a degree of activity in an area near a filter target pixel, edge strength calculating means for calculating edge strength at a boundary between one block and its neighboring block, and de-blocking filter for carrying out block noise reduction process at a strength varying depending on the degree of activity thus calculated and the edge strength thus calculated.

The combination of such an adaptive process appropriate for the state of the block boundary and the adaptive filter enables de-blocking strength adjustments appropriate for the characteristics of sequences and frames, the edge strength at the boundary, and the degree of activity, thus increasing the distortion correction effect.

4. The filter device according to the aspects 1 through 3, wherein the adaptive filter information is a weighting factor, and the adaptive filter means carries out an adaptive filter process by assigning weights to the post-BF image and the filter input image on the basis of the adaptive filter information.

The filter means configured as above enables easily calculating a weighting factor by means of the least-squares method or the like method. This achieves the effect of obtaining a significant distortion reduction owing to optimization for the characteristics of sequences and frames.

5. The filter device according to the aspects 1 through 3, wherein the adaptive filter means is such that the means for assigning a weight to the post-BF image is multiplication means for calculating a product of a BF image of one pixel and one weighting factor.

The filter means configured as above enables not only obtaining a high distortion reduction effect but also the following effect. In a case where one region (filter target block) of a filter input image is processed, a required range of the filter input image is smaller than that required for the adaptive filter process. In addition, since an overlap between the required range of the filter input image for the adaptive filter process and the required range of the filter input image for the BF process becomes large, the BF process and the adaptive filter process can be applied on the filter target block through one transfer. This achieves the effect of reducing the amount of data transfer, as compared with the case where the BF process and the adaptive filter process are independently carried out through individual transfers. Besides, since the amount of computation required for the weighting process carried out with respect to the post-BF image can be reduced, a weighting process that is unable to be carried out in parallel with the BF process decreases. This achieves the effect of improving parallelism in a case where the BF process is carried out in parallel with a weighting process carried out with respect to the filter input image.

6. An image decoding device for decoding an image from an encoded input image, comprising:

decoding means for decoding adaptive filter information, residual information, and a predicted image from the input image; and generating means for generating image data from (i) a residual image obtained by inverse quantization and inverse transformation of the residual information and (ii) the predicted image; and a filter device according to any one of the above aspects 1 through 5, the filter device being caused to act on the image data by using filter control information.

A moving image decoder having the above arrangement enables effectively reducing coding distortion of image data, thus improving a quality of a decoded image.

7. An image encoding device for encoding an input image to output an image thus encoded, comprising:

decoded image generating means for generating image data of a locally decoded image from the encoded image;

a filter device according to any one of the above aspects 1 through 5; and adaptive filter information calculating means for calculating adaptive filter information for use in control by adaptive filter means provided in the filter device, from the image data, image data subjected to de-blocking filter, which data is obtained by causing de-blocking filter means of the filter device to act on the image data, the filter device being caused to act on the image data stored in the frame memory, by using the filter control information.

A moving image encoder having the above arrangement enables effectively reducing coding distortion of a locally decoded image used as a reference image, thus enabling compression at high coding efficiency.

8. A procedure, wherein filter means has at least two computation means including a computing section #1 and a computing section #2, and a filter process is carried out in parallel in such a manner the computing section #1 carries out post-BF image generation process in the BF section while the computing section #2 carries out weighting for the filter input image, which weighting is carried out in the adaptive filter means.

A filtering method including the above characteristics enables carrying out two processes, i.e. BF and weighting, in parallel with each other, thus enabling a high-speed processing.

9. A filter data structure of filter control information used in the filter means, the filter control information containing: a weighting factor or a predicted value of the weighting factor each corresponding to a BF pixel value, the BF pixel value being generated on the basis of a filter input image, as an input, supplied to the filter means, by using pixels located near a boundary of a block neighboring a filter target pixel; and a weighting factor or a predicted value of the weighting factor each corresponding to the filter input image supplied to the filter means.

The use of a filter data structure having the above characteristics enables transmission and storage of simultaneously optimized respective values of a weighting factor for the post-BF image and a weighting factor for the filter input image. Therefore, the use of the filter data structure realizes a filter process with an extremely high distortion reduction effect.

Effect of the Above Invention

With the adaptive filter using, as reference pixels referred to by the adaptive filter, a pixel value yet to be subjected to the BF process and a pixel value subjected to the BF process, it is possible to adjust a de-blocking strength that can be calculated with a small amount of processing, with use of a small number of weighting factors (de-blocking strength adjusting effect)

In addition, an adaptive filter including a spatial filter has (i) a weighting factor for correcting strength of block noise reduction and (ii) a weighting factor of the spatial filter, both of which are simultaneously optimized. The use of such an adaptive filter brings about a greater encoding noise reducing effect.

Besides, provision of the above-described loop filer in a moving image decoder and a moving image encoder increases coding efficiency of moving image coding.

[Inventions (2) Described Herein]

Furthermore, at least the following inventions are described herein.

A filter device according to the present invention includes: a boundary filter selectively acting on a block boundary of an image processed block by block; and an adaptive filter including: a first linear filter section acting on an input image to be supplied to the boundary filter; image of the boundary filter, the adaptive filter outputting a sum of an output image of the first linear filter section and an output image of the second linear filter section.

The adaptive filter provided in the filter device according to the present invention performs addition of the output image of the first linear filter section, which acts on an input image to be supplied to the boundary filter, and an output image of the second linear filter section, which acts on an output image of the boundary filter, and then outputs a result of the addition. Therefore, it is possible to reduce the number of taps of the second linear filter section without decreasing coding efficiency or to reduce the number of taps of the first linear filter section without decreasing coding efficiency.

Here, the former effect, i.e. the capability of reducing the number of taps of the second linear filter section without decreasing the coding efficiency means a capability of reducing total computation time without decreasing the coding efficiency. That is, if it is possible to perform the filtering operation of the first linear filter section in parallel with the filtering operation of the boundary filter, a computation time T required for an entire filtering operation is expressed by T=Max(T0+T2, T1) where T0, T1, and T2 are computation time required for filtering operations of the boundary filter, the first linear filter section, and the second linear filter section, respectively. Thus, the reduction in number of taps of the second linear filter section reduces the computation time T2 for the second linear filter section even with an increased number of taps of the first linear filter section, as long as the computation time T1 required for the filtering operation of the first linear filter section is shorter than the sum T0+T2 of the time T0 required for the filtering operation of the boundary filter and the time T2 required for the filtering operation of the second linear filter section. This in turn enables reduction of the whole computation time T.

Note that the filtering operation of the boundary filter is larger in amount of computation than the filtering operation (product-sum operation) of the linear filter, especially in a case where the boundary filter is a de-blocking filter, in particular, in a case where the boundary filter is a de-blocking filter having the function of autonomously adjusting its own filtering strength in accordance with the degree of activity, block boundary strength, etc. Thus, even with an increased number of taps of the first linear filter section, the computation time T1 of the first linear filter section rarely exceeds the computation time T0 of the boundary filter section. That is, the effect of being capable of reducing the whole computation time without decreasing the coding efficiency is a generally viable effect, except for unlikely cases where the computation time T1 of the first linear filter section exceeds the computation time T0 of the boundary filter section.

The filter device of the present invention is preferably such that a number of taps of the second linear filter section is set to 1.

According to the above configuration, it is possible to maximize the amount of computation time reduced through the parallelization of the filtering operation of the boundary filter with the filtering operation of the adaptive filter, while maintaining the function of adaptively adjusting an apparent filter strength of the boundary filter.

The filter device of the present invention is preferably such that a number of taps of the first linear filter section is set to a number of not smaller than 2.

According to the above configuration, even in a case where the second linear filter section is non-spatial (the number of taps is 1), it is possible to obtain the effect of increasing the coding efficiency, as in the case where the second linear filter section is spatial (the number of taps is not smaller than 2).

The filter device of the present invention is preferably such that filtering operation of the first linear filter section and filtering operation of the boundary filter are performed in parallel with each other.

According to the above configuration, a filter device with which the whole computation time is reduced is realized.

In the adaptive filter, it is preferable that the adaptive filter operates in a mode specified from between a first mode and a second mode by mode specification information, which is obtained from an external entity, wherein the first mode is a mode in which the adaptive filter outputs the output image of the second linear filter section, while the second mode is a mode in which the adaptive filter outputs a sum of the output image of the first linear filter section and the output image of the second linear filter section.

According to the above configuration, it is possible to externally control whether to cause the filter device to operate in the second mode which is suitable for the reduction of the computation time through the parallelization. For example, assume that the filter device is incorporated into an image decoding device. This allows an image encoding device to control whether to cause the image decoding device to operate in the second mode which is suitable for the reduction of the computation time through the parallelization.

The filter device of the present invention is preferably such that in the second mode, the number of taps of the second linear filter section is set to 1.

According to the above configuration, it is possible, in the second mode, to maximize the amount of computation time reduced through parallelization of the filtering operation of the boundary filter with the filtering operation of the adaptive filter, while maintaining the function of adaptively adjusting an apparent filter strength of the boundary filter.

The filter device of the present invention is preferably such that in the first mode, the number of taps of the second linear filter section is set at a value specified by tap number specification information, which is obtained from an external entity, while in the second mode, the number of taps of the first linear filter section is set at a value specified by the tap number specification information.

According to the above configuration, it is possible to efficiently specify both the number of taps of the second linear filter in the first mode and the number of taps of the first linear filter in the second mode, by using a single piece of tap number specification information.

The filter device of the present invention is preferably such that the adaptive filter operates in a mode specified from between a first mode and a second mode by mode specification information, which is obtained from an external entity, wherein the first mode is a mode in which an upper limit value settable for the number of taps of the second linear filter section is not determined, while the second mode is a mode in which the upper limit value settable for the number of taps in the second linear filter section is determined.

According to the above configuration, it is possible to externally control whether to cause the filter device to operate in the second mode which is suitable for the reduction of the computation time through the parallelization. For example, assume that the filter device is incorporated into an image decoding device. This allows an image encoding device to control whether to cause the image decoding device to operate in the second mode which is suitable for the reduction of the computation time through the parallelization.

The filter device of the present invention is preferably such that an upper limit value settable for the number of taps of the second linear filter section is determined.

According to the above configuration, it is possible to operate the filter device in a state suitable for the reduction of the computation time through the parallelization.

It should be noted that the present invention encompasses an image decoding device including the above-described filter device, an image encoding device including the above-described filter device, and a data structure of a filter parameter fed to the above-described filter device.

In order to solve the above problem, a filter device of the present invention is a filter device for generating a post-filter image from a filter input image which is an image segmented into blocks and processed, comprising: adaptive filter information storing means for storing adaptive filter information corresponding to the filter input image; and boundary utilization filter means (BF means) for generating a boundary utilization filter image (post-BF image) from the filter input image by using pixels located near a boundary of a block neighboring a filter target pixel and by operating a filter for generating a pixel value of the filter target pixel; and adaptive filter means for carrying out an adaptive filter process, which is controlled by the adaptive filter information, on a basis of the filter input image and the post-BF image.

The BF means selects a block boundary or a pixel neighboring a block boundary to generate the image to be inputted to the adaptive filter. The combination of (i) the BF process of explicitly referring to a boundary and pixels near the boundary and (ii) the adaptive filter enables de-blocking strength adjustments appropriate for the characteristics of sequences and frames and the characteristics of boundaries, thus increasing the distortion correction effect. The filter means configured as described above achieves the effect of enabling de-blocking strength adjustments appropriate for the characteristics of sequences and frames and the positional relations with the boundaries, through the use of adaptive filter information of a low volume of codes.

In order to solve the above problem, a filter device according to the present invention includes: a boundary filter selectively acting on a block boundary of an image processed block by block; and an adaptive filter including: a first linear filter section calculating a pixel value of each target pixel of an output image of the first linear filter section, with reference to each pixel value of an output image of the boundary filter in a reference range defined in correspondence with a position of the target pixel; a second linear filter section calculating a pixel value of each target pixel of an output image of the second linear filter section, with reference to each pixel value of a predicted image in a reference range defined in correspondence with a position of the target pixel; and a third linear filter section calculating a pixel value of each target pixel of an output image of the third linear filter section, with reference to each pixel value of a residual image in a reference range defined in correspondence with a position of the target pixel, the adaptive filter performing addition of the respective output images of the first through third linear filter sections to output a result of the addition, wherein a number of taps of at least one of the first through third linear filter sections is set to 1.

According to the filter device configured as described above, the number of taps of at least one of the first through third linear filter sections is set to 1. This makes it possible to reduce at least either the volume of processing or the processing time while maintaining high coding efficiency.

Further, in order to solve the above problem, a filter device according to the present invention includes: a boundary filter selectively acting on a block boundary of an image processed block by block; and an adaptive filter comprising: a first linear filter section calculating a pixel value of each target pixel of an output image of the first linear filter section, with reference to each pixel value of an output image of the boundary filter in a reference range defined in correspondence with a position of the target pixel; a second linear filter section calculating a pixel value of each target pixel of an output image of the second linear filter section, with reference to each pixel value of a predicted image in a reference range defined in correspondence with a position of the target pixel; and a third linear filter section calculating a pixel value of each target pixel of an output image of the third linear filter section, with reference to each pixel value of a residual image in a reference range defined in correspondence with a position of the target pixel, the adaptive filter performing addition of the respective output images from the first through third linear filter sections to output a result of the addition, wherein a downstream boundary line in an processing order out of boundary lines of the reference range is configured so as to at least partially overlap a boundary of the target pixel or a boundary of a block containing the target pixel.

According to the filter device configured as described above, a downstream boundary line in an processing order out of boundary lines of the reference range is configured so as to at least partially overlap a boundary of the target pixel or a boundary of a block containing the target pixel. This makes it possible to reduce at least either the volume of processing or the processing time while maintaining high coding efficiency.

For example, under circumstances where the reference range is rectangular in form and where the processing is performed in raster scan order, the "downstream boundary line in the processing order out of boundary lines of the reference range" refers to at least either a right-sided boundary line or a lower boundary line out of the boundary lines of the reference range. Meanwhile, under circumstances where the processing is performed in reverse raster scan order, the "downstream boundary line in the processing order out of boundary lines of the reference range" refers to at least either a left-sided boundary line or an upper boundary line out of the boundary lines of the reference range.

In addition, the block may be any of the following units called a transform block, a prediction block, a macroblock, a coding unit, and a largest coding unit.

Still further, the filter device is preferably such that the reference range of at least one of the first through third linear filter sections is composed of: a target block containing the target pixel; a decoded block around the target block; and a block to be decoded immediately after the target block.

According to the above configuration, the reference range of at least one of the first through third linear filter sections is composed of: a target block containing the target pixel; a decoded block around the target block; and a block to be decoded immediately after the target block. This makes it possible to start the filter processing at the completion of a process of decoding a value of a pixel which belongs to a block decoded immediately after the target block.

According to the above configuration, the processing time can therefore be reduced. In addition, the filter processing reduces the volume of data transferred, thereby reducing the volume of processing.

Yet further, the filter device is preferably such that the reference range of at least one of the first through third linear filter sections is composed of: a target block containing the target pixel; and a decoded block around the target block.

According to the above configuration, the reference range of at least one of the first through third linear filter sections is composed of: a target block containing the target pixel; and a decoded block around the target block. This makes it possible to refer to the pixel value, without the need for waiting until decoding of the pixel value is completed, at the reference to the pixel value of the pixel which belongs to the block around the target block.

According to the above configuration, the processing time can therefore be reduced. In addition, the filter processing reduces the volume of data transferred, thereby reducing the volume of processing.

Further, the filter device is preferably such that for at least one of the first through third linear filter sections, the reference range is set such that a portion of its lower side overlaps a portion of a lower side of the target pixel.

According to the above configuration, for at least one of the first through third linear filter sections, the reference range is set such that a portion of its lower side overlaps a portion of a lower side of the target pixel. This makes it possible to carry out a filter process, without the need for waiting until a process of decoding a pixel value of a pixel located below the target pixel is completed, when the decoding process is to be carried out in raster scan order.

According to the above configuration, the processing time can therefore be reduced. In addition, the filter processing reduces the volume of data transferred, thereby reducing the volume of processing.

Still further, the filter device is preferably such that for at least one of the first through third linear filter sections, the reference range is set such that respective portions of its lower and right sides overlap respective portions of lower and right sides of the target pixel, respectively.

According to the above configuration, for at least one of the first through third linear filter sections, the reference range is set such that respective portions of its lower and right sides overlap respective portions of lower and right sides of the target pixel, respectively. This makes it possible to carry out a filter process, without the need for waiting until a process of decoding a pixel value of a pixel located below the target pixel is completed, when the decoding process is to be carried out in raster scan order.

According to the above configuration, the processing time can therefore be reduced. In addition, the filter processing reduces the volume of data transferred, thereby reducing the volume of processing.

Yet further, the filer device is preferably such that filtering operation of any of the first through third linear filter sections and filtering operation of the boundary filter are performed in parallel with each other.

According to the above configuration, filtering operation of any of the first through third linear filter sections and filtering operation of the boundary filter are performed in parallel with each other, thereby further reducing the processing time.

Further, the filter device is preferably such that the adaptive filter sets the number of taps of at least one of the first through third linear filter sections to a value specified by tap number specification information, which is obtained from an external entity.

According to the above configuration, it is possible to efficiently specify the number of taps of at least one of the first through third linear filter sections on the basis of the tap number specification information, which is obtained from an external entity.

Still further, the filter device is preferably such that the adaptive filter sets the reference range of at least one of the first through third linear filter sections to a range specified by mode specification information, which is obtained from an external entity.

According to the above configuration, it is possible to efficiently specify the reference range of at least one of the first through third linear filter sections on the basis of mode specification information obtained from an external entity.

Yet further, the filter device is preferably such that the boundary filter is a de-blocking filter for reducing block noise on the boundaries.

According to the above configuration, the boundary filter reduces block noise on the boundaries, thereby increasing a prediction accuracy and coding efficiency.

Further, the present invention encompasses: an image decoding device including the above-described filter device, the filter device being caused to act on each image used to generate a decoded image; and an image encoding device including the above-described filter device, the filter device being caused to act on each image used to generate a locally decoded image.

Still further, the present invention encompasses the following data structure of the filter parameter.

That is, the present invention encompasses a data structure of a filter parameter fed to a filter device that includes a boundary filter and an adaptive filter, the filter parameter containing: a filter coefficient of the boundary filter selectively acting on a block boundary of an image processed block by block; a filter coefficient of a first linear filter section calculating a pixel value of each target pixel of an output image of the first linear filter section, with reference to each pixel value of an output image of the boundary filter in a reference range defined in correspondence with a position of the target pixel; a filter coefficient of a second linear filter section calculating a pixel value of each target pixel of an output image of the second linear filter section, with reference to each pixel value of a predicted image in a reference range defined in correspondence with a position of the target pixel; and a a pixel value of each target pixel of an output image of the third linear filter section, with reference to each pixel value of a residual image in a reference range defined in correspondence with a position of the target pixel.

[Supplemental Remarks 1]

The macroblock of the above embodiments corresponds to an LCU (Largest Coding Unit; also referred to as a root of a Coding Tree) of HEVC (High Efficiency Video Coding), which has been suggested as a follow-on to the H.264/MPEG-4 AVC standard. The macroblock and the block each correspond to a CU (Coding Unit; also referred to as a leaf of a Coding Tree), a PU (Prediction Unit), or a TU (Transformation Unit) of the HEVC. The LCU is also referred to as a tree block.

[Supplemental Remarks 2]

The above descriptions have detailed the embodiments of the present invention with reference to the drawings. However, specific configurations of the present invention are not limited to these embodiments. Design variations and other changes made within a range not departing from the gist of the present invention can also be included within the scope of the appended claims.

INDUSTRIAL APPLICABILITY

A filter device according to the present invention is suitably applicable to an image encoding device and an image decoding device. In particular, the filter device is suitably applicable to a moving image encoder and a moving image decoder. Specifically, the filter device is suitably applicable to a moving image encoder and a moving image decoder both of which are based on the H264/AVC standard or its follow-on.

REFERENCE SIGNS LIST

1 Moving image decoder
107 Subtraction section
109 Addition section
111 Prediction section
112 Transformation section
113 Quantization section
114 Variable length coding section
115 Inverse quantization section
116 Inverse transformation section
117 Frame memory
118 Adaptive filter information calculating section
119 Adaptive filter information storing section
120 Loop filter section
120' Loop filter section
301 BF section
302 Adaptive filter section
302' Adaptive filter section 301' Second BF section
301'b Third BF section
401 Boundary edge calculating section
402 Degree-of-activity calculating section
403 BF pixel generating section
501 Vertical boundary value reference section
502 Horizontal boundary value reference section
503 Target pixel reference section
504 BF weight calculating section
505 Weighted average section
501b Second vertical boundary value reference section
502b Second horizontal boundary value reference section
503b Second target pixel reference section
504b Second BF weight calculating section
505b Second weighted average section
701 Adaptive weighting section
702 post-BF pixel adaptive weighting section
702' Multiplication section
703 Shift/division section
704 Addition section
3 Moving image decoder (image decoding device)
4 Moving image encoder (Image encoding device)
107 Subtraction section
109 Addition section
111 Prediction section
112 Transformation section
113 Quantization section
114 Variable length code decoding section
115 Inverse quantization section
116 Inverse transformation section
117 Frame memory
120 Loop filter section
362 Adaptive filter memory
363 Adaptive filter section
364 BF section
368 Adaptive filter information derivation section

The invention claimed is:

1. A filter device comprising:
a boundary filter selectively acting on a block boundary of an image processed block by block; and
an adaptive filter comprising:
    a first linear filter section acting on an input image to be supplied to the boundary filter; and
    a second linear filter section acting on an output image of the boundary filter,
the adaptive filter performing addition of an output image of the first linear filter section and an output image of the second linear filter section to output a result of the addition.

2. The filter device according to claim 1, wherein a number of taps of the second linear filter section is set to 1.

3. The filter device according to claim 1, wherein a number of taps of the first linear filter section is set to a number of not smaller than 2.

4. The filter device according to claim 1, wherein the adaptive filter operates in a mode specified from between a first mode and a second mode by mode specification information, which is obtained from an external entity, wherein the first mode is a mode in which the adaptive filter outputs the output image of the second linear filter section, while the second mode is a mode in which the adaptive filter outputs a sum of the output image of the first linear filter section and the output image of the second linear filter section.

5. The filter device according to claim 1, wherein an upper limit value settable for the number of taps of the second linear filter section is determined.

6. The filter device according to claim 1, wherein the boundary filter is a de-blocking filter for reducing block noise on the boundaries.

7. An image decoding device comprising:
a filter device according to claim 1,
the image decoding device causing the filter device to act on a decoded image.

8. An image encoding device comprising:
a filter device according to claim 1,
the image encoding device causing the filter device to act on a locally decoded image.

9. The filter device according to claim 1,
wherein a downstream boundary line in an processing order out of boundary lines of a reference range of at least one of the first and second linear filter sections is configured so as to at least partially overlap a boundary of a target pixel or a boundary of a block containing the target pixel.

10. A data structure of a filter parameter fed to a filter device that includes a boundary filter and an adaptive filter, wherein the filter parameter contains: a filter coefficient of a first linear filter section, which is a component of the adaptive filter, acting on an input image to be supplied to the boundary filter; and a filter coefficient of a second linear filter section, which is another component of the adaptive filter, acting on an output image outputted from the boundary filter.

11. A filter device comprising:
a boundary filter selectively acting on a block boundary of an image processed block by block; and
an adaptive filter comprising:
    a first linear filter section calculating a pixel value of each target pixel of an output image of the first linear filter section, with reference to each pixel value of an output image of the boundary filter in a reference range defined in correspondence with a position of the target pixel;
    a second linear filter section calculating a pixel value of each target pixel of an output image of the second linear filter section, with reference to each pixel value of a predicted image in a reference range defined in correspondence with a position of the target pixel; and
    a third linear filter section calculating a pixel value of each target pixel of an output image of the third linear filter section, with reference to each pixel value of a residual image in a reference range defined in correspondence with a position of the target pixel,
the adaptive filter performing addition of the respective output images of the first through third linear filter sections to output a result of the addition, wherein a number of taps of at least one of the first through third linear filter sections is set to 1.

12. The filter device according to claim 9, wherein the reference range of at least one of the first and second linear filter sections is composed of: a target block containing the target pixel; a decoded block around the target block; and a block to be decoded immediately after the target block.

13. The filter device according to claim 9, wherein the reference range of at least one of the first and second linear filter sections is composed of: a target block containing the target pixel; and a decoded block around the target block.

14. The filter device according to claim 9, wherein
for at least one of the first and second linear filter sections,
the reference range is set such that a portion of its lower side overlaps a portion of a lower side of the target pixel.

15. The filter device according to claim 9, wherein
for at least one of the first and second linear filter sections,
the reference range is set such that respective portions of its lower and right sides overlap respective portions of lower and right sides of the target pixel, respectively.

* * * * *